United States Patent
Rogynskyy et al.

(10) Patent No.: US 11,949,682 B2
(45) Date of Patent: *Apr. 2, 2024

(54) SYSTEMS AND METHODS FOR MANAGING THE GENERATION OR DELETION OF RECORD OBJECTS BASED ON ELECTRONIC ACTIVITIES AND COMMUNICATION POLICIES

(71) Applicant: People.ai, Inc., Redwood City, CA (US)

(72) Inventors: Oleg Rogynskyy, Menlo Park, CA (US); Brittney Hall, Los Angeles, CA (US); Dylan Halladay, San Francisco, CA (US); John Wulf, San Francisco, CA (US); Vardhman Jain, San Francisco, CA (US)

(73) Assignee: People.ai, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/958,714

(22) Filed: Oct. 3, 2022

(65) Prior Publication Data
US 2023/0043131 A1    Feb. 9, 2023

Related U.S. Application Data

(63) Continuation of application No. 16/877,078, filed on May 18, 2020, now Pat. No. 11,463,441, which is a
(Continued)

(51) Int. Cl.
*H04L 29/08*     (2006.01)
*G06F 16/23*     (2019.01)
(Continued)

(52) U.S. Cl.
CPC ........ *H04L 63/102* (2013.01); *G06F 16/2379* (2019.01); *G06N 20/00* (2019.01); *H04L 63/20* (2013.01); *H04L 67/1095* (2013.01)

(58) Field of Classification Search
CPC .... H04L 63/102; H04L 63/20; G06F 16/2379
See application file for complete search history.

(56) References Cited

U.S. PATENT DOCUMENTS

| | | |
|---|---|---|
| 5,504,861 A | 4/1996 | Crockett et al. |
| 5,873,093 A | 2/1999 | Williamson et al. |
| | (Continued) | |

FOREIGN PATENT DOCUMENTS

| | | |
|---|---|---|
| CA | 2803661 A1 | 12/2011 |
| CN | 110365575 A | 10/2019 |
| | (Continued) | |

OTHER PUBLICATIONS https://cafc.uscourts.gov/opinions-orders/22-1364.OPINION.4-7-2023_2107363.pdf.
(Continued)

*Primary Examiner* — Adnan M Mirza
(74) *Attorney, Agent, or Firm* — FOLEY & LARDNER LLP

(57) ABSTRACT

The present disclosure relates to for managing the generation or deletion of record objects based on electronic activities and communication policies. Data of a plurality of electronic activities from one or more electronic accounts of the entity may be identified. It may be determined whether the identified data satisfies a communication policy. The communication policy may include one or more rules based on the electronic activities. Instructions to generate a contact record object or instructions to delete an existing contact record for the entity may be transmitted based on the condition of the communication of the communication policy that is satisfied.

20 Claims, 16 Drawing Sheets

Related U.S. Application Data continuation-in-part of application No. 16/419,583, filed on May 22, 2019, now Pat. No. 10,657,131.

(60) Provisional application No. 62/747,452, filed on Oct. 18, 2018, provisional application No. 62/725,999, filed on Aug. 31, 2018, provisional application No. 62/676,187, filed on May 24, 2018.

(51) Int. Cl.
  *G06N 20/00*    (2019.01)
  *H04L 9/40*    (2022.01)
  *H04L 67/1095*    (2022.01)

(56) References Cited

U.S. PATENT DOCUMENTS

| | | | |
|---|---|---|---|
| 5,930,764 A | 7/1999 | Melchione et al. | |
| 6,067,525 A | 5/2000 | Johnson et al. | |
| 7,007,032 B1 | 2/2006 | Chen et al. | |
| 7,043,690 B1 | 5/2006 | Bates et al. | |
| 7,099,855 B1 | 8/2006 | Nelken et al. | |
| 7,162,522 B2 | 1/2007 | Adar et al. | |
| 7,197,502 B2 | 3/2007 | Feinsmith | |
| 7,257,690 B1 | 8/2007 | Baird | |
| 7,318,104 B1 | 1/2008 | Lee et al. | |
| 7,346,610 B2 | 3/2008 | Ruthfield et al. | |
| 7,444,374 B1 | 10/2008 | Baker | |
| 7,469,225 B1 | 12/2008 | Perrucci | |
| 7,499,870 B1 | 3/2009 | Petrossi | |
| 7,743,051 B1 | 6/2010 | Kashyap et al. | |
| 7,822,631 B1 | 10/2010 | Vander Mey et al. | |
| 7,849,103 B2 | 12/2010 | Hyatt et al. | |
| 7,849,141 B1 | 12/2010 | Bellegarda et al. | |
| 7,912,842 B1 | 3/2011 | Bayliss | |
| 7,921,204 B2 | 4/2011 | Wilson et al. | |
| 7,949,578 B2 | 5/2011 | Johnson et al. | |
| 8,032,598 B1 | 10/2011 | He et al. | |
| 8,200,527 B1 | 6/2012 | Thompson et al. | |
| 8,205,264 B1 | 6/2012 | Kailash et al. | |
| 8,296,370 B2 | 10/2012 | Adams et al. | |
| 8,406,745 B1 | 3/2013 | Upadhyay et al. | |
| 8,442,189 B2 | 5/2013 | Michaelis et al. | |
| 8,448,072 B1 | 5/2013 | Lai et al. | |
| 8,468,123 B2 | 6/2013 | Dalvi et al. | |
| 8,478,624 B1 | 7/2013 | Bivens et al. | |
| 8,489,588 B2 | 7/2013 | Figueroa et al. | |
| 8,495,151 B2 | 7/2013 | Bodapati et al. | |
| 8,639,552 B1 | 1/2014 | Chen et al. | |
| 8,717,881 B1 | 5/2014 | Schmalz et al. | |
| 8,732,095 B2 | 5/2014 | Cornford | |
| 8,938,510 B2 | 1/2015 | Pouzin et al. | |
| 8,943,151 B2 | 1/2015 | Smith et al. | |
| 8,948,372 B1 | 2/2015 | Beall et al. | |
| 8,989,053 B1 | 3/2015 | Skaaksrud et al. | |
| 8,996,395 B1 | 3/2015 | Stibel et al. | |
| 9,122,694 B1 | 9/2015 | Dukes et al. | |
| 9,154,514 B1 | 10/2015 | Prakash | |
| 9,158,782 B2 | 10/2015 | Nucci et al. | |
| 9,208,207 B2 | 12/2015 | Venkataramani et al. | |
| 9,258,423 B1 | 2/2016 | Beall et al. | |
| 9,298,727 B2 | 3/2016 | Hazlewood et al. | |
| 9,305,079 B2 | 4/2016 | Starbuck et al. | |
| 9,317,574 B1 | 4/2016 | Brisebois et al. | |
| 9,326,146 B2 | 4/2016 | Bradley | |
| 9,378,256 B2 | 6/2016 | Alkadi et al. | |
| 9,515,973 B1 | 12/2016 | Jones | |
| 9,530,119 B1 | 12/2016 | Grisso et al. | |
| 9,665,885 B1 | 5/2017 | Allouche | |
| 9,686,308 B1 | 6/2017 | Srivastava | |
| 9,690,820 B1 | 6/2017 | Girulat, Jr. | |
| 9,785,764 B2 | 10/2017 | Loughlin-McHugh et al. | |
| 9,798,812 B2 | 10/2017 | Harik et al. | |
| 9,813,363 B1 | 11/2017 | Caldwell et al. | |
| 9,898,743 B2 | 2/2018 | Bessler et al. | |
| 9,923,852 B2 | 3/2018 | Smith et al. | |
| 9,973,483 B2 | 5/2018 | Allrich et al. | |
| 10,013,673 B2 | 7/2018 | Baessler et al. | |
| 10,049,136 B1 | 8/2018 | Barsness et al. | |
| 10,067,987 B1 | 9/2018 | Khanna et al. | |
| 10,142,276 B2 | 11/2018 | Rapaport et al. | |
| 10,169,405 B2 | 1/2019 | Neels et al. | |
| 10,181,957 B2 | 1/2019 | Srivastava | |
| 10,235,685 B2 | 3/2019 | Sun et al. | |
| 10,311,042 B1 | 6/2019 | Kumar | |
| 10,318,543 B1 | 6/2019 | Sharifi | |
| 10,425,531 B1 * | 9/2019 | Liu | H04M 7/0084 |
| 10,430,239 B2 | 10/2019 | Tang et al. | |
| 10,438,172 B2 | 10/2019 | Rangan | |
| 10,475,054 B1 | 11/2019 | Riazzi et al. | |
| 10,498,856 B1 | 12/2019 | Rogynskyy et al. | |
| 10,565,229 B2 | 2/2020 | Rogynskyy et al. | |
| 10,607,165 B2 | 3/2020 | Punera et al. | |
| 10,740,771 B2 | 8/2020 | Sun et al. | |
| 10,846,643 B2 | 11/2020 | Xu et al. | |
| 10,880,322 B1 | 12/2020 | Jakobsson et al. | |
| 10,936,623 B2 | 3/2021 | Mahalingam et al. | |
| 11,151,486 B1 | 10/2021 | Ross et al. | |
| 2001/0022558 A1 | 9/2001 | Karr et al. | |
| 2002/0059095 A1 | 5/2002 | Cook | |
| 2002/0077998 A1 | 6/2002 | Andrews et al. | |
| 2002/0082882 A1 | 6/2002 | Perry et al. | |
| 2002/0087647 A1 | 7/2002 | Quine et al. | |
| 2002/0116366 A1 | 8/2002 | Magouirk et al. | |
| 2002/0138571 A1 | 9/2002 | Trinon et al. | |
| 2002/0150093 A1 | 10/2002 | Ott et al. | |
| 2003/0018643 A1 | 1/2003 | Mi et al. | |
| 2003/0069780 A1 | 4/2003 | Hailwood et al. | |
| 2003/0182310 A1 | 9/2003 | Charnock et al. | |
| 2003/0208468 A1 | 11/2003 | McNab et al. | |
| 2003/0229529 A1 | 12/2003 | Mui et al. | |
| 2004/0015386 A1 | 1/2004 | Abe et al. | |
| 2004/0039619 A1 | 2/2004 | Zarb | |
| 2004/0039624 A1 | 2/2004 | Ikezawa et al. | |
| 2004/0054646 A1 | 3/2004 | Daniell et al. | |
| 2004/0054737 A1 | 3/2004 | Daniell | |
| 2004/0101059 A1 | 5/2004 | Joch et al. | |
| 2004/0133645 A1 | 7/2004 | Massanelli et al. | |
| 2004/0158816 A1 | 8/2004 | Pandipati et al. | |
| 2004/0186765 A1 | 9/2004 | Kataoka | |
| 2004/0193515 A1 | 9/2004 | Peterson et al. | |
| 2004/0249650 A1 | 12/2004 | Freedman et al. | |
| 2005/0010470 A1 | 1/2005 | Marino | |
| 2005/0015452 A1 | 1/2005 | Corson | |
| 2005/0021529 A1 | 1/2005 | Hodson et al. | |
| 2005/0038693 A1 | 2/2005 | Janus | |
| 2005/0149479 A1 | 7/2005 | Richardson et al. | |
| 2005/0187862 A1 * | 8/2005 | Dheer | G06Q 40/02 707/E17.119 |
| 2005/0246221 A1 | 11/2005 | Geritz et al. | |
| 2005/0262209 A1 | 11/2005 | Yu | |
| 2005/0267887 A1 | 12/2005 | Robins | |
| 2006/0026033 A1 | 2/2006 | Brydon et al. | |
| 2006/0036461 A1 | 2/2006 | Chuah et al. | |
| 2006/0067250 A1 | 3/2006 | Boyer et al. | |
| 2006/0069730 A1 | 3/2006 | Azuma | |
| 2006/0085205 A1 | 4/2006 | Kumar | |
| 2006/0085419 A1 | 4/2006 | Rosen | |
| 2006/0101095 A1 | 5/2006 | Episale et al. | |
| 2006/0106626 A1 | 5/2006 | Jeng et al. | |
| 2006/0122861 A1 | 6/2006 | Scott et al. | |
| 2006/0136312 A1 | 6/2006 | Raguseo et al. | |
| 2006/0179114 A1 | 8/2006 | Deeds | |
| 2006/0200432 A1 | 9/2006 | Flinn et al. | |
| 2006/0224437 A1 | 10/2006 | Gupta et al. | |
| 2006/0227869 A1 | 10/2006 | Joch et al. | |
| 2006/0235831 A1 | 10/2006 | Adinolfi et al. | |
| 2006/0235935 A1 | 10/2006 | Ng | |
| 2006/0242040 A1 | 10/2006 | Rader | |
| 2007/0011144 A1 | 1/2007 | Balan et al. | |
| 2007/0061626 A1 | 3/2007 | Nelson et al. | |
| 2007/0067394 A1 | 3/2007 | Adams et al. | |
| 2007/0073818 A1 | 3/2007 | Gardner et al. | |
| 2007/0150234 A1 | 6/2007 | Wicks | |

(56) References Cited

U.S. PATENT DOCUMENTS

| | | |
|---|---|---|
| 2007/0162432 A1 | 7/2007 | Armstrong et al. |
| 2007/0239721 A1 | 10/2007 | Ullman et al. |
| 2007/0250417 A1 | 10/2007 | Lane et al. |
| 2007/0260692 A1 | 11/2007 | Burgoyne et al. |
| 2007/0282673 A1 | 12/2007 | Nagpal et al. |
| 2007/0288466 A1 | 12/2007 | Bohannon et al. |
| 2008/0005106 A1 | 1/2008 | Schumacher et al. |
| 2008/0015880 A1 | 1/2008 | Freedenberg et al. |
| 2008/0071601 A1 | 3/2008 | Cihla et al. |
| 2008/0086343 A1 | 4/2008 | Pendergraft et al. |
| 2008/0096531 A1 | 4/2008 | McQuaide et al. |
| 2008/0114628 A1 | 5/2008 | Johnson et al. |
| 2008/0147478 A1 | 6/2008 | Mall et al. |
| 2008/0162487 A1 | 7/2008 | Richter |
| 2008/0167930 A1 | 7/2008 | Cao et al. |
| 2008/0275957 A1 | 11/2008 | Pouzin et al. |
| 2008/0288405 A1 | 11/2008 | John |
| 2009/0004321 A1 | 1/2009 | Seki |
| 2009/0018996 A1 | 1/2009 | Hunt et al. |
| 2009/0019003 A1 | 1/2009 | Bohannon et al. |
| 2009/0027392 A1 | 1/2009 | Jadhav et al. |
| 2009/0112678 A1 | 4/2009 | Luzardo |
| 2009/0132345 A1 | 5/2009 | Meyssami et al. |
| 2009/0164926 A1 | 6/2009 | Boyle et al. |
| 2009/0192858 A1 | 7/2009 | Johnson |
| 2009/0313065 A1 | 12/2009 | George et al. |
| 2010/0002859 A1 | 1/2010 | Hepworth et al. |
| 2010/0010912 A1 | 1/2010 | Jones et al. |
| 2010/0030610 A1 | 2/2010 | Gomeh |
| 2010/0030858 A1 | 2/2010 | Chasin |
| 2010/0036786 A1 | 2/2010 | Pujara |
| 2010/0046505 A1 | 2/2010 | Saw et al. |
| 2010/0114897 A1 | 5/2010 | Polo-Malouvier et al. |
| 2010/0121684 A1 | 5/2010 | Morio et al. |
| 2010/0125475 A1 | 5/2010 | Twyman |
| 2010/0144318 A1 | 6/2010 | Cable |
| 2010/0169134 A1 | 7/2010 | Cheng et al. |
| 2010/0191728 A1 | 7/2010 | Reilly et al. |
| 2010/0198636 A1 | 8/2010 | Choudhary et al. |
| 2010/0205123 A1 | 8/2010 | Sculley et al. |
| 2010/0211548 A1 | 8/2010 | Ott et al. |
| 2010/0227302 A1 | 9/2010 | McGilvery et al. |
| 2010/0250682 A1 | 9/2010 | Goldberg et al. |
| 2011/0010218 A1 | 1/2011 | Gupta |
| 2011/0035228 A1 | 2/2011 | Li et al. |
| 2011/0055196 A1 | 3/2011 | Sundelin et al. |
| 2011/0066717 A1 | 3/2011 | Ahola |
| 2011/0078150 A1 | 3/2011 | Rashad et al. |
| 2011/0106920 A1 | 5/2011 | Longo |
| 2011/0191693 A1 | 8/2011 | Baggett et al. |
| 2011/0202370 A1 | 8/2011 | Green et al. |
| 2011/0213974 A1 | 9/2011 | Ardon et al. |
| 2011/0264741 A1 | 10/2011 | Ganetakos et al. |
| 2011/0276396 A1 | 11/2011 | Rathod |
| 2011/0279458 A1 | 11/2011 | Gnanasambandam et al. |
| 2011/0283205 A1 | 11/2011 | Nie et al. |
| 2011/0289065 A1 | 11/2011 | Wells |
| 2011/0289161 A1 | 11/2011 | Rankin et al. |
| 2011/0302221 A1 | 12/2011 | Tobin et al. |
| 2011/0307397 A1 | 12/2011 | Benmbarek |
| 2012/0030168 A1 | 2/2012 | Weissenberger et al. |
| 2012/0030187 A1 | 2/2012 | Marano et al. |
| 2012/0046992 A1 | 2/2012 | Hu et al. |
| 2012/0047014 A1 | 2/2012 | Smadja et al. |
| 2012/0047143 A1 | 2/2012 | Petersen et al. |
| 2012/0047448 A1 | 2/2012 | Amidon et al. |
| 2012/0054135 A1 | 3/2012 | Salaka et al. |
| 2012/0059795 A1 | 3/2012 | Hersh et al. |
| 2012/0078906 A1 | 3/2012 | Anand et al. |
| 2012/0084340 A1 | 4/2012 | McCormack et al. |
| 2012/0089432 A1 | 4/2012 | Podgurny et al. |
| 2012/0096041 A1 | 4/2012 | Rao et al. |
| 2012/0109631 A1 | 5/2012 | Gopal et al. |
| 2012/0110515 A1 | 5/2012 | Abramoff et al. |
| 2012/0117250 A1 | 5/2012 | Santamaria et al. |
| 2012/0131139 A1 | 5/2012 | Siripurapu et al. |
| 2012/0150888 A1 | 6/2012 | Hyatt et al. |
| 2012/0173580 A1 | 7/2012 | Diorio et al. |
| 2012/0185480 A1 | 7/2012 | Ni et al. |
| 2012/0185544 A1 | 7/2012 | Chang et al. |
| 2012/0191570 A1 | 7/2012 | Bennett et al. |
| 2012/0197907 A1 | 8/2012 | Malyshev et al. |
| 2012/0232955 A1 | 9/2012 | Riazzi et al. |
| 2012/0254128 A1 | 10/2012 | Bath et al. |
| 2012/0310763 A1 | 12/2012 | Meehan |
| 2012/0331064 A1 | 12/2012 | Deeter et al. |
| 2013/0006634 A1 | 1/2013 | Grokop et al. |
| 2013/0013667 A1 | 1/2013 | Serena |
| 2013/0031172 A1 | 1/2013 | Olsen et al. |
| 2013/0041961 A1 | 2/2013 | Thrower et al. |
| 2013/0054613 A1 | 2/2013 | Bishop |
| 2013/0073662 A1 | 3/2013 | Meunier et al. |
| 2013/0080212 A1 | 3/2013 | Li et al. |
| 2013/0091042 A1 | 4/2013 | Shah et al. |
| 2013/0110907 A1 | 5/2013 | Sherwin et al. |
| 2013/0117287 A1 | 5/2013 | Jagota et al. |
| 2013/0117289 A1 | 5/2013 | Fischer et al. |
| 2013/0124257 A1 | 5/2013 | Schubert |
| 2013/0124626 A1 | 5/2013 | Cathcart et al. |
| 2013/0179236 A1 | 7/2013 | Hicyilmaz et al. |
| 2013/0179790 A1 | 7/2013 | Nadiadi et al. |
| 2013/0191416 A1 | 7/2013 | Lee et al. |
| 2013/0204663 A1 | 8/2013 | Kahlow |
| 2013/0205215 A1 | 8/2013 | Dunn et al. |
| 2013/0212115 A1 | 8/2013 | Yerli |
| 2013/0212200 A1 | 8/2013 | Dennis et al. |
| 2013/0238375 A1 | 9/2013 | Graupner et al. |
| 2013/0254134 A1 | 9/2013 | Pothineni et al. |
| 2013/0290690 A1 | 10/2013 | Nucci et al. |
| 2013/0311498 A1 | 11/2013 | Lambert et al. |
| 2013/0339105 A1 | 12/2013 | Russell et al. |
| 2013/0339276 A1 | 12/2013 | Lai et al. |
| 2014/0006044 A1 | 1/2014 | Pradhan et al. |
| 2014/0019409 A1 | 1/2014 | Tseng et al. |
| 2014/0025686 A1 | 1/2014 | Wong |
| 2014/0025693 A1 | 1/2014 | Arora et al. |
| 2014/0046711 A1 | 2/2014 | Borodow et al. |
| 2014/0046982 A1 | 2/2014 | Chan et al. |
| 2014/0066044 A1 | 3/2014 | Ramnani et al. |
| 2014/0067803 A1 | 3/2014 | Kapadia et al. |
| 2014/0074550 A1 | 3/2014 | Chourey |
| 2014/0074551 A1 | 3/2014 | Setayesh et al. |
| 2014/0081685 A1 | 3/2014 | Thacker et al. |
| 2014/0081690 A1 | 3/2014 | Winters |
| 2014/0095547 A1 | 4/2014 | Guo et al. |
| 2014/0129942 A1 | 5/2014 | Rathod |
| 2014/0149560 A1 | 5/2014 | Hakami et al. |
| 2014/0164065 A1 | 6/2014 | Prieto |
| 2014/0172478 A1 | 6/2014 | Vadasz |
| 2014/0172504 A1 | 6/2014 | Duva et al. |
| 2014/0172872 A1 | 6/2014 | Hyatt et al. |
| 2014/0180762 A1 | 6/2014 | Gilbert |
| 2014/0180788 A1 | 6/2014 | George et al. |
| 2014/0181935 A1 | 6/2014 | Beckmann et al. |
| 2014/0195449 A1 | 7/2014 | Komissarchik et al. |
| 2014/0196037 A1 | 7/2014 | Gopalan |
| 2014/0211791 A1 | 7/2014 | Cadiz et al. |
| 2014/0236663 A1 | 8/2014 | Smith et al. |
| 2014/0244300 A1 | 8/2014 | Bess et al. |
| 2014/0244531 A1 | 8/2014 | Baldwin et al. |
| 2014/0278271 A1 | 9/2014 | Stevenson et al. |
| 2014/0278909 A1 | 9/2014 | Potter et al. |
| 2014/0280197 A1 | 9/2014 | Gatto et al. |
| 2014/0297751 A1 | 10/2014 | Antani et al. |
| 2014/0365509 A1 | 12/2014 | Lester et al. |
| 2014/0372363 A1 | 12/2014 | Chestnut et al. |
| 2015/0019204 A1 | 1/2015 | Simard et al. |
| 2015/0032499 A1 | 1/2015 | Duftler et al. |
| 2015/0032738 A1 | 1/2015 | Nachnani et al. |
| 2015/0032829 A1 | 1/2015 | Barshow et al. |
| 2015/0039380 A1 | 2/2015 | Bellini et al. |
| 2015/0039703 A1 | 2/2015 | Kursun |
| 2015/0046233 A1 | 2/2015 | Srulowitz et al. |
| 2015/0058324 A1 | 2/2015 | Kauwe |

(56) References Cited

U.S. PATENT DOCUMENTS

| | | |
|---|---|---|
| 2015/0067687 A1 | 3/2015 | Turner |
| 2015/0081396 A1 | 3/2015 | Miller |
| 2015/0081828 A1 | 3/2015 | Appelman |
| 2015/0100356 A1 | 4/2015 | Bessler et al. |
| 2015/0106260 A1 | 4/2015 | Andrews et al. |
| 2015/0112880 A1 | 4/2015 | Blaylock et al. |
| 2015/0120374 A1 | 4/2015 | Kolegayev et al. |
| 2015/0120714 A1 | 4/2015 | Xu et al. |
| 2015/0127585 A1 | 5/2015 | Pinckney et al. |
| 2015/0128252 A1 | 5/2015 | Konami |
| 2015/0134389 A1 | 5/2015 | Punera et al. |
| 2015/0134431 A1 | 5/2015 | Georgoff et al. |
| 2015/0135043 A1 | 5/2015 | Apps et al. |
| 2015/0143248 A1 | 5/2015 | Beechuk et al. |
| 2015/0149484 A1 | 5/2015 | Kelley |
| 2015/0170060 A1 | 6/2015 | Blechner et al. |
| 2015/0170091 A1 | 6/2015 | Kovilpattii et al. |
| 2015/0213358 A1 | 7/2015 | Shelton et al. |
| 2015/0228038 A1 | 8/2015 | Stevenson et al. |
| 2015/0229599 A1 | 8/2015 | Arora et al. |
| 2015/0242490 A1 | 8/2015 | Czajka et al. |
| 2015/0242753 A1 | 8/2015 | Yarlagadda et al. |
| 2015/0249742 A1 | 9/2015 | Li et al. |
| 2015/0256635 A1 | 9/2015 | Casey et al. |
| 2015/0264004 A1 | 9/2015 | Khoo |
| 2015/0269530 A1 | 9/2015 | Work et al. |
| 2015/0278504 A1 | 10/2015 | Azim et al. |
| 2015/0288744 A1 | 10/2015 | Dwan et al. |
| 2015/0294377 A1 | 10/2015 | Chow |
| 2015/0302436 A1 | 10/2015 | Reynolds |
| 2015/0332319 A1 | 11/2015 | Baizeau et al. |
| 2015/0347591 A1 | 12/2015 | Bax et al. |
| 2015/0347917 A1 | 12/2015 | Hua et al. |
| 2015/0347952 A1 | 12/2015 | Guan et al. |
| 2015/0350144 A1 | 12/2015 | Zeng et al. |
| 2015/0356160 A1 | 12/2015 | Berwick et al. |
| 2015/0371172 A1 | 12/2015 | Minter |
| 2015/0379131 A1 | 12/2015 | Gurevich et al. |
| 2015/0381533 A1 | 12/2015 | Klemm et al. |
| 2016/0006875 A1 | 1/2016 | Burmeister et al. |
| 2016/0012121 A1 | 1/2016 | Skarin et al. |
| 2016/0014151 A1 | 1/2016 | Prakash |
| 2016/0019132 A1 | 1/2016 | Vilakkumadathil |
| 2016/0019661 A1 | 1/2016 | Bouganim et al. |
| 2016/0048548 A1 | 2/2016 | Thomas et al. |
| 2016/0048791 A1 | 2/2016 | Kadakia et al. |
| 2016/0048854 A1 | 2/2016 | Kahlow |
| 2016/0057499 A1 | 2/2016 | Foerster et al. |
| 2016/0063118 A1 | 3/2016 | Campbell et al. |
| 2016/0063336 A1 | 3/2016 | Poplavski et al. |
| 2016/0065628 A1 | 3/2016 | Guo et al. |
| 2016/0071152 A1 | 3/2016 | Nicklin et al. |
| 2016/0086190 A1 | 3/2016 | Bohrer et al. |
| 2016/0092040 A1 | 3/2016 | Sherman |
| 2016/0110400 A1 | 4/2016 | Greene et al. |
| 2016/0110826 A1 | 4/2016 | Morimoto et al. |
| 2016/0119289 A1 | 4/2016 | Jain et al. |
| 2016/0125067 A1 | 5/2016 | Alexe et al. |
| 2016/0125471 A1 | 5/2016 | Hsu et al. |
| 2016/0142275 A1 | 5/2016 | Hendry et al. |
| 2016/0171373 A1 | 6/2016 | Allen et al. |
| 2016/0180038 A1 | 6/2016 | Clark et al. |
| 2016/0189082 A1 | 6/2016 | Garrish et al. |
| 2016/0196511 A1 | 7/2016 | Anisingaraju et al. |
| 2016/0196523 A1 | 7/2016 | Pieper |
| 2016/0212266 A1 | 7/2016 | Soundar |
| 2016/0217407 A1 | 7/2016 | Ostanik |
| 2016/0217429 A1 | 7/2016 | Lau |
| 2016/0224939 A1 | 8/2016 | Chen et al. |
| 2016/0226811 A1 | 8/2016 | Kerschhofer et al. |
| 2016/0239774 A1 | 8/2016 | Babar |
| 2016/0241532 A1 | 8/2016 | Loughlin-McHugh et al. |
| 2016/0241579 A1 | 8/2016 | Roosenraad et al. |
| 2016/0255034 A1 | 9/2016 | Yuan |
| 2016/0255139 A1 | 9/2016 | Rathod |
| 2016/0260044 A1 | 9/2016 | Sabet et al. |
| 2016/0306812 A1 | 10/2016 | McHenry et al. |
| 2016/0308812 A1 | 10/2016 | Johnstone et al. |
| 2016/0314132 A1 | 10/2016 | Lineberger et al. |
| 2016/0321583 A1 | 11/2016 | Jones et al. |
| 2016/0335686 A1 | 11/2016 | Athulurutlrumala et al. |
| 2016/0342968 A1 | 11/2016 | Margalit et al. |
| 2016/0350134 A1 | 12/2016 | Verweyst et al. |
| 2016/0350440 A1 | 12/2016 | Vaishnav et al. |
| 2016/0352530 A1 | 12/2016 | Andrews et al. |
| 2016/0357790 A1 | 12/2016 | Elkington et al. |
| 2016/0364427 A1 | 12/2016 | Wedgeworth, III |
| 2017/0017886 A1 | 1/2017 | Gao et al. |
| 2017/0019487 A1 | 1/2017 | Maheshwari et al. |
| 2017/0024484 A1 | 1/2017 | Qiu |
| 2017/0032042 A1 | 2/2017 | Rykowski et al. |
| 2017/0032186 A1 | 2/2017 | Murata et al. |
| 2017/0039286 A1 | 2/2017 | Walke et al. |
| 2017/0039296 A1 | 2/2017 | Bastide et al. |
| 2017/0039527 A1 | 2/2017 | Rangan |
| 2017/0046651 A1 | 2/2017 | Lin et al. |
| 2017/0048253 A1 | 2/2017 | Anton et al. |
| 2017/0048285 A1 | 2/2017 | Pearl et al. |
| 2017/0053244 A1 | 2/2017 | Khalil |
| 2017/0061552 A1 | 3/2017 | Young et al. |
| 2017/0075894 A1 | 3/2017 | Poornachandran et al. |
| 2017/0076321 A1 | 3/2017 | Reznek et al. |
| 2017/0091270 A1 | 3/2017 | Guo et al. |
| 2017/0091394 A1 | 3/2017 | Gurupur et al. |
| 2017/0091692 A1 | 3/2017 | Guo et al. |
| 2017/0093776 A1 | 3/2017 | Dixon |
| 2017/0111462 A1 | 4/2017 | Oberli et al. |
| 2017/0116552 A1 | 4/2017 | Deodhar et al. |
| 2017/0132229 A1 | 5/2017 | Parihar et al. |
| 2017/0132553 A1 | 5/2017 | Theirl et al. |
| 2017/0169041 A1 | 6/2017 | Vijayvergiya |
| 2017/0193420 A1 | 7/2017 | Tiwari |
| 2017/0206276 A1 | 7/2017 | Gill |
| 2017/0206557 A1 | 7/2017 | Abrol et al. |
| 2017/0213272 A1 | 7/2017 | Mowatt et al. |
| 2017/0249466 A1 | 8/2017 | Ben-Yair et al. |
| 2017/0262807 A1 | 9/2017 | Kolls |
| 2017/0264584 A1 | 9/2017 | Chatterjee et al. |
| 2017/0286480 A1 | 10/2017 | Xie et al. |
| 2017/0286526 A1 | 10/2017 | Bar-Or et al. |
| 2017/0295144 A1 | 10/2017 | Song et al. |
| 2017/0308974 A1 | 10/2017 | Adiga et al. |
| 2017/0316080 A1 | 11/2017 | Brisebois et al. |
| 2017/0323233 A1 | 11/2017 | Bencke et al. |
| 2017/0324767 A1 | 11/2017 | Srivastava |
| 2017/0331916 A1 | 11/2017 | Banatwala et al. |
| 2017/0332220 A1 | 11/2017 | Nordstrom et al. |
| 2017/0337199 A1 | 11/2017 | Kogan et al. |
| 2017/0337647 A1 | 11/2017 | Vaynshteyn |
| 2017/0344556 A1 | 11/2017 | Wu et al. |
| 2017/0353423 A1 | 12/2017 | Morrison et al. |
| 2017/0364580 A1 | 12/2017 | Ishitobi |
| 2017/0372268 A1 | 12/2017 | Ilan et al. |
| 2018/0004746 A1 | 1/2018 | Hedinsson et al. |
| 2018/0012139 A1 | 1/2018 | Schmid et al. |
| 2018/0025082 A1 | 1/2018 | Harik et al. |
| 2018/0025303 A1 | 1/2018 | Janz |
| 2018/0033025 A1 | 2/2018 | Sun et al. |
| 2018/0054720 A1 | 2/2018 | Messenger et al. |
| 2018/0060122 A1 | 3/2018 | Tang et al. |
| 2018/0060387 A1 | 3/2018 | Le et al. |
| 2018/0063265 A1 | 3/2018 | Crossley et al. |
| 2018/0082678 A1 | 3/2018 | Olmstead et al. |
| 2018/0091654 A1 | 3/2018 | Miller et al. |
| 2018/0096267 A1 | 4/2018 | Masekera et al. |
| 2018/0096271 A1 | 4/2018 | Raanani et al. |
| 2018/0097844 A1 | 4/2018 | Rao et al. |
| 2018/0101797 A1 | 4/2018 | Mueller et al. |
| 2018/0114177 A1 | 4/2018 | Somech et al. |
| 2018/0121520 A1 | 5/2018 | Degiere et al. |
| 2018/0131667 A1 | 5/2018 | Jain et al. |
| 2018/0150599 A1 | 5/2018 | Valdes et al. |
| 2018/0150783 A1 | 5/2018 | Xu et al. |
| 2018/0157739 A1 | 6/2018 | Khaitan et al. |

(56) References Cited

U.S. PATENT DOCUMENTS

| | | |
|---|---|---|
| 2018/0158007 A1 | 6/2018 | Frangeti |
| 2018/0165621 A1 | 6/2018 | Guo et al. |
| 2018/0173906 A1 | 6/2018 | Rodriguez et al. |
| 2018/0174085 A1 | 6/2018 | McCoy |
| 2018/0189356 A1 | 7/2018 | Ghafourifar et al. |
| 2018/0219818 A1 | 8/2018 | Kramer et al. |
| 2018/0219830 A1 | 8/2018 | O'Brien et al. |
| 2018/0225051 A1 | 8/2018 | Vansa |
| 2018/0232680 A1 | 8/2018 | Hazime et al. |
| 2018/0246774 A1 | 8/2018 | Byrne |
| 2018/0262617 A1 | 9/2018 | Soundar |
| 2018/0268341 A1 | 9/2018 | Rini et al. |
| 2018/0268416 A1 | 9/2018 | Ponnusamy et al. |
| 2018/0285884 A1 | 10/2018 | Long |
| 2018/0285906 A1 | 10/2018 | Ng et al. |
| 2018/0288060 A1 | 10/2018 | Jackson et al. |
| 2018/0288455 A1 | 10/2018 | Baughman et al. |
| 2018/0300364 A1 | 10/2018 | Xu |
| 2018/0300387 A1 | 10/2018 | Nk |
| 2018/0308057 A1 | 10/2018 | Kenthapadi et al. |
| 2018/0315062 A1 | 11/2018 | Parekh et al. |
| 2018/0322461 A1 | 11/2018 | Subedi et al. |
| 2018/0322553 A1 | 11/2018 | Gupta et al. |
| 2018/0330334 A1 | 11/2018 | Gowru et al. |
| 2018/0332162 A1 | 11/2018 | Schutter et al. |
| 2018/0349482 A1 | 12/2018 | Oliner et al. |
| 2018/0365309 A1 | 12/2018 | Oliner et al. |
| 2018/0373696 A1 | 12/2018 | Terry et al. |
| 2018/0374171 A1 | 12/2018 | Aizen et al. |
| 2019/0007362 A1 | 1/2019 | Shmunis et al. |
| 2019/0018546 A1 | 1/2019 | Kwizera et al. |
| 2019/0026681 A1 | 1/2019 | Polli et al. |
| 2019/0028492 A1 | 1/2019 | Coleman et al. |
| 2019/0057339 A1 | 2/2019 | Ponnusamy et al. |
| 2019/0066021 A1 | 2/2019 | Tang et al. |
| 2019/0068747 A1 | 2/2019 | Lervik et al. |
| 2019/0079934 A1 | 3/2019 | Liao et al. |
| 2019/0080358 A1 | 3/2019 | Robinson et al. |
| 2019/0087764 A1 | 3/2019 | Bhushanam et al. |
| 2019/0089701 A1 | 3/2019 | Mercury et al. |
| 2019/0089829 A1 | 3/2019 | Nicholls et al. |
| 2019/0095961 A1 | 3/2019 | Wu et al. |
| 2019/0098364 A1 | 3/2019 | Sansom et al. |
| 2019/0108493 A1 | 4/2019 | Nelson et al. |
| 2019/0121998 A1 | 4/2019 | Vanderleest |
| 2019/0122322 A1 | 4/2019 | Perez |
| 2019/0124026 A1 | 4/2019 | Geva et al. |
| 2019/0130037 A1 | 5/2019 | Guo et al. |
| 2019/0138635 A1 | 5/2019 | Givon |
| 2019/0140988 A1 | 5/2019 | Snider et al. |
| 2019/0140995 A1 | 5/2019 | Roller et al. |
| 2019/0163824 A1 | 5/2019 | Pal et al. |
| 2019/0164179 A1 | 5/2019 | Sun et al. |
| 2019/0171693 A1 | 6/2019 | Dotan-Cohen et al. |
| 2019/0199677 A1 | 6/2019 | Bajaria et al. |
| 2019/0199745 A1 | 6/2019 | Jakobsson et al. |
| 2019/0207876 A1 | 7/2019 | Terry et al. |
| 2019/0228365 A1 | 7/2019 | Kamath |
| 2019/0236199 A1* | 8/2019 | Mahalingam ............ G06F 9/542 |
| 2019/0236511 A1 | 8/2019 | Xu et al. |
| 2019/0236516 A1 | 8/2019 | Ponnusamy |
| 2019/0295106 A1* | 9/2019 | Davar .................... G06F 16/951 |
| 2019/0364154 A1 | 11/2019 | Hermanek et al. |
| 2020/0034718 A1 | 1/2020 | Beedu et al. |
| 2020/0125669 A1 | 4/2020 | Subedi |
| 2020/0302116 A1 | 9/2020 | Rogynskyy et al. |
| 2020/0304448 A1 | 9/2020 | Zhang et al. |
| 2020/0349178 A1 | 11/2020 | Raju |
| 2021/0157312 A1 | 5/2021 | Cella et al. |
| 2022/0138191 A1 | 5/2022 | Hermanek et al. |

FOREIGN PATENT DOCUMENTS

| | | |
|---|---|---|
| WO | WO-2016/016752 A1 | 2/2016 |
| WO | WO-2017/050991 A1 | 3/2017 |
| WO | WO-2018/064662 | 4/2018 |
| WO | WO-2018/081827 A1 | 5/2018 |

OTHER PUBLICATIONS

Non-Final Office Action on U.S. Appl. No. 16/360,892 dated Mar. 16, 2023.

Non-Final Office Action on U.S. Appl. No. 16/418,836 dated Dec. 8, 2022.

Non-Final Office Action on U.S. Appl. No. 16/421,280 dated Mar. 9, 2023.

Non-Final Office Action on U.S. Appl. No. 17/113,843 dated Mar. 10, 2023.

Non-Final Office Action on U.S. Appl. No. 17/361,094 dated Dec. 14, 2022.

Non-Final Office Action on U.S. Appl. No. 17/683,240 dated Mar. 2, 2023.

Non-Final Office Action on U.S. Appl. No. 17/683,245 dated Feb. 16, 2023.

Non-Final Office Action on U.S. Appl. No. 17/694,198 dated Feb. 8, 2023.

Non-Final Office Action on U.S. Appl. No. 17/700,233 dated Dec. 21, 2022.

Non-Final Office Action on U.S. Appl. No. 17/888,244 dated Mar. 24, 2023.

Non-Final Office Action on U.S. Appl. No. 17/953,220 dated Apr. 11, 2023.

Non-Final Office Action on U.S. Appl. No. 17/958,769 dated Mar. 16, 2023.

Non-Final Office Action on U.S. Appl. No. 17/962,477 dated Mar. 16, 2023.

Notice of Allowance on U.S. Appl. No. 16/418,747 dated Dec. 21, 2022.

Notice of Allowance on U.S. Appl. No. 17/014,176 dated Dec. 21, 2022.

Notice of Allowance on U.S. Appl. No. 17/102,397 dated Jan. 19, 2023.

Notice of Allowance on U.S. Appl. No. 17/175,982 dated Apr. 17, 2023.

Notice of Allowance on U.S. Appl. No. 17/504,394 dated Mar. 3, 2023.

"Node Profile Electronic Activity Account Policy Filtering Parsing Remove Subset" Google Search.

Andrews-Todd, Jessica, et al. "Identifying Profiles of Collaborative Problem Solvers in an Online Electronics Environment." International Educational Data Mining Society (2018). (Year: 2018).

Aviso. AI-Driven Forecasting and Pipeline Management. Feb. 24, 2018. <https://web.archive.org/web/20180224123501/https://www.aviso.com/>. (6 pages).

DataSelf BI. "5 Analytics for Sales: Demo for Salespeople—DataSelf / Tableau", Dec. 13, 2017. <https://www.youtube.com/watch?v= B01hgTQ_SwM>. (1 page).

DataSelf. Oct. 15, 2017. <https://web.archive.org/web/20171015213907 /https://dataself.com/>. (1 page).

DealSheet. Increase Win Rates, Exceed Quota: Outside in DealSheet and AccountPlan. Feb. 25, 2018. <https://www.youtube.com/ watch?v=krgRrzmViDg>. (1 page).

Destefano et al., "Improving Data Governance in Large Organizations through Ontology and Linked Data," 2016 IEEE 3rd International Conference on Cyber Security and Cloud Computing (CSCloud) Year: 2016 | Conference Paper | Publisher: IEEE.

Destefano et al., "Improving Data Governance in Large Organizations through Ontology and Linked Data," 2016 IEEE 3rd International Conference on Cyber Security and Cloud Computing (CSCloud), May 6, 2016, IEEE, Conference Paper.

Final Office Action on U.S. Appl. No. 16/360,892 dated Aug. 30, 2022.

(56) References Cited

OTHER PUBLICATIONS

Final Office Action on U.S. Appl. No. 16/371,049 dated May 2, 2022.
Final Office Action on U.S. Appl. No. 16/418,836 dated Nov. 23, 2021.
Final Office Action on U.S. Appl. No. 16/420,059 dated Jan. 19, 2021.
Final Office Action on U.S. Appl. No. 16/421,280 dated Jul. 21, 2022.
Final Office Action on U.S. Appl. No. 16/695,082 dated Dec. 3, 2020.
Final Office Action on U.S. Appl. No. 16/360,892 dated May 19, 2020 (38 pages).
Final Office Action on U.S. Appl. No. 16/371,035 dated Jan. 15, 2020 (20 pages).
Final Office Action on U.S. Appl. No. 16/371,049 dated Mar. 10, 2020 (32 pages).
Final Office Action on U.S. Appl. No. 16/371,049 dated May 21, 2021.
Final Office Action on U.S. Appl. No. 16/371,050 dated Apr. 13, 2020 (10 pages).
Final Office Action on U.S. Appl. No. 16/398,150 dated Mar. 5, 2020 (22 pages).
Final Office Action on U.S. Appl. No. 16/399,690 dated Jan. 9, 2020 (14 pages).
Final Office Action on U.S. Appl. No. 16/399,768 dated Apr. 15, 2020 (9 pages).
Final Office Action on U.S. Appl. No. 16/418,725 dated Apr. 20, 2020 (27 pages).
Final Office Action on U.S. Appl. No. 16/418,747 dated Mar. 19, 2020 (18 pages).
Final Office Action on U.S. Appl. No. 16/418,807 dated Jan. 3, 2020 (24 pages).
Final Office Action on U.S. Appl. No. 16/418,836 dated Mar. 30, 2020 (17 pages).
Final Office Action on U.S. Appl. No. 16/418,851 dated Mar. 23, 2020 (21 pages).
Final Office Action on U.S. Appl. No. 16/418,867 dated Mar. 12, 2020 (31 pages).
Final Office Action on U.S. Appl. No. 16/418,892 dated Apr. 17, 2020 (34 pages).
Final Office Action on U.S. Appl. No. 16/421,280 dated Feb. 28, 2020 (48 pages).
Foreign Action other than Search Report on PCT PCT/US2019/034033 dated Dec. 3, 2020.
Foreign Action other than Search Report on PCT PCT/US2019/034042 dated Dec. 3, 2020.
Foreign Action other than Search Report on PCT PCT/US2019/034046 dated Dec. 4, 2020.
Foreign Action other than Search Report on PCT PCT/US2019/034062 dated Dec. 3, 2020.
Foreign Action other than Search Report on PCT PCT/US2019/034068 dated Dec. 3, 2020.
Foreign Action other than Search Report on US PCT/US2019/034052 dated Dec. 3, 2020.
Foreign Search Report on PCT PCT/US2019/034045 dated Dec. 3, 2020.
Garysmithpartnership. "12 Must-Have Salesforce Dashboard Charts | With Video and Examples", May 7, 2017. <https:// web.archive.org/web/20170507121801 /http://garysmithpartnership.com:80/salesforce-dashboards>. (27 pages).
Heng et al., "Integrated analytics system for electric industry asset management," IBM Journal of Research and Development Jan. 1, 2016, vol. 60, Issue: 1, Journal Article, IBM.
Heng et al., "Integrated analytics system for electric industry asset management," IBM Journal of Research and Development Year: 2016 | vol. 60, Issue: 1 | Journal Article | Publisher: IBM.
http://download.microsoft.com/download/D/1/0/D10ACD6B-0C91-4545-9BD8-2AE431ECF749/Microsoft_Dynamics_CRM_2016_User_Guide.pdf.
https://help.salesforce.com/s/articleView?id=release-notes.salesforce_release_notes.htm&type=5&release=206.
https://help.salesforce.com/s/articleView?id=release-notes.salesforce_release_notes.htm&type=5&release=210.
https://pages.clari.com/rs/866-BBG-005/images/Clari-SB-AI-Applications-for-Sales-0917.pdf, Feb. 5, 2018. (9 pages).
https://scholar.google.com/scholar?as_q=%28first name%29 and %28last name%29 and %28contact%29 and%28email%29 and %28phone%. dated Dec. 12, 2019 (2 pages).
IEEE Xplore Search Results, dated Jan. 7, 2020 (3 pages).
Insight Squared. 7 Sales Dashboard Examples and Templates. Jul. 5, 2017. <https://web.archive.org/web/20170705225032/https: //www.insightsquared.com/2015/09/7-sales-dashboard-examples-and-templates/>. (10 pages).
International Search Report and Written Opinion of the International Searching Authority on PCT PCT/US2019/034030 dated Sep. 30, 2019 (14 pages).
International Search Report and Written Opinion of the International Searching Authority on PCT PCT/US2019/034033 dated Sep. 30, 2019 (16 pages).
International Search Report and Written Opinion of the International Searching Authority on PCT PCT/US2019/034042 dated Sep. 30, 2019 (14 pages).
International Search Report and Written Opinion of the International Searching Authority on PCT PCT/US2019/034045 dated Sep. 30, 2019 (16 pages).
International Search Report and Written Opinion of the International Searching Authority on PCT PCT/US2019/034046 dated Sep. 30, 2019 (14 pages).
International Search Report and Written Opinion of the International Searching Authority on PCT PCT/US2019/034050 dated Sep. 30, 2019 (15 pages).
International Search Report and Written Opinion of the International Searching Authority on PCT PCT/US2019/034052 dated Sep. 30, 2019 (16 pages).
International Search Report and Written Opinion of the International Searching Authority on PCT PCT/US2019/034062 dated Sep. 30, 2019 (14 pages).
International Search Report and Written Opinion of the International Searching Authority on PCT PCT/US2019/034068 dated Sep. 30, 2019 (14 pages).
International Search Report and Written Opinion of the International Searching Authority on PCT PCT/US2019/034070 dated Sep. 30, 2019 (14 pages).
Klipfolio. Dashboard software for teams who want to continuously monitor the health of their business. May 30, 2017. <https://web.archive.org/web/20170530091735/https://www.kl ipfolio.com/>. (1 page).
Mahmud, et al.; "Home Location Identification of Twitter users"; arXiv:1403.2345; Dated Mar. 7, 2014.(23 pages).
Nexd. Nexd Rebrands as Olona; Announces General Availability of Industry's First Proactive Enterprise Sales Tool. Sep. 18, 2017. <https://www.newswire.com/news/nexd-rebrands-as-olono-announces-general-avai lability-of-industrys-19943271 >. (4 pages).
Non Final Office Action on U.S. Appl. No. 16/708,247 dated May 21, 2021.
Non-Final Office Action on U.S. Appl. No. 16/418,892 dated Jan. 1, 2021.
Non-Final Office Action on U.S. Appl. No. 16/360,892 dated Feb. 3, 2022.
Non-Final Office Action on U.S. Appl. No. 16/360,892 dated Apr. 21, 2021.
Non-Final Office Action on U.S. Appl. No. 16/360,953 dated Jan. 27, 2021.
Non-Final Office Action on U.S. Appl. No. 16/371,049 dated Sep. 23, 2020.
Non-Final Office Action on U.S. Appl. No. 16/371,049 dated Oct. 21, 2021.
Non-Final Office Action on U.S. Appl. No. 16/399,768 dated Nov. 20, 2020.
Non-Final Office Action on U.S. Appl. No. 16/418,725 dated Mar. 4, 2021.

(56) References Cited

OTHER PUBLICATIONS

Non-Final Office Action on U.S. Appl. No. 16/418,747 dated Jan. 27, 2021.
Non-Final Office Action on U.S. Appl. No. 16/418,747 dated Feb. 25, 2022.
Non-Final Office Action on U.S. Appl. No. 16/418,836 dated Apr. 2, 2021.
Non-Final Office Action on U.S. Appl. No. 16/420,059 dated Jul. 10, 2020.
Non-Final Office Action on U.S. Appl. No. 16/421,280 dated Oct. 16, 2020.
Non-Final Office Action on U.S. Appl. No. 16/421,280 dated Nov. 9, 2021.
Non-Final Office Action on U.S. Appl. No. 16/694,253 dated Oct. 28, 2021.
Non-Final Office Action on U.S. Appl. No. 16/700,484 dated Oct. 28, 2021.
Non-Final Office Action on U.S. Appl. No. 16/700,510 dated Feb. 16, 2021.
Non-Final Office Action on U.S. Appl. No. 16/708,257 dated Jul. 12, 2021.
Non-Final Office Action on U.S. Appl. No. 16/716,221 dated Oct. 4, 2021.
Non-Final Office Action on U.S. Appl. No. 16/773,363 dated Jun. 28, 2021.
Non-Final Office Action on U.S. Appl. No. 16/877,078 dated Jun. 9, 2021.
Non-Final Office Action on U.S. Appl. No. 16/895,946 dated Oct. 14, 2021.
Non-Final Office Action on U.S. Appl. No. 17/014,176 dated Aug. 15, 2022.
Non-Final Office Action on U.S. Appl. No. 17/102,387 dated Sep. 23, 2022.
Non-Final Office Action on U.S. Appl. No. 17/102,397 dated May 18, 2022.
Non-Final Office Action on U.S. Appl. No. 17/157,471 dated Mar. 25, 2022.
Non-Final Office Action on U.S. Appl. No. 17/175,982 dated Sep. 23, 2022.
Non-Final Office Action on U.S. Appl. No. 17/504,394 dated Oct. 14, 2022.
Non-Final Office Action on U.S. Appl. No. 16/237,585 dated Apr. 25, 2019 (12 pages).
Non-Final Office Action on U.S. Appl. No. 16/360,892 dated Aug. 28, 2019 (34 pages).
Non-Final Office Action on U.S. Appl. No. 16/361,009 dated Jul. 11, 2019 (14 pages).
Non-Final Office Action on U.S. Appl. No. 16/361,025 dated Jul. 25, 2019 (19 pages).
Non-Final Office Action on U.S. Appl. No. 16/371,035 dated Jul. 9, 2019 (22 pages).
Non-Final Office Action on U.S. Appl. No. 16/371,048 dated Jul. 8, 2019 (12 pages).
Non-Final Office Action on U.S. Appl. No. 16/371,049 dated Jun. 10, 2019 (27 pages).
Non-Final Office Action on U.S. Appl. No. 16/371,050 dated Jun. 26, 2019 (8 pages).
Non-Final Office Action on U.S. Appl. No. 16/398,150 dated Jul. 26, 2019 (14 pages).
Non-Final Office Action on U.S. Appl. No. 16/398,220 dated Jul. 25, 2019 (13 pages).
Non-Final Office Action on U.S. Appl. No. 16/399,690 dated Jun. 28, 2019 (13 pages).
Non-Final Office Action on U.S. Appl. No. 16/399,768 dated Jun. 27, 2019 (8 pages).
Non-Final Office Action on U.S. Appl. No. 16/418,539 dated Aug. 22, 2019 (11 pages).
Non-Final Office Action on U.S. Appl. No. 16/418,725 dated Aug. 15, 2019 (24 pages).
Non-Final Office Action on U.S. Appl. No. 16/418,747 dated Aug. 8, 2019 (16 pages).
Non-Final Office Action on U.S. Appl. No. 16/418,807 dated Jul. 25, 2019 (23 pages).
Non-Final Office Action on U.S. Appl. No. 16/418,826 dated Jul. 17, 2019 (9 pages).
Non-Final Office Action on U.S. Appl. No. 16/418,836 dated Jul. 29, 2019 (13 pages).
Non-Final Office Action on U.S. Appl. No. 16/418,846 dated Jun. 28, 2019 (17 pages).
Non-Final Office Action on U.S. Appl. No. 16/418,851 dated Jul. 10, 2019 (17 pages).
Non-Final Office Action on U.S. Appl. No. 16/418,867 dated Aug. 16, 2019 (26 pages).
Non-Final Office Action on U.S. Appl. No. 16/418,892 dated Aug. 28, 2019 (28 pages).
Non-Final Office Action on U.S. Appl. No. 16/420,052 dated Aug. 7, 2019 (11 pages).
Non-Final Office Action on U.S. Appl. No. 16/421,151 dated Aug. 2, 2019 (24 pages).
Non-Final Office Action on U.S. Appl. No. 16/421,280 dated Aug. 19, 2019 (35 pages).
Non-Final Office Action on U.S. Appl. No. 16/421,298 dated Aug. 6, 2019 (7 pages).
Non-Final Office Action on U.S. Appl. No. 16/421,328 dated Jul. 25, 2019 (16 pages).
Non-Final Office Action on U.S. Appl. No. 16/421,370 dated Aug. 23, 2019 (11 pages).
Non-Final Office Action on U.S. Appl. No. 16/695,082 dated Feb. 24, 2020 (18 pages).
Notice of Allowance in regards to U.S. Appl. No. 16/725,705 dated May 26, 2021.
Notice of Allowance on U.S. Appl. No. 16/792,676 dated Dec. 30, 2021.
Notice of Allowance on U.S. Appl. No. 17/129,213 dated Oct. 21, 2022.
Notice of Allowance on U.S. Appl. No. 16/360,953 dated Jan. 4, 2022.
Notice of Allowance on U.S. Appl. No. 16/360,953 dated Jul. 28, 2021.
Notice of Allowance on U.S. Appl. No. 16/361,025 dated Feb. 10, 2021.
Notice of Allowance on U.S. Appl. No. 16/371,035 dated Aug. 26, 2020.
Notice of Allowance on U.S. Appl. No. 16/371,035 dated Nov. 9, 2020.
Notice of Allowance on U.S. Appl. No. 16/398,150 dated Jul. 22, 2020.
Notice of Allowance on U.S. Appl. No. 16/398,150 dated Aug. 18, 2020.
Notice of Allowance on U.S. Appl. No. 16/398,150 dated Nov. 18, 2020.
Notice of Allowance on U.S. Appl. No. 16/398,220 dated Aug. 19, 2020.
Notice of Allowance on U.S. Appl. No. 16/398,220 dated Nov. 12, 2020.
Notice of Allowance on U.S. Appl. No. 16/399,690 dated Aug. 12, 2020.
Notice of Allowance on U.S. Appl. No. 16/399,690 dated Nov. 12, 2020.
Notice of Allowance on U.S. Appl. No. 16/418,807 dated Jan. 12, 2021.
Notice of Allowance on U.S. Appl. No. 16/418,807 dated Nov. 20, 2020.
Notice of Allowance on U.S. Appl. No. 16/418,851 dated Jan. 11, 2021.
Notice of Allowance on U.S. Appl. No. 16/418,851 dated Feb. 1, 2021.
Notice of Allowance on U.S. Appl. No. 16/418,867 dated Sep. 23, 2020.
Notice of Allowance on U.S. Appl. No. 16/418,867 dated Nov. 13, 2020.

(56) References Cited

OTHER PUBLICATIONS

Notice of Allowance on U.S. Appl. No. 16/418,892 dated Apr. 6, 2022.
Notice of Allowance on U.S. Appl. No. 16/418,892 dated Jul. 20, 2022.
Notice of Allowance on U.S. Appl. No. 16/418,892 dated Dec. 13, 2021.
Notice of Allowance on U.S. Appl. No. 16/420,059 dated Jan. 14, 2022.
Notice of Allowance on U.S. Appl. No. 16/420,059 dated Apr. 6, 2021.
Notice of Allowance on U.S. Appl. No. 16/694,253 dated Jun. 14, 2022.
Notice of Allowance on U.S. Appl. No. 16/695,082 dated Mar. 26, 2021.
Notice of Allowance on U.S. Appl. No. 16/700,484 dated May 31, 2022.
Notice of Allowance on U.S. Appl. No. 16/700,498 dated Mar. 2, 2022.
Notice of Allowance on U.S. Appl. No. 16/700,510 dated Oct. 6, 2021.
Notice of Allowance on U.S. Appl. No. 16/708,247 dated Dec. 16, 2021.
Notice of Allowance on U.S. Appl. No. 16/708,257 dated Mar. 1, 2022.
Notice of Allowance on U.S. Appl. No. 16/708,257 dated Jul. 15, 2022.
Notice of Allowance on U.S. Appl. No. 16/716,221 dated Jun. 30, 2022.
Notice of Allowance on U.S. Appl. No. 16/773,363 dated Jan. 11, 2022.
Notice of Allowance on U.S. Appl. No. 16/792,676 dated Apr. 27, 2022.
Notice of Allowance on U.S. Appl. No. 16/877,016 dated Oct. 6, 2020.
Notice of Allowance on U.S. Appl. No. 16/877,016 dated Nov. 17, 2020.
Notice of Allowance on U.S. Appl. No. 16/877,078 dated May 4, 2022.
Notice of Allowance on U.S. Appl. No. 16/877,078 dated Aug. 24, 2022.
Notice of Allowance on U.S. Appl. No. 16/877,078 dated Nov. 24, 2021.
Notice of Allowance on U.S. Appl. No. 16/895,946 dated May 18, 2022.
Notice of Allowance on U.S. Appl. No. 16/895,946 dated Aug. 24, 2022.
Notice of Allowance on U.S. Appl. No. 17/102,379 dated Jul. 13, 2022.
Notice of Allowance on U.S. Appl. No. 17/129,213 dated Jul. 5, 2022.
Notice of Allowance on U.S. Appl. No. 17/157,471 dated Sep. 8, 2022.
Notice of Allowance on U.S. Appl. No. 16/399,679 dated Jun. 26, 2019 (20 pages).
Notice of Allowance on U.S. Appl. No. 16/213,754 dated Aug. 15, 2019 (8 pages).
Notice of Allowance on U.S. Appl. No. 16/213,754 dated Mar. 11, 2019 (33 pages).
Notice of Allowance on U.S. Appl. No. 16/213,754 dated Nov. 14, 2019 (9 pages).
Notice of Allowance on U.S. Appl. No. 16/237,579 dated Apr. 10, 2019 (16 pages).
Notice of Allowance on U.S. Appl. No. 16/237,579 dated Dec. 18, 2019 (12 pages).
Notice of Allowance on U.S. Appl. No. 16/237,579 dated Sep. 26, 2019 (13 pages).
Notice of Allowance on U.S. Appl. No. 16/237,580 dated Apr. 24, 2019 (16 pages).
Notice of Allowance on U.S. Appl. No. 16/237,580 dated Dec. 12, 2019 (11 pages).
Notice of Allowance on U.S. Appl. No. 16/237,580 dated Jul. 25, 2019 (15 pages).
Notice of Allowance on U.S. Appl. No. 16/237,580 dated Jun. 21, 2019 (13 pages).
Notice of Allowance on U.S. Appl. No. 16/237,580 dated Nov. 6, 2019 (11 pages).
Notice of Allowance on U.S. Appl. No. 16/237,582 dated Apr. 2, 2019 (16 pages).
Notice of Allowance on U.S. Appl. No. 16/237,582 dated Aug. 21, 2019 (7 pages).
Notice of Allowance on U.S. Appl. No. 16/237,582 dated Oct. 17, 2019 (2 pages).
Notice of Allowance on U.S. Appl. No. 16/237,585 dated Nov. 13, 2019 (8 pages).
Notice of Allowance on U.S. Appl. No. 16/360,866 dated Aug. 27, 2019 (9 pages).
Notice of Allowance on U.S. Appl. No. 16/360,866 dated Jun. 5, 2019 (17 pages).
Notice of Allowance on U.S. Appl. No. 16/360,866 dated Oct. 25, 2019 (2 pages).
Notice of Allowance on U.S. Appl. No. 16/360,884 dated Aug. 14, 2019 (8 pages).
Notice of Allowance on U.S. Appl. No. 16/360,884 dated Jun. 11, 2019 (12 pages).
Notice of Allowance on U.S. Appl. No. 16/360,884 dated Nov. 18, 2019 (3 pages).
Notice of Allowance on U.S. Appl. No. 16/360,933 dated Aug. 12, 2019 (8 pages).
Notice of Allowance on U.S. Appl. No. 16/360,933 dated Jun. 19, 2019 (17 pages).
Notice of Allowance on U.S. Appl. No. 16/360,933 dated Nov. 22, 2019 (4 pages).
Notice of Allowance on U.S. Appl. No. 16/360,960 dated Aug. 23, 2019 (7 pages).
Notice of Allowance on U.S. Appl. No. 16/360,960 dated May 13, 2019 (9 pages).
Notice of Allowance on U.S. Appl. No. 16/360,997 dated Aug. 9, 2019 (8 pages).
Notice of Allowance on U.S. Appl. No. 16/360,997 dated May 30, 2019 (23 pages).
Notice of Allowance on U.S. Appl. No. 16/361,009 dated Feb. 25, 2020 (10 pages).
Notice of Allowance on U.S. Appl. No. 16/361,009 dated Mar. 27, 2020 (2 pages).
Notice of Allowance on U.S. Appl. No. 16/361,009 dated May 4, 2020 (2 pages).
Notice of Allowance on U.S. Appl. No. 16/361,025 dated Apr. 29, 2020 (7 pages).
Notice of Allowance on U.S. Appl. No. 16/371,035 dated May 4, 2020 (10 pages).
Notice of Allowance on U.S. Appl. No. 16/371,037 dated Aug. 1, 2019 (12 pages).
Notice of Allowance on U.S. Appl. No. 16/371,037 dated Oct. 21, 2019 (7 pages).
Notice of Allowance on U.S. Appl. No. 16/371,039 dated Aug. 21, 2019 (17 pages).
Notice of Allowance on U.S. Appl. No. 16/371,041 dated Jul. 31, 2019 (10 pages).
Notice of Allowance on U.S. Appl. No. 16/371,042 dated Aug. 13, 2019 (19 pages).
Notice of Allowance on U.S. Appl. No. 16/371,044 dated Aug. 7, 2019 (5 pages).
Notice of Allowance on U.S. Appl. No. 16/371,044 dated Jun. 12, 2019 (16 pages).
Notice of Allowance on U.S. Appl. No. 16/371,044 dated Nov. 18, 2019 (5 pages).
Notice of Allowance on U.S. Appl. No. 16/371,048 dated Apr. 16, 2020 (2 pages).
Notice of Allowance on U.S. Appl. No. 16/371,048 dated Jan. 17, 2020 (5 pages).

(56) References Cited

OTHER PUBLICATIONS

Notice of Allowance on U.S. Appl. No. 16/371,048 dated Mar. 20, 2020 (2 pages).
Notice of Allowance on U.S. Appl. No. 16/398,153 dated Jul. 17, 2019 (27 pages).
Notice of Allowance on U.S. Appl. No. 16/398,157 dated Aug. 21, 2019 (19 pages).
Notice of Allowance on U.S. Appl. No. 16/398,157 dated Nov. 6, 2019 (2 pages).
Notice of Allowance on U.S. Appl. No. 16/398,220 dated Dec. 12, 2019 (13 pages).
Notice of Allowance on U.S. Appl. No. 16/398,260 dated Aug. 14, 2019 (17 pages).
Notice of Allowance on U.S. Appl. No. 16/399,679 dated Oct. 15, 2019 (2 pages).
Notice of Allowance on U.S. Appl. No. 16/399,679 dated Oct. 25, 2019 (2 pages).
Notice of Allowance on U.S. Appl. No. 16/399,679 dated Sep. 5, 2019 (2 pages).
Notice of Allowance on U.S. Appl. No. 16/399,690 dated Apr. 22, 2020 (8 pages).
Notice of Allowance on U.S. Appl. No. 16/399,706 dated Jun. 27, 2019 (17 pages).
Notice of Allowance on U.S. Appl. No. 16/399,706 dated Oct. 30, 2019 (2 pages).
Notice of Allowance on U.S. Appl. No. 16/399,787 dated Jul. 25, 2019 (21 pages).
Notice of Allowance on U.S. Appl. No. 16/399,787 dated Oct. 29, 2019 (2 pages).
Notice of Allowance on U.S. Appl. No. 16/400,000 dated Jun. 18, 2019 (17 pages).
Notice of Allowance on U.S. Appl. No. 16/400,000 dated Oct. 24, 2019 (2 pages).
Notice of Allowance on U.S. Appl. No. 16/418,539 dated Apr. 20, 2020 (2 pages).
Notice of Allowance on U.S. Appl. No. 16/418,539 dated Mar. 20, 2020 (10 pages).
Notice of Allowance on U.S. Appl. No. 16/418,539 dated May 5, 2020 (2 pages).
Notice of Allowance on U.S. Appl. No. 16/418,629 dated Aug. 15, 2019 (20 pages).
Notice of Allowance on U.S. Appl. No. 16/418,629 dated Oct. 21, 2019 (2 pages).
Notice of Allowance on U.S. Appl. No. 16/418,769 dated Aug. 16, 2019 (20 pages).
Notice of Allowance on U.S. Appl. No. 16/418,769 dated Oct. 23, 2019 (5 pages).
Notice of Allowance on U.S. Appl. No. 16/418,826 dated Jan. 21, 2020 (6 pages).
Notice of Allowance on U.S. Appl. No. 16/418,846 dated Feb. 6, 2020 (8 pages).
Notice of Allowance on U.S. Appl. No. 16/418,846 dated May 5, 2020 (3 pages).
Notice of Allowance on U.S. Appl. No. 16/418,891 dated Aug. 6, 2019 (10 pages).
Notice of Allowance on U.S. Appl. No. 16/418,891 dated Nov. 1, 2019 (2 pages).
Notice of Allowance on U.S. Appl. No. 16/419,583 dated Feb. 7, 2020 (19 pages).
Notice of Allowance on U.S. Appl. No. 16/420,039 dated Aug. 7, 2019 (10 pages).
Notice of Allowance on U.S. Appl. No. 16/420,039 dated Nov. 26, 2019 (2 pages).
Notice of Allowance on U.S. Appl. No. 16/420,052 dated Apr. 8, 2020 (2 pages).
Notice of Allowance on U.S. Appl. No. 16/420,052 dated Dec. 30, 2019 (5 pages).
Notice of Allowance on U.S. Appl. No. 16/420,052 dated Mar. 26, 2020 (2 pages).
Notice of Allowance on U.S. Appl. No. 16/421,256 dated Sep. 25, 2019 (14 pages).
Notice of Allowance on U.S. Appl. No. 16/421,288 dated Aug. 16, 2019 (19 pages).
Notice of Allowance on U.S. Appl. No. 16/421,288 dated Oct. 30, 2019 (2 pages).
Notice of Allowance on U.S. Appl. No. 16/421,298 dated Aug. 26, 2019 (14 pages).
Notice of Allowance on U.S. Appl. No. 16/421,298 dated Oct. 22, 2019 (3 pages).
Notice of Allowance on U.S. Appl. No. 16/421,298 dated Oct. 28, 2019 (3 pages).
Notice of Allowance on U.S. Appl. No. 16/421,324 dated Aug. 14, 2019 (22 pages).
Notice of Allowance on U.S. Appl. No. 16/421,324 dated Nov. 1, 2019 (2 pages).
Notice of Allowance on U.S. Appl. No. 16/421,328 dated Feb. 5, 2020 (9 pages).
Notice of Allowance on U.S. Appl. No. 16/421,370 dated Apr. 13, 2020 (2 pages).
Notice of Allowance on U.S. Appl. No. 16/421,370 dated Apr. 22, 2020 (2 pages).
Notice of Allowance on U.S. Appl. No. 16/421,370 dated Feb. 10, 2020 (9 pages).
Notice of Allowance on U.S. Appl. No. 16/694,274 dated Feb. 7, 2020 (20 pages).
Notice of Allowance on U.S. Appl. No. 16/694,274 dated May 7, 2020 (2 pages).
Notice of Allowance re U.S. Appl. No. 16/148,892 dated Aug. 24, 2021.
Olona. Olono's Sales activity management system to increase average quota attainment. Feb. 18, 2018. <https://www.youtube.com/ watch?v=3OtqtBPIM7M&t=1s>. (1 page).
*People.ai* v *Clari*—complaint ND Cal.
*People.ai* v *Clari*—document 19 Answering brief.
*People.ai* v *Clari*—document 21 first amended complaint.
*People.ai* v *Clari*—document 24 reply brief.
*People.ai* v *Clari*—document 27 answer to amended complaint.
*People.ai* v *Clari*—document 30 answer by plaintiff.
*People.ai* v *Clari*—document 45 statement of co-pending proceedings.
*People.ai* v *Clari*—document 53 Defendant 12c motion.
*People.ai* v *Clari*—document 56 Joint stipulation to extend briefing schedule for Defendant's motion for judgement on the pleadings.
*People.ai* v *Clari*—document 58 Plaintiff's response to Defendant's motion for judgement on the pleadings.
*People.ai* v *Clari*—document 58-01 Exhibit A.
*People.ai* v *Clari*—document 61 Defendant's reply in support of motion for judgement on the pleadings.
*People.ai* v *Clari*—document 64 Plaintiff's motion for leave to file second amended complaint.
*People.ai* v *Clari*—document 64-01 Plaintiff's brief in support of motion for leave to file second amended complaint.
*People.ai* v *Clari*—document 64-02 Declaration of L.Silva in support of Plaintiff's motion for leave to file a second amended complaint.
*People.ai* v *Clari*—document 64-03 Exhibit 1.
*People.ai* v *Clari*—document 64-04 Exhibit 2.
*People.ai* v *Clari*—document 8 Motion to dismiss.
*People.ai* v *Clari*—document 9 opening brief.
*People.ai* v *SetSail*—document 1 complaint ND Cal.
*People.ai* v *SetSail*—document 100 plaintiff's response to defendant's motion for judgement on the pleadings.
*People.ai* v *SetSail*—document 101-00 Declaration of Lucas Silva in support of plaintiff's opposition to defendant's motion for judgement on the pleadings.
*People.ai* v *SetSail*—document 101-01 Exhibit A.
*People.ai* v *SetSail*—document 102 Defendant's reply supporting its motion for judgement on the pleadings pursuant to FRCP12.
*People.ai* v *SetSail*—document 105 Letter from People.ai to Judge.
*People.ai* v *SetSail*—document 112 Plaintiff's motion to file certain documents under seal.

(56) References Cited

OTHER PUBLICATIONS

*People.ai* v *SetSail*—document 112-01 Declaration of L. Silva in support of Plaintiff's motion to file certain documents under seal.
*People.ai* v *SetSail*—document 112-19 Plaintiff's "Patent Showdown" motion for summary judgment.
*People.ai* v *SetSail*—document 114-00 Defendant's motion for partial summary judgement.
*People.ai* v *SetSail*—document 114-01 Declaration of S.Chatterjee in support of Defendant's motion for partial summary judgement.
*People.ai* v *SetSail*—document 114-02 Chatterjee Declaration Exhibit A.
*People.ai* v *SetSail*—document 114-03 Chatterjee Declaration Exhibit B1.
*People.ai* v *SetSail*—document 114-04 Chatterjee Declaration Exhibit B2.
*People.ai* v *SetSail*—document 114-05 Chatterjee Declaration Exhibit B3.
*People.ai* v *SetSail*—document 114-06 Chatterjee Declaration Exhibit C.
*People.ai* v *SetSail*—document 114-08 Chatterjee Declaration Exhibit E.
*People.ai* v *SetSail*—document 114-09 Chatterjee Declaration Exhibit F.
*People.ai* v *SetSail*—document 114-10 Chatterjee Declaration Exhibit G.
*People.ai* v *SetSail*—document 114-11 Chatterjee Declaration Exhibit H.
*People.ai* v *SetSail*—document 114-12 Declaration of B.Lui in support of Defendant's motion of partial summary judgement.
*People.ai* v *SetSail*—document 114-13 Lui Declaration Exhibit A.
*People.ai* v *SetSail*—document 114-14 Declaration of H. Levi in support of Defendant's motion for partial summary judgement.
*People.ai* v *SetSail*—document 117-07 Chatterjee Declaration Exhibit D.
*People.ai* v *SetSail*—document 36 first amended complaint.
*People.ai* v *SetSail*—document 43 Defendant motion to dismiss.
*People.ai* v *SetSail*—document 46 response to motion to dismiss first amended complaint.
*People.ai* v *SetSail*—document 47 reply in support of motion to dismiss first amended complaint.
*People.ai* v *SetSail*—document 50 opposition response.
*People.ai* v *SetSail*—document 59 notice of motion for leave.
*People.ai* v *SetSail*—document 66 opposition response.
*People.ai* v *SetSail*—document 68 reply brief in support of motion for leave.
*People.ai* v *SetSail*—document 73 Order re Judgement on the Pleadings.
*People.ai* v *SetSail*—document 74 second amended complaint.
*People.ai* v *SetSail*—document 79 answer to second amended complaint.
*People.ai* v *SetSail*—document 88 answer to counterclaims.
*People.ai* v *SetSail*—document 90 motion for judgement on the pleadings.
Silverston, Physically Implementing Universal Data Models to Integrate Data Sep. 2, DM Review, http://www.dmreview.com/article_sub_articleId_5675.html.
Talburt et al., Entity Information Lifecycle for Big Data: Master Data Management and Information Integration 2015, Elsevier, 255 pages.
U.S. Notice of Allowance on U.S. Appl. No. 16/418,725 dated Feb. 17, 2022.
U.S. Notice of Allowance on U.S. Appl. No. 16/418,725 dated Sep. 22, 2021.
U.S. Notice of Allowance on U.S. Appl. No. 16/420,059 dated Sep. 7, 2021.
U.S. Notice of Allowance on U.S. Appl. No. 16/695,082 dated Oct. 22, 2021.
U.S. Notice of Allowance on U.S. Appl. No. 16/695,082 dated Jul. 8, 2021.
U.S. Notice of Allowance on U.S. Appl. No. 16/700,498 dated Dec. 15, 2021.
U.S. Notice of Allowance on U.S. Appl. No. 16/700,498 dated Aug. 4, 2021.
U.S. Notice of Allowance on U.S. Appl. No. 16/700,510 dated Feb. 1, 2022.
U.S. Notice of Allowance on U.S. Appl. No. 17/129,213 dated Jan. 14, 2022.
U.S. Office Action dated Aug. 3, 2021 for U.S. Appl. No. 16/418,747.
U.S. Office Action on U.S. Appl. No. 16/421,280 dated Apr. 16, 2021.
U.S. Office Action on U.S. Appl. No. 16/700,510 dated Jul. 20, 2021.
U.S. Office Action on U.S. Appl. No. 16/725,705 dated Feb. 17, 2021.
U.S. Office Action on U.S. Appl. No. 16/792,676 dated Jun. 24, 2021.
U.S. Office Action on U.S. Appl. No. 17/102,379 dated Feb. 15, 2022.
U.S. Office Action on U.S. Appl. No. 17/129,213 dated Jul. 19, 2021.
Final Office Action on U.S. Appl. No. 17/361,094 dated Jun. 29, 2023.
Non-Final Office Action on U.S. Appl. No. 17/329,854 dated May 25, 2023.
Non-Final Office Action on U.S. Appl. No. 17/700,210 dated Jul. 18, 2023.
Non-Final Office Action on U.S. Appl. No. 18/100,501 dated Jun. 13, 2023.
Notice of Allowance on U.S. Appl. No. 17/102,387 dated Jun. 22, 2023.
Notice of Allowance on U.S. Appl. No. 17/102,397 dated Jun. 23, 2023.
Notice of Allowance on U.S. Appl. No. 17/504,394 dated Jun. 23, 2023.
Notice of Allowance on U.S. Appl. No. 17/867,245 dated Jul. 19, 2023.
Final Office Action on U.S. Appl. No. 17/700,233 dated Aug. 15, 2023.
Non-Final Office Action on U.S. Appl. No. 16/708,257 dated Jul. 31, 2023.
Non-Final Office Action on U.S. Appl. No. 17/962,475 dated Aug. 3, 2023.
Notice of Allowance on U.S. Appl. No. 17/175,982 dated Sep. 5, 2023.
Notice of Allowance on U.S. Appl. No. 17/694,198 dated Aug. 21, 2023.
Notice of Allowance on U.S. Appl. No. 17/962,477 dated Sep. 6, 2023.
Final Office Action on U.S. Appl. No. 17/888,244 dated Oct. 20, 2023.
Notice of Allowance on U.S. Appl. No. 17/113,843 dated Oct. 25, 2023.
Notice of Allowance on U.S. Appl. No. 17/853,797 dated Oct. 31, 2023.
Final Office Action on U.S. Appl. No. 16/360,892 dated Sep. 27, 2023.
Final Office Action on U.S. Appl. No. 16/421,280 dated Sep. 13, 2023.
Non-Final Office Action on U.S. Appl. No. 17/948,166 dated Sep. 29, 2023.
Notice of Allowance on U.S. Appl. No. 16/418,836 dated Sep. 15, 2023.
Notice of Allowance on U.S. Appl. No. 17/102,387 dated Sep. 18, 2023.
Notice of Allowance on U.S. Appl. No. 17/102,397 dated Sep. 26, 2023.
Notice of Allowance on U.S. Appl. No. 17/683,240 dated Sep. 27, 2023.
Notice of Allowance on U.S. Appl. No. 17/953,220 dated Oct. 11, 2023.
Notice of Allowance on U.S. Appl. No. 17/958,769 dated Sep. 14, 2023.

(56) References Cited

OTHER PUBLICATIONS

Final Office Action on U.S. Appl. No. 17/329,854 dated Dec. 20, 2023.
Final Office Action on U.S. Appl. No. 17/683,245 dated Dec. 1, 2023.
Notice of Allowance on U.S. Appl. No. 18/100,501 dated Nov. 29, 2023.

* cited by examiner

FIG. 4A

| | |
|---|---|
| EU-UID | Header |
| TO: | 406 |
| FROM: | 408 |
| SUBJECT | 410 |

Dear Ann,

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur.

Best,
John

John Smith
CEO | ACME
555-555-555

FIG. 4B

| FROM | XXX-XXX-XXXX | LOC | XXXXXX | TZ | XXXXXX |
|---|---|---|---|---|---|
| TO | XXX-XXX-XXXX | LOC | XXXXXX | TZ | XXXXXX |
| START | XX:XX:XX | | | | |
| END | XX:XX:XX | | | | |
| DUR. | XX:XX:XX | | | | |
| PART: | {XXX,XXX,XXXX} | | | | |

FIG. 4C

| FROM | XXX-XXX-XXXX | SUB | XXXXXX |
|---|---|---|---|
| PART: | {XXX,XXX,XXXX} | TXT | XXXXXX |
| START | XX:XX:XX | ATT | XXXXXX |
| END | XX:XX:XX | LATLON | XXXXXX |
| DUR. | XX:XX:XX | | |

916

| Recency \ Frequency | Sales Threshold | | Marketing Threshold | | Exclude | |
|---|---|---|---|---|---|---|
| | 5 Meetings + 3 Replies | 4 Meetings + 2 Replies | 3 Meetings + 1 Reply | 2 Meetings + 1 Replies | 1 Meeting | 0 Meetings |
| 0-3 Months | Sales | Sales | Marketing | Marketing | Validate | No Action |
| 3-6 Months | Sales | Sales | Marketing | Marketing | Validate | No Action |
| 6-12 Months | Sales | Marketing | Marketing | Validate | Validate | No Action |
| 12-18 Months | Marketing | Marketing | Marketing | Validate | Validate | No Action |
| 18-24 Months | Marketing | Validate | Validate | Validate | No Action | No Action |

FIG. 9B

SYSTEMS AND METHODS FOR MANAGING THE GENERATION OR DELETION OF RECORD OBJECTS BASED ON ELECTRONIC ACTIVITIES AND COMMUNICATION POLICIES

CROSS-REFERENCE TO RELATED APPLICATIONS

The present application is a continuation of U.S. Non-Provisional patent application Ser. No. 16/877,078, filed May 18, 2020, which is a continuation-in-part of U.S. Non-Provisional patent application Ser. No. 16/419,583, filed May 22, 2019, which claims the benefit of and priority to U.S. Provisional Patent Application 62/747,452, filed Oct. 18, 2018, U.S. Provisional Patent Application 62/725,999, filed Aug. 31, 2018, and U.S. Provisional Patent Application 62/676,187, filed May 24, 2018, each of which are incorporated herein by reference for all purposes.

BACKGROUND

An organization may attempt to manage or maintain a system of record associated with electronic communications at the organization. The system of record can include information such as contact information, logs, and other data associated with the electronic activities. Data regarding the electronic communications can be transmitted between computing devices associated with one or more organizations using one or more transmission protocols, channels, or formats, and can contain various types of information. For example, the electronic communication can include information about a sender of the electronic communication, a recipient of the electronic communication, and content of the electronic communication. The information regarding the electronic communication can be input into a record being managed or maintained by the organization. However, due to the large volume of heterogeneous electronic communications transmitted between devices and the challenges of manually entering data, inputting the information regarding each electronic communication into a system of record can be challenging, time consuming, and error prone.

SUMMARY

At least one aspect of the present disclosure relates to a method for managing the generation or deletion of record objects based on electronic activities and communication policies. The method may comprise identifying, by one or more processors, for an entity, data of a plurality of electronic activities accessible to a first data source provider and transmitted from or received by one or more electronic accounts of the entity; determining, by the one or more processors, whether the identified data of the plurality of electronic activities satisfies a communication policy, the communication policy including one or more rules based on i) a number of electronic activities transmitted from the one or more electronic accounts of the entity or ii) a value determined from the data of the plurality of electronic activities and used to update one or more communication settings for communicating with the one or more electronic accounts of the entity; and transmitting, by the one or more processors, instructions to generate, in a system of record of the first data source provider, a contact record object for the entity based on the identified data satisfying a first condition of the communication policy; or transmitting, by the one or more processors, instructions to delete, in the system of record of the first data source provider, an existing contact record object for the entity based on the identified data satisfying a second condition of the communication policy.

In some embodiments, the method may further comprise transmitting, by the one or more processors, instructions to store, in the system of record of the first data source provider, a first association between the contact record object for the entity and a first communication setting responsive to the identified data satisfying the first condition of the communication policy, the first communication setting authorizing the first data source provider to contact or store data about the entity; or transmitting, by the one or more processors, instructions to store, in the system of record of the first data source provider, a second association between the contact record object for the entity and a second communication setting responsive to the identified data satisfying the second condition of the communication policy, the second communication setting restricting communication between the first data source provider and the entity.

In some embodiments, the method may further comprise maintaining, by the one or more processors, a plurality of node profiles, each node profile of the plurality of node profiles including a source field-value pair indicating which data source providers are authorized to collect data for the node profile; receiving, by the one or more processors, an indication to remove a value associated with a second data source provider from a source field-value pair of a node profile of the entity; and removing, by the one or more processors, the value associated with the second data source provider from the source field-value pair of the entity responsive to receiving the indication.

In some embodiments, determining, by the one or more processors, whether the identified data of the plurality of electronic activities satisfies the communication policy may comprise evaluating the communication policy using electronic activities between a plurality of entities of the first data source provider and the entity.

In some embodiments, the method may further comprise, responsive to the second condition of the communication policy being satisfied, storing, by the one or more processors in a data structure, an association between a restriction tag to restrict communication between the first data source provider and the entity.

In some embodiments, the method may further comprise, responsive to the second condition of the communication policy being satisfied, transmitting, by the one or more processors, instructions to generate, in the system of record of the first data source provider, a restriction tag used by the system of record to restrict communication between the first data source provider and the entity and store an association between the restriction tag and the entity in a data structure of the system of record of the first data source provider.

In some embodiments, the method may further comprise comparing, by the one or more processors, the number of electronic activities transmitted or received by the one or more electronic accounts of the entity to a first restriction threshold; and transmitting, by the one or more processors, instructions to update an object field-value pair of the contact record object based on determining that the number of electronic activities that were transmitted or received by the one or more electronic accounts of the entity exceeds the first restriction threshold.

In some embodiments, the method may further comprise comparing, by the one or more processors, the number of electronic activities transmitted or received by the one or more electronic accounts of the entity to a second restriction threshold; and transmitting, by the one or more processors, instructions to update the object field-value pair of the contact record object based on determining that the number of electronic activities that were transmitted or received by the one or more electronic accounts of the entity exceeds the second restriction threshold.

In some embodiments, the method may further comprise determining, by the one or more processors, a type of electronic activity for each of the plurality of electronic activities, wherein determining by the one or more processors, whether the identified data of the plurality of electronic activities satisfies the communication policy is based on the type of electronic activity for each for the plurality of electronic activities.

In some embodiments, the system of record includes a plurality of contact record objects, each contact record object of the plurality of contact record objects associated with a different entity. The method may further comprise receiving, by the one or more processors, a validation request. Transmitting, by the one or more processors, instructions to delete the existing contact record object for the entity setting is performed further responsive to receiving the validation request.

In some embodiments, the method may comprise determining, by the one or more processors, a location for the entity; and determining, by the one or more processors, the communication policy based on the determined location of the entity.

In some embodiments, the method may comprise determining, by the one or more processors, the location for the entity comprises identifying, by the one or more processors, the location from a location field-value pair of a node profile associated with the entity.

In some embodiments, the method may comprise storing, by the one or more processors, an identifier associated with the entity in one or more data structures; receiving, by the one or more processors, an electronic activity from an electronic account of the entity, the electronic activity having a first format; converting, by the one or more processors, an electronic account identifier of the electronic account into a second format; and associating, by the one or more processors, the electronic activity with the stored identifier based on the electronic account identifier matching the stored identifier, wherein determining, by the one or more processors, whether the identified data of the plurality of electronic activities satisfies the communication policy is based at least on the association between the electronic activity and the stored identifier.

In some embodiments, the method may further comprise determining, by the one or more processors, an engagement score for the entity based on the data of the plurality of electronic activities; comparing, by the one or more processors, the engagement score to a threshold; and generating, by the one or more processors, responsive to the engagement score being less than the threshold, a recommendation to contact the entity.

In some embodiments, the method may further comprise parsing, by the one or more processors, an electronic activity of the plurality of electronic activities; and based on the parsing the electronic activity, detecting an indication to not store data regarding the entity. Transmitting, by the one or more processors, the instructions to delete the existing contact record object for the entity may be further based on the detected indication to not store data regarding the entity.

In some embodiments, the method may further comprise receiving, by the one or more processors, an electronic activity transmitted from the one or more electronic accounts of the entity; responsive to receiving, by the one or more processors, the electronic activity, determining, by the one or more processors, that a number of electronic activities transmitted from the one or more electronic accounts of the entity exceeds a threshold; and responsive to determining, by the one or more processors, that the number of electronic activities transmitted from the one or more electronic accounts of the entity exceeding the threshold, determining, by the one or more processors, that the first condition of the communication policy is satisfied.

At least one aspect of the present disclosure relates to a system for managing the generation or deletion of record objects based on electronic activities and communication policies. The system may comprise one or more processors configured to execute machine-readable instructions to identify, for an entity, data of a plurality of electronic activities accessible to a first data source provider and transmitted from or received by one or more electronic accounts of the entity; determine whether the identified data of the plurality of electronic activities satisfies a communication policy, the communication policy including one or more rules based on i) a number of electronic activities transmitted from the one or more electronic accounts of the entity or ii) a value determined from the data of the plurality of electronic activities and used to update one or more communication settings for communicating with the one or more electronic accounts of the entity; and transmit instructions to generate, in a system of record of the first data source provider, a contact record object for the entity based on identified data satisfying a first condition of the communication policy; or transmit instructions to delete, from the system of record of the first data source provider, an existing contact record object for the entity based on the identified data satisfying a second condition of the communication policy.

In some embodiments, the one or more processors are further configured to transmit instructions to store, in the system of record of the first data source provider, a first association between the contact record object for the entity and a first communication setting responsive to the identified data satisfying the first condition of the communication policy, the first communication setting authorizing the first data source provider to contact or store data about the entity; or transmit instructions to store, in the system of record of the first data source provider, a second association between the contact record object for the entity and a second communication setting responsive to the identified data satisfying the second condition of the communication policy, the second communication setting restricting communication between the first data source provider and the entity.

In some embodiments, the one or more processors are further configured to maintain a plurality of node profiles, each node profile of the plurality of node profiles including a source field-value pair indicating which data source providers are authorized to collect data for the node profile; receive an indication to remove a value associated with a second data source provider from a source field-value pair of a node profile of the entity; and remove the value associated with the second data source provider from the source field-value pair of the entity responsive to receiving the indication.

At least one aspect of the present disclosure relates to a non-transitory computer-readable storage medium having instructions embodied thereon, the instructions being executable by one or more processors to manage the generation or deletion of record objects based on electronic activities and communication policies. The instructions may cause the one or more processors to identify, for an entity, data of a plurality of electronic activities accessible to a first data source provider and transmitted from or received by one or more electronic accounts of the entity; determine whether the identified data of the plurality of electronic activities satisfies a communication policy, the communication policy including one or more rules based on i) a number of electronic activities transmitted from the one or more electronic accounts of the entity or ii) a value determined from the data of the plurality of electronic activities and used to update one or more communication settings for communicating with the one or more electronic accounts of the entity; and transmit instructions to generate, in a system of record of the first data source provider, a contact record object for the entity based on the identified data satisfying a first condition of the communication policy; or transmit instructions to delete, from the system of record of the first data source provider, an existing contact record object for the entity based on the identified data satisfying a second condition of the communication policy.

BRIEF DESCRIPTIONS OF THE DRAWINGS

FIGS. 4A-4C illustrate various types of example electronic activities according to embodiments of the present disclosure;

FIG. 9B illustrates an example table including thresholds for a data processing system to use to manage the generation or deletion of record objects based on electronic activities and communication policies according to embodiments of the present disclosure;

DETAILED DESCRIPTION

The present disclosure relates to systems and methods for managing the generation or deletion of record objects based on electronic activities and communication policies. Record objects may represent entities that transmit and/or receive electronic activities from entities of data source providers. Such record objects may be stored in systems of record of such data source providers. Processors of the data source providers may process the electronic activities to obtain data and update the record objects to include data obtained from such electronic activities. Unfortunately, processors not implementing the systems and methods described herein may process the electronic activities of entities without having any permissions to do so. Such processors do not have a method of distinguishing between entities that are associated with various communication settings that would otherwise restrict the processors from extracting information from the electronic activities and entities that do not have such privacy settings. Instead, the processors may extract and store the information without differentiating between entities that are associated with various communication settings.

By implementing the systems and methods described herein, a data processing system may automatically determine whether processors of a data source provider have the applicable permissions to extract and/or store information from electronic activities that are transmitted between an entity and entities of the data source provider. The data processing system may implement communication policies that can include rules and/or thresholds to apply to data associated with electronic activities. The data processing system may determine if any of the communication policies are satisfied to determine which communication setting the processor of the data source provider can use to update, generate, or delete a record object associated with the entity. The data processing system may transmit instructions to the processor so the processor would do so. Accordingly, the data processing system may automatically determine which permissions the data source provider has to extract and/or store data from electronic activities transmitted and/or received from the entity using various communication policies. The data processing system may do so without providing the processors of the data source provider with data from the electronic activities that the data source provider does not have permission to analyze.

Figure 1:
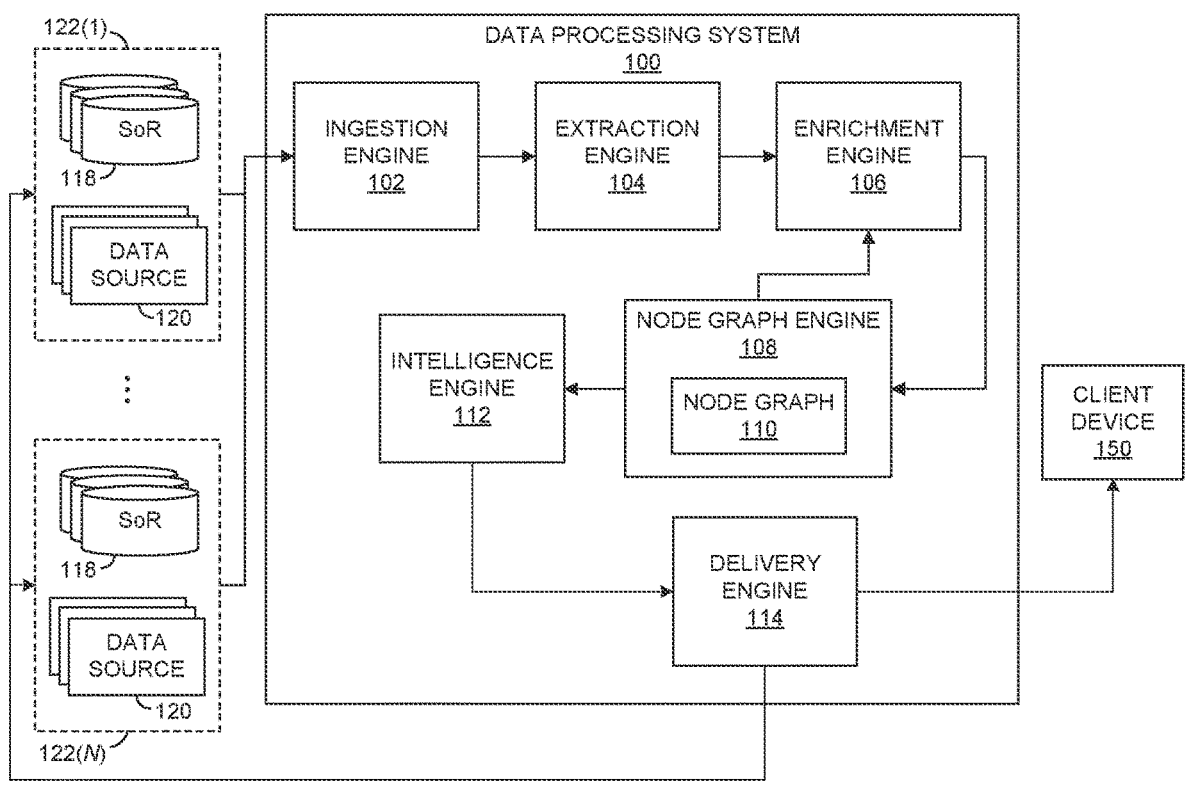
FIG. 1 illustrates a data processing system for aggregating electronic activities and synchronizing the electronic activities to one or more systems of record according to embodiments of the present disclosure.
Figure 2:
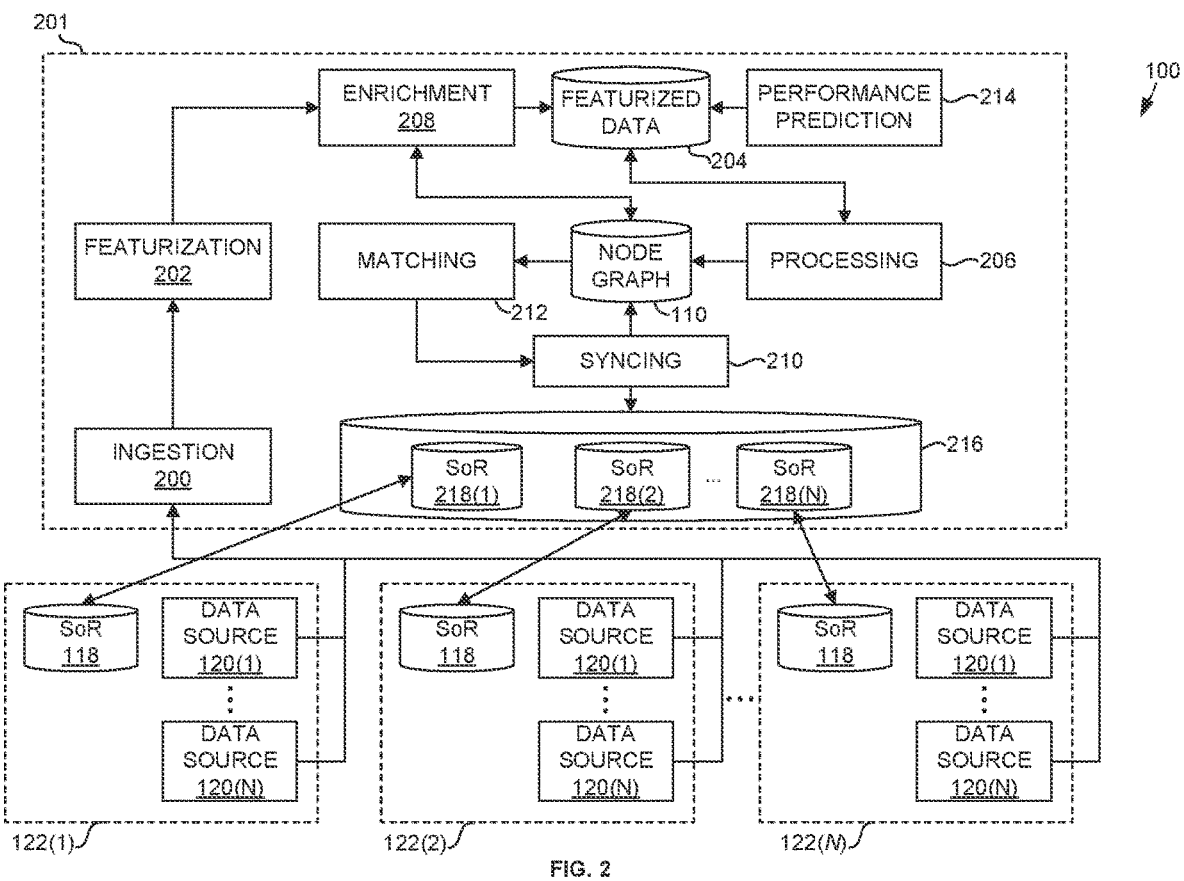
FIG. 2 illustrates a process flow diagram for constructing a node graph based on one or more electronic activities according to embodiments of the present disclosure.

FIGS. 1 and 2 illustrate a data processing system 100 and process flow 201 for aggregating electronic activities, processing the electronic activities to update node profiles of entities and to construct a node graph 110, and synchronizing the electronic activities and data to one or more systems of record 118. As a brief overview, the data processing system 100 may include an ingestion engine 102, an extraction engine 104, an enrichment engine 106, a node graph engine 108, an intelligence engine 112, and a delivery engine 114, among others. The ingestion engine 102 can be configured to ingest electronic activities associated with an entity, as described in greater detail below with reference to FIG. 3A. The entity can be a person, company, group of people, among others. In some embodiments, the entity can be any entity that is assigned an identifier configured to receive or transmit electronic activities. The extraction engine 104 can be configured to extract data from electronic activities, record objects, systems of record, and/or any other item or system that is ingested by ingestion engine 102, as described in greater detail below with reference to FIG. 3B. The enrichment engine 106 can be configured to configured to identify data extracted from electronic activities and update node graph 110 based on the extracted data, as described in greater detail below with reference to FIG. 3C. The node graph engine 108 can be configured to configured to generate, manage and update the node graph 110, as described in greater detail below with reference to FIG. 3D. The intelligence engine 112 can be configured to determine insights for a company, as described in greater detail below with reference to FIG. 3E.

A process flow 201 can be executed by the data processing system 100 that can receive electronic activities and other data from the data sources 120 a plurality of data source providers 122(1)-122(N). Each data source provider 122 can include one or more data sources 120(1)-120(N) and/or one or more system of record 118. Examples of data source providers 122 can include companies, universities, enterprises, or other group entities which enroll with or subscribe to one or more services provided by the data processing system 100. Each of the data source providers 122 can include one or more data sources 120 such as, for example electronic mail servers (e.g., electronic mail data sources 120) which store or include data corresponding to electronic mail (such as an exchange server), telephone log servers (e.g., telephone log data sources 120) which store or include data corresponding to incoming/outgoing/missed telephone calls, contact servers (e.g., contact data sources 120) which store or include data corresponding to contacts, other types of servers and end-user applications that are configured to store or include data corresponding to electronic activities (also referred to as "electronic activity data") or profile data relating to one or more nodes.

At step 200, the data processing system 100 can ingest electronic activity. The data processing system 100 can ingest electronic activities from the data sources 120 of the data source providers 122 (e.g., via the ingestion engine 102. At step 202, the data processing system 100 can featurize the ingested electronic activities. The data processing system 100 can featurize the ingested electronic activities by parsing and tagging the electronic activities. At step 204, and following featurizing the electronic activities at step 202, the data processing system 100 can store the featurized data. In some embodiments, the data processing system 100 can store the featurized data in a featurized data store. At step 206, the data processing system 100 can process the featurized data to generate a node graph 110 including a plurality of node profiles. The data processing system 100 can store the node graph(s) 110 in one or more databases or other data stores as shown in FIG. 2. The node graph 110 can include a plurality of nodes and a plurality of edges between the nodes indicating activity or relationships that are derived from a plurality of data sources that can include one or more types of electronic activities. The plurality of data sources 120 can further include systems of record 118, such as customer relationship management systems, enterprise resource planning systems, document management systems, applicant tracking systems, or other sources of data that may maintain electronic activities, activities, or records.

In some embodiments, at step 208, upon featurizing an ingested electronic activity, the data processing system 100 can enrich an existing node graph 110 to include any features that were extracted from the electronic activity. In other words, the data processing system 100 can update, revise, or otherwise modify (e.g., enrich) the node graph 110 based on newly ingested and featurized electronic activities. In some embodiments, the data processing system 100 can further maintain a plurality of shadow system of record 218(1)-(N) corresponding to systems of record 118 of the data source providers 122(1)-(N). The shadow systems of record 218 (1)-(N) may be maintained in a shadow system of record database 216. In some embodiments, at step 210, the data processing system 100 can synchronize data stored in the shadow system of record 218 to augment the node profiles.

For instance, the data processing system 100 can utilize the shadow system of record 218 to augment the node profiles of the node graph 110 by synchronizing data stored in the shadow system of record 218 maintained by the data processing system 100. In some embodiments, at step 212, responsive to the data processing system 100 can further match the ingested electronic activities to one or more record objects maintained in one or more systems of record 118 of the data source provider 122 from which the electronic activity was received (e.g., via a data source 120) or the shadow system of records 218. The data processing system 100 can further synchronize the electronic activity matched to record objects to update the system of record 118 of the data source provider 122. In some embodiments, at step 214, the data processing system 100 can use the featurized data to provide performance predictions and generate other business process related outputs, insights, and recommendations.

The data processing system 100 may communicate with a client device 150 (e.g., a mobile device, computer, tablet, desktop, laptop, or other device communicably coupled to the data processing system 100). In some embodiments, the data processing system 100 can be configured to communicate with the client device 150 via the delivery engine 114. The delivery engine 114 can be or include any script, file, program, application, set of instructions, or computer-executable code that is configured to transmit, receive, and/or exchange data with one or more external sources. The delivery engine 114 may be or include, for instance, an API, communications interface, and so forth. In some embodiments, the delivery engine 114 may be configured to generate and transmit content, notifications, instructions, or other deliverables to the client device 150, to a system of record 118, and so forth. For instance, the delivery engine 114 may be configured to generate instructions for updating a system of record 118, notifications or prompts to a client device 150 associated with a node, and the like.

As described herein, electronic activity can include any type of electronic communication that can be stored or logged. Examples of electronic activities can include electronic mail messages, telephone calls, calendar invitations, social media messages, mobile application messages, instant messages, cellular messages such as SMS, MMS, among others, as well as electronic records of any other activity, such as digital content, such as files, photographs, screenshots, browser history, internet activity, shared documents, among others. Electronic activities can include electronic activities that can be transmitted or received via an electronic account, such as an email account, a phone number, an instant message account, among others.

Referring now to FIG. 4A, FIG. 4A illustrates an example electronic message 400. Each electronic message 400 may include an electronic activity unique identifier 402 and a message header 404. The message header 404 can include additional information relating to the transmission and receipt of the email message, including a time at which the email was sent, a message identifier identifying a message, an IP address associated with the message, a location associated with the message, a time zone associated with the sender, a time at which the message was transmitted, received, and first accessed, among others. Additionally, each electronic message 400 can identify one or more recipients 406, one or more senders 408. The electronic message 400 also generally includes a subject line 410, an email body 412, and an email signature 414 corresponding to the sender 408. The electronic message 400 can include additional data in the electronic message 400 or in the header or metadata of the electronic message 400.

Referring now to FIG. 4B, FIG. 4B illustrates an example call entry 425 representing a phone call or other synchronous communication (e.g., video call). The call entry 425 can identify a caller 420, a location 422 of the caller, a time zone 424 of the caller, a receiver 426, a location 428 of the receiver, a time zone 430 of the receiver, a start date and time 432, an end date and time 434, a duration 436 and a list of participants 538. In some embodiments, the times at which each participant joined and left the call can be included. Furthermore, the locations from which each of the callers called can be determined based on determining if the user called from a landline, cell phone, or voice over IP call, among others. The call entry 425 can also include fields for phone number prefixes (e.g., 800, 866, and 877), phone number extensions, and caller ID information.

Referring now to FIG. 4C, FIG. 4C illustrates an example calendar entry 450. The calendar entry 450 can identify a sender 452, a list of participants 454, a start date and time 456, an end date and time 458, a duration 460 of the calendar entry, a subject 462 of the calendar entry, a body 464 of the calendar entry, one or more attachments 466 included in the calendar entry and a location of event, described by the calendar entry 468. The calendar entry can include additional data in the calendar entry or in the header or metadata of the calendar entry 450.

The electronic activity can be stored on or at one or more data sources 120 for the data source providers 122. For example, the electronic activities can be stored on servers. The electronic activity can be owned or managed by one or more data source providers 122, such as companies that utilize the services of the data processing system 100. The electronic activity can be associated with or otherwise maintained, stored or aggregated by a data source 120, such as Google G Suite, Microsoft Office365, Microsoft Exchange, among others. In some embodiments, the electronic activity can be real-time (or near real-time) electronic activities, asynchronous electronic activity (such as emails, text messages, among others) or synchronous electronic activities (such as meetings, phone calls, video calls), or other activity in which two parties are communicating simultaneously.

A. Electronic Activity Ingestion

Figure 3A:
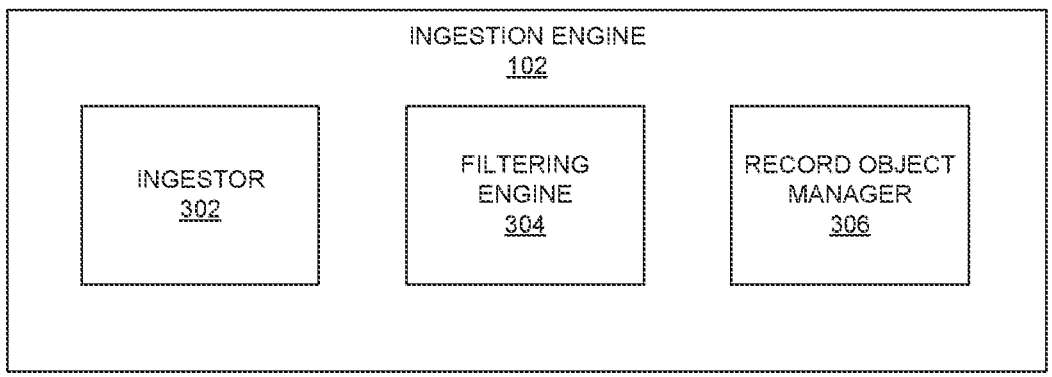
FIGS. 3A-3E illustrate detailed block diagrams of the components of the data processing system of FIG. 1 according to embodiments of the present disclosure.

Referring now to FIG. 3A, FIG. 3A illustrates a detailed block diagram of the ingestion engine 102. The ingestion engine 102 may be configured to ingest electronic activities and record objects. The ingestion engine 102 can include an ingestor 302, a filtering engine 304, and a record object manager 306. The ingestion engine 102 and each of the components of the ingestion engine 102 can be any script, file, program, application, set of instructions, or computer-executable code.

The ingestor 302 can be any script, file, program, application, set of instructions, or computer-executable code that is configured to enable a computing device on which the ingestor 302 is executed to perform one or more functions of the ingestor 302 described herein. The ingestor 302 can be configured to ingest electronic activities from the plurality of data source providers. The electronic activities may be received or ingested in real-time or asynchronously as electronic activities are generated, transmitted, or stored by the one or more data source providers.

The data processing system 100 or the ingestor 302 can ingest electronic activity from a plurality of different source providers. In some embodiments, the data processing system 100 or the ingestor 302 can be configured to manage electronic activities and one or more systems of record for one or more enterprises, organizations, companies, businesses, institutions or any other group associated with a plurality of electronic activity accounts. The data processing system 100 or the ingestor 302 can ingest electronic activities from one or more servers that hosts, processes, stores or manages electronic activities. In some embodiments, the one or more servers can be electronic mail or messaging servers. The data processing system 100 or the ingestor 302 can ingest all or a portion of the electronic activities stored or managed by the one or more servers. In some embodiments, the data processing system 100 or the ingestor 302 can ingest the electronic activities stored or managed by the one or more servers once or repeatedly on a periodic basis, such as daily, weekly, monthly or any other frequency.

The data processing system 100 or the ingestor 302 can further ingest other data that may be used to generate or update node profiles of one or more nodes maintained by the data processing system 100. The other data may also be stored by the one or more servers that hosts, processes, stores or manages electronic activities. This data can include contact data, such as names, addresses, phone numbers, company information, titles, among others.

The data processing system 100 can further ingest data from one or more systems of record. The systems of record can be hosted, processed, stored or managed by one or more servers of the systems of record. The systems of record can be linked or otherwise associated with the one or more servers that host, process, store or manage electronic activities. In some embodiments, both the servers associated with the electronic activities and the servers maintaining the systems of record may belong to the same organization or company.

The ingestor 302 can receive electronic activities and assign each electronic activity an electronic activity unique identifier (e.g., electronic activity unique identifier) to enable the data processing system 100 to uniquely identify each electronic activity. In some embodiments, the electronic activity unique identifier can be the same identifier as a unique electronic activity identifier included in the electronic activity. In some embodiments, the electronic activity unique identifier is included in the electronic activity by the source of the electronic activity or any other system.

The ingestor 302 can be configured to format the electronic activity in a manner that allows the electronic activity to be parsed or processed. In some embodiments, the ingestor 302 can identify one or more fields of the electronic activity and apply one or more normalization techniques to normalize the values included in the one or more fields. In some embodiments, the ingestor 302 can format the values of the fields to allow content filters to apply one or more policies to identify one or more regex patterns for filtering the content, as described herein.

The ingestor 302 can be configured to ingest electronic activities on a real-time or near real-time basis for accounts of one or more enterprises, organizations, companies, businesses, institutions or any other group associated with a plurality of electronic activity account with which the data processing system 100 has integrated. When an enterprise client subscribes to a service provided by the data processing system 100, the enterprise client provides access to electronic activities maintained by the enterprise client by going through an onboarding process. That onboarding process allows the data processing system 100 to access electronic activities owned or maintained by the enterprise client from one or more electronic activities sources. This can include the enterprise client's mail servers, one or more systems of record, one or more phone services or servers of the enterprise client, among other sources of electronic activity. The electronic activities ingested during an onboarding process may include electronic activities that were generated in the past, perhaps many years ago, that were stored on the electronic activities' sources. In addition, in some embodiments, the data processing system 100 can be configured to ingest and re-ingest the same electronic activities from one or more electronic activities sources on a periodic basis, including daily, weekly, monthly, or any reasonable frequency.

The ingestor 302 can be configured to receive access to each of the electronic activities from each of these sources of electronic activity including the systems of record of the enterprise client. The ingestor 302 can establish one or more listeners, or other mechanisms to receive electronic activities as they are received by the sources of the electronic activities enabling real-time or near real-time integration.

As more and more data is ingested and processed as described herein, the node graph 110 generated by the data processing system 100 can continue to store additional information obtained from electronic activities as electronic activities are accessed by the data processing system 100. The additional information, as will be described herein, can be used to populate missing fields or add new values to existing fields, reinforce field values that have low confidence scores and further increase the confidence score of field values, adjust confidence scores of certain data points, and identify patterns or make deductions based on the values of various fields of node profiles of nodes included in the graph.

As more data is ingested, the data processing system 100 can use existing node graph data to predict missing or ambiguous values in electronic activities such that the more node profiles and data included in the node graph 110, the better the predictions of the data processing system 100, thereby improving the processing of the ingested electronic activities and thereby improving the quality of each node profile of the node graph 110, which eventually will improve the quality of the overall node graph 110 of the data processing system 100.

The data processing system 100 can be configured to periodically regenerate or recalculate the node graph 110. The data processing system 100 can do so responsive to additional data being ingested by the data processing system 100. When new electronic activities or data is ingested by the data processing system 100, the data processing system 100 can be configured to recalculate the node graph 110 as the confidence scores (as will be described later) can change based on the information included in the new electronic activities. In some embodiments, the ingestor 302 may re-ingest previously ingested data from the one or more electronic activity sources or simply ingest the new electronic activity not previously ingested by the data processing system 100.

B. Filtering Engine

The filtering engine 304 can be any script, file, program, application, set of instructions, or computer-executable code that is configured to enable a computing device on which the filtering engine 304 is executed to perform one or more functions of the filtering engine 304 described herein.

The filtering engine 304 can use information identified, generated or otherwise made available by a tagging engine 312 (described below). The filtering engine 304 can be configured to block, remove, redact, delete, or authorize electronic activities tagged or otherwise parsed or processed by the tagging engine 312. For example, the tagging engine 312 can be configured to assign tags to electronic activities, node profiles, systems of record 118, among others. The filtering engine 304 can be configured with a policy or rule that prevents ingestion of an electronic activity having a specific tag or any combination of tags, such as a personal tag, a credit card tag or a social security tag. By applying filtering rules or policies to tags assigned to electronic activities, node profiles, or records from the one or more systems of record, among others, the data processing system 100 can be configured to block, delete, redact or authorize electronic activities at the ingestion step or redact out parts or whole values of any of the fields in the ingested electronic activities.

C. Record Object Manager

The record object manager 306 can be any script, file, program, application, set of instructions, or computer-executable code that is configured to enable a computing device on which the record object manager 306 is executed to perform one or more functions of the record object manager 306 described herein. The record object manager 306 can be configured to maintain data regarding record objects of multiple systems of record and can be configured to augment information for a record object by extracting information from multiple record objects across a plurality of systems of record. The record object manager 306 can function as a system of record object aggregator that is configured to aggregate data points (e.g., electronic activities, record objects, etc.) from many systems of record, calculate the contribution score of each data point, and generate a timeline of the contribution score of each of those data points. The record object manager 306 or the data processing system 100 in general can then enrich the node graph 110 generated and maintained by the data processing system 100 by updating node profiles using the data points and their corresponding contribution scores. In certain embodiments, the record object manager 306 can be further configured to utilize the data from the node graph to update or fill in missing data in a target system of record provided the data in the node graph satisfies a predetermined confidence value.

Figure 3B:
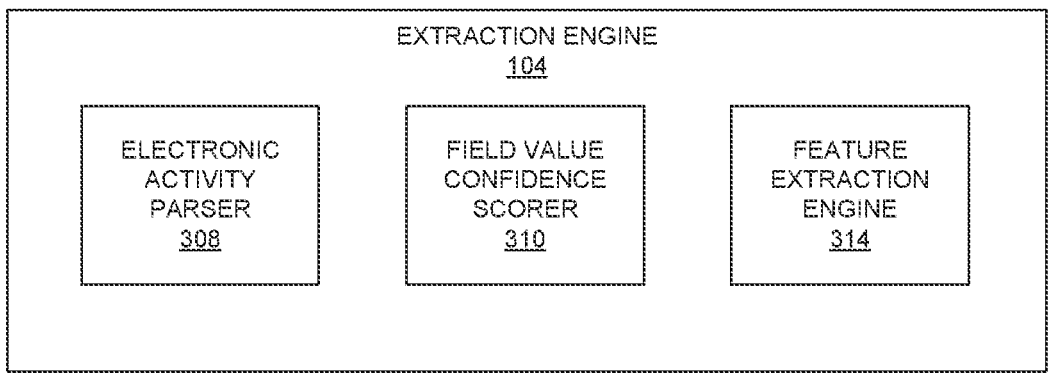

Referring now to FIG. 3B, FIG. 3B illustrates a detailed block diagram of the extraction engine 104. The extraction engine 104 may include electronic activity parser 308, field value confidence scorer 310, and/or feature extraction engine 314. Extraction engine 104 may be configured to extract data from electronic activities, record objects, systems of record, and/or any other item or system that is ingested by ingestion engine 102. The extraction engine 104 and each of the components of the extraction engine 104 can be any script, file, program, application, set of instructions, or computer-executable code.

D. Electronic Activity Parsing

The electronic activity parser 308 can be any script, file, program, application, set of instructions, or computer-executable code, which is configured to enable a computing device on which the electronic activity parser 308 is executed to perform one or more functions of the electronic activity parser 308 described herein.

The electronic activity parser 308 can be configured to parse the electronic activity to identify one or more values of fields to be used in generating node profiles of one or more nodes and associate the electronic activities between nodes for use in determining the connection and connection strength between nodes. The node profiles can include fields having name-value pairs. The electronic activity parser 308 can be configured to parse the electronic activity to identify values for as many fields of the node profiles of the nodes with which the electronic activity is associated.

The electronic activity parser 308 can be configured to identify each of the nodes associated with the electronic activity. In some embodiments, the electronic activity parser 308 can parse the metadata of the electronic activity to identify the nodes. The metadata of the electronic activity can include a To field, a From field, a Subject field, a Body field, a signature within the body and any other information included in the electronic activity header that can be used to identify one or more values of one or more fields of any node profile of nodes associated with the electronic activity. In some embodiments, non-email electronic activity can include meetings or phone calls. The metadata of such non-email electronic activity can include one or more participants of the meeting or call. In some embodiments, nodes are associated with the electronic activity if the node is a sender of the electronic activity, a recipient of the electronic activity, a participant of the electronic node, or identified in the contents of the electronic activity. The node can be identified in the contents of the electronic activity or can be inferred based on information maintained by the data processing system 100 and based on the connections of the node and one or more of the sender or recipients of the electronic activity.

The electronic activity parser 308 can be configured to parse the electronic activity to identify fields, attributes, values, or characteristics of the electronic activity. In some embodiments, the electronic activity parser 308 can apply natural language processing techniques to the electronic activity to identify regex patterns, words or phrases, or other types of content that may be used for sentiment analysis, filtering, tagging, classifying, deduplication, effort estimation, and other functions performed by the data processing system 100.

In some embodiments, the electronic activity parser 308 can be configured to parse an electronic activity to identify values of fields or attributes of one or more nodes. For instance, when an electronic mail message is ingested into the data processing system 100, the electronic activity parser 308 can identify a FROM field of the electronic mail message. The FROM field can include a name and an email address. The name can be in the form of a first name and a last name or a last name, first name. The electronic activity parser 308 can extract the name in the FROM field and the email address in the FROM field to determine whether a node is associated with the sender of the electronic mail message.

E. Node Field Value Confidence Scoring

The field value confidence scorer 310 can be any script, file, program, application, set of instructions, or computer-executable code, that is configured to enable a computing device on which the field value confidence scorer 310 is executed to perform one or more functions of the field value confidence scorer 310 described herein. The field value confidence scorer 310 can be configured to determine a confidence of each value of an attribute of a node profile. The confidence of a value is determined based in part on a number of electronic activities or sources that contribute to the value, time since each electronic activity provided support or evidence of the value, time since the field value in the source system of record was last modified or confirmed by a human operator, as well as the source of the electronic activity. Electronic activity that is received from mail servers or another source that does not involve manual entry may be assigned a greater weight (or trust/health score) than a source that involves manual entry, such as a customer relationship management tool.

The field value confidence scorer 310 can be configured to determine a confidence of each value of an attribute of a node profile. An attribute or field can have multiple candidate values and the value with the highest confidence score can be used by the data processing system 100 for confirming or validating the value of the field. The field value confidence scorer 310 can apply one or more scoring algorithms to determine the likelihood that each value is a correct value of the field. It should be appreciated that a value does not need to be current to be correct. In some embodiments, as new entities are onboarded into the system, electronic activities and systems of record corresponding to systems of record of the new entities can be processed by the data processing system 100. In processing these electronic activities and systems of record, some electronic activities can be associated with dates many years in the past. Such electronic activities are not discarded. Rather, the data processing system 100 processes such electronic activities and information extracted from these electronic activities are used to populate values of fields of node profiles. Since each data point is associated with a timestamp, the data point may provide evidence for a certain value even if that value is not a current value. One example of such a value can be a job title of a person. The person many years ago may simply have been an associate at a law firm. However, that person is now a partner at the firm. If emails sent from this person's email account are processed by the data processing system 100, more recently sent emails can have a signature of the person indicating he's a partner, while older emails will have a signature of the person indicating he's an associate. Both values, partner and associate are correct values except only partner is the current value for the job title field. The job title field can include one or more fields, for instance, a seniority field and a department field. A confidence score of the current value may be higher in some embodiments as data points that are more recent may be assigned a higher contribution score than data points that are older. Additional details about contribution scores and confidence scores are provided below.

In some embodiments, a node profile can correspond to or represent a person. As will be described later, such node profiles can be referred to as member node profiles. The node profile can be associated with a node profile identifier that uniquely identifies the node profile. Each node profile can include a plurality of attributes or fields, such as First name, Last name, Email, job title, Phone, LinkedIn URL, Twitter handle, among others. In some embodiments, a node profile can correspond to a company. As will be described later, such node profiles can be referred to as group node profiles. The group node profile can be similar to the member node profile of a person except that certain fields may be different, for example, a member node profile of a person may include a personal cell phone number while a group node of a company may not have a personal cell phone number but may instead have a field corresponding to parent company or child company or fields corresponding to CEO, CTO, CFO, among others. As described herein, member node profiles of people and group node profiles of companies for the most part function the same and as such, descriptions related to node profiles herein relate to both member node profiles and group node profiles. Each field or attribute can itself be a 3-dimensional array. For instance, the First name field can have two values: first name_1|first name_2, one Last name value and three email address values email_A|email_B| email_C. Each value can have an Occurrence (counter) value, and for each occurrence that contributes to the Occurrence value, there is an associated Source (for example, email or System of record) value and an associated timestamp (for example, today, 3:04 pm PST) value. In this way, in some embodiments, each value of a field or attribute can include a plurality of arrays, each array identifying a data point or an electronic activity, a source of the data point or electronic activity, a time associated with the data point or electronic activity, a contribution score of the data point or electronic activity and, in some embodiments, a link to a record of the data point or electronic activity. It should be appreciated that the data point can be derived from a system of record. Since systems of records can have varying levels of trust scores, the contribution score of the data point can be based on the trust score of the system of record from which the data point was derived. Stated in another way, in addition to each field being a 3-dimensional array, in some embodiments, each value of an field can be represented as a plurality of arrays. Each array can identify an electronic activity that contributed to the value of the field, a time associated with the electronic activity and a source associated with the electronic activity. In certain embodiments, the sub-array of occurrences, sources and times can be a fully featured sub-array of data with linkage to where the data came from.

F. Feature Extraction

The feature extraction engine 314 of the extraction engine 104 can be any script, file, program, application, set of instructions, or computer-executable code, that is configured to enable a computing device on which the feature extraction engine 314 is executed to extract or identify features from one or more electronic activities and/or corresponding node profiles maintained by the data processing system 100 and use the extracted or identified features to generate corresponding feature vectors for the one or more electronic activities.

The feature extraction engine 314 can be a component of the electronic activity parser 308 or otherwise interface with the electronic activity parser 308 to parse electronic activities and extract features from electronic activities. For example, the electronic activity parser 308 can parse ingested electronic activities, such as, emails, calendar meetings, and phone calls. The feature extraction engine 314 can, for each electronic activity, extract various features from the electronic activity and in some embodiments, from one or more node profiles corresponding to the electronic activity that an electronic activity linking engine 328 (described below) can use to link the electronic activity to one or more record objects of the one or more systems of record. In some embodiments, before an electronic activity can be linked to a record object of a system of record, the electronic activity can be matched to one or more node profiles in the node graph. In this way, the feature extraction engine 314 can generate, based on the parsed data from the electronic activity parser 308, a feature vector for the electronic activity that can be used to link the electronic activity to a record object based on features extracted from the electronic activity as well as one or more node profiles of the node graph.

The feature vector can be an array of feature values that is associated with the electronic activity. The feature vector can include each of the features that were extracted or identified in the electronic activity by the feature extraction engine 314. For example, the feature vector for an email can include the sending email address, the receiving email address, and data parsed from the email signature. Each feature value in the array can correspond to a feature or include a feature-value pair. For example, the contact feature "John Smith" can be stored in the feature vector as "John Smith" or "name: John Smith" or "first name: John" "last name: Smith." As described herein, a matching engine 316 (described below) can use the feature vector to match or link the electronic activity to a record object. The feature vector can include information extracted from an electronic activity and also include information inferred from one or more node profiles of the data processing system 100. The feature vector can be used to link an electronic activity to at least particular record object of a system of record by matching the feature values of the feature vector to a record object. For instance, if the feature vector includes the values "John" for first name and "Smith" for last name, the matching engine 316 can link the electronic activity to a record object, such as a lead record object that includes the name "John Smith" assuming other matching conditions are also met.

Figure 3C:
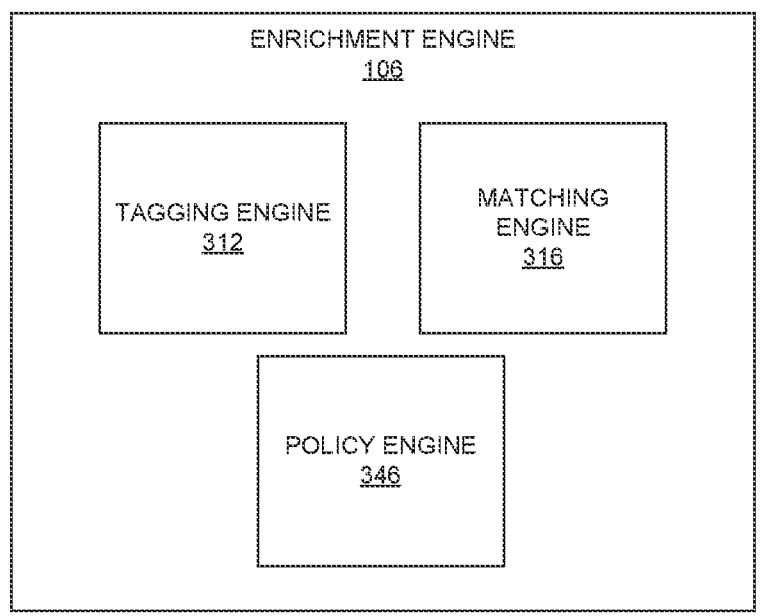

Referring now to FIG. 3C, FIG. 3C illustrates a detailed block diagram of the enrichment engine 106. The enrichment engine 106 may be configured to identify data extracted from electronic activities and update node graph 110 based on the extracted data. The enrichment engine 106 may include a tagging engine 312, matching engine 316, and/or a policy engine 346. The enrichment engine 106 and each of the components of the enrichment engine 106 can be any script, file, program, application, set of instructions, or computer-executable code.

G. Electronic Activity Tagging

The tagging engine 312 can be any script, file, program, application, set of instructions, or computer-executable code that is configured to enable a computing device on which the tagging engine 312 is executed to perform one or more functions of the tagging engine 312 described herein.

The tagging engine 312 can use information identified, generated or otherwise made available by the electronic activity parser 308. The tagging engine 312 can be configured to assign tags to electronic activities, node profiles, systems of record, among others. By having tags assigned to electronic activities, node profiles, records ingested from one or more systems of record, among others, the data processing system 100 can be configured to better utilize the electronic activities to more accurately identify nodes, and determine types and strengths of connections between nodes, among others. In some embodiments, the tagging engine 312 can be configured to assign a confidence score to one or more tags assigned by the tagging engine 312. The tagging engine 312 can periodically update a confidence score as additional electronic activities are ingested, re-ingested and analyzed. Additional details about some of the types of tags are provided herein.

The tagging engine 312 can assign one or more tags to electronic activities. The tagging engine 312 can determine, for each electronic activity, a type of electronic activity. Types of electronic activities can include meetings, electronic messages, and phone calls. For meetings and electronic messages such as emails, the tagging engine 312 can further determine if the meeting or electronic message is internal or external and can assign an internal tag to meetings or emails identified as internal or an external tag to meetings and emails identified as external. Internal meetings or emails may be identified as internal if each of the participants or parties included in the meeting or emails belong to the same company as the sender of the email or host of the meeting. The tagging engine 312 can determine this by parsing the email addresses of the participants and determining that the domain of the email addresses map to the domain name or an array of domain names, belonging to the same company or entity. In some embodiments, the tagging engine 312 can determine if the electronic activity is internal by parsing the email addresses of the participants and determining that the domain of the email addresses map to the same company or entity after removing common (and sometimes free) mail service domains, such as gmail.com and yahoo.com, among others. The tagging engine 312 may apply some additional logic to determine if emails belong to the same entity and use additional rules for determining if an electronic activity is determined to be internal or external. The tagging engine 312 can also identify each of the participants and determine whether a respective node profile of each of the participants is linked to the same organization. In some embodiments, the tagging engine 312 can determine if the node profiles of the participants are linked to a common group node (such as the organization's node) to determine if the electronic activity is internal. For phone calls, the tagging engine 312 may determine the parties to which the phone numbers are either assigned and determine if the parties belong to the same entity or different entities.

In some embodiments, the electronic activities are exchanged between or otherwise involve nodes (or the entities represented by the nodes). For example, the nodes can be representative of people or companies. In some embodiments, nodes can be member nodes or group nodes. A member node may refer to a node representative of a person that is part of a company or other organizational entity. A group node may refer to a node that is representative of the company or other organizational entity and is linked to multiple member nodes. The electronic activity may be exchanged between member nodes in which case the system is configured to identify the member nodes and the one or more group nodes associated with each of the member nodes.

The data processing system 100 can be configured to assign each electronic activity a unique electronic activity identifier. This unique electronic activity identifier can be used to uniquely identify the electronic activity. Further, each electronic activity can be associated with a source that provides the electronic activity. In some embodiments, the data source can be the company or entity that authorizes the data processing system 100 to receive the electronic activity. In some embodiments, the source can correspond to a system of record, an electronic activity server that stores or manages electronic activity, or any other server that stores or manages electronic activity related to a company or entity. As will be described herein, the quality, health or hygiene of the source of the electronic activity may affect the role the electronic activity plays in generating the node graph. The data processing system 100 can be configured to determine a time at which the electronic activity occurred. In some embodiments, the time may be based on when the electronic activity was transmitted, received or recorded. As will be described herein, the time associated with the electronic activity can also affect the role the electronic activity plays in generating the node graph.

H. Record Object Matching

The policy engine 346 can be any script, file, program, application, set of instructions, or computer-executable code that is configured to enable a computing device on which the policy engine 346 is executed to manage, store, and select matching strategies. The policy engine 346 can generate, manage, and store one or more matching strategy policies for each of the data source providers. For example, the policy engine 346 can generate matching strategy and restriction strategy policies for each division or group of users within a data source provider.

In some embodiments, a matching policy can include a data structure that indicates which matching strategies to apply to an electronic activity for a given data source provider. For example, the matching policy can include a list of matching strategies that are used to select record objects. The list of matching strategies can be manually created by a user or automatically generated or suggested by the system. In some embodiments, the policy engine 346 can learn one or more matching strategies based on observing how one or more users previously matched electronic activities to record objects. These matching strategies can be specific to a particular user, group, account, company, or across multiple companies. In some embodiments, the policy engine 346 can detect a change in linkages between one or more electronic activities and record objects in the system of record (for example, responsive to a user linking an electronic activity to another object inside a system of record manually). The policy engine 346 can, in response to detecting the change, learn from the detected change and update the matching strategy or create a new matching strategy within the matching policy. The policy engine 346 can be configured to then propagate the learning from that detected change across multiple matching strategies corresponding to one or more users, groups, accounts, and companies. The system can also be configured to find all past matching decisions that would have changed had the system detected the user-driven matching change before, and update those matching decisions retroactively using the new learning.

In some embodiments, the matching policy can also identify which restriction strategies to apply to an electronic activity for a given data source provider. For example, the matching policy can include a list of restriction strategies that are used to restrict record objects. The list of restriction strategies can be manually created by a user or automatically generated or suggested by the system. In some embodiments, the policy engine 346 can learn one or more restriction strategies based on observing how one or more users previously matched or unmatched electronic activities to record objects. These restriction strategies can be specific to a particular user, group, account, company, or across multiple companies. In some embodiments, the policy engine 346 can detect a change in linkages between one or more electronic activities and record objects in the system of record (for example, responsive to a user linking or unlinking an electronic activity to another object inside a system of record manually). The policy engine 346 can, in response to detecting the change, learn from the detected change and update the restriction strategy or create a new restriction strategy within the matching policy. The policy engine 346 can be configured to then propagate the learning from that detected change across multiple restriction strategies corresponding to one or more users, groups, accounts, and companies. The system can also be configured to find past matching decisions that would have changed had the system detected the user-driven restriction change before, and update those matching decisions retroactively using the new learning.

The policy engine 346 can update the matching policy with input or feedback from the data source provider with which the matching policy is associated. For example, the data source provider can provide feedback when an electronic activity is incorrectly linked and the matching policy can be updated based on the feedback. Updating a matching policy can include reordering the matching strategies, adding matching or restriction strategies, adjusting individual matching strategy behavior, removing matching strategies, or adding restriction strategies.

Figure 3D:
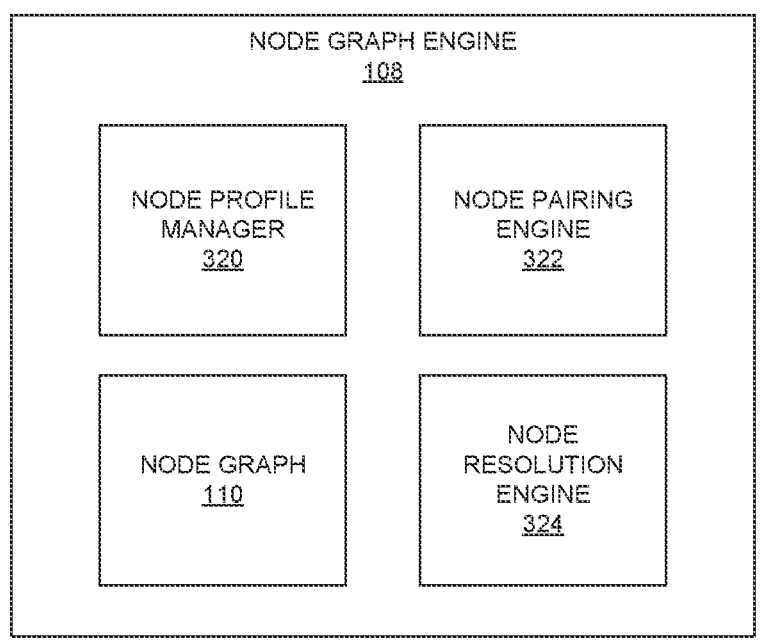

Referring now to FIG. 3D, FIG. 3D illustrates a detailed block diagram of the node graph engine 108. The node graph engine 108 may be configured to store and manage the node graph 110 and node profiles that are associated with the node graph 110. Node graph engine 108 may include a node profile manager 320, a node pairing engine 322, and a node resolution engine 324. The node graph engine 108 and each of the components of the node graph engine 108 can be any script, file, program, application, set of instructions, or computer-executable code designed or implemented to generate, modify, update, revise, and store node graph 110 (e.g., in one or more databases or data structures).

I. Node Profiles

The node profile manager 320 can be any script, file, program, application, set of instructions, or computer-executable code that is configured to enable a computing device on which the node profile manager 320 is executed to perform one or more functions of the node profile manager 320 described herein. The node profile manager 320 is configured to manage node profiles associated with each node. Node profiles of nodes are used to construct a node graph that includes nodes linked to one another based on relationships between the nodes that can be determined from electronic activities parsed and processed by the data processing system 100 as well as other information that may be received from one or more systems of record.

Figure 5:
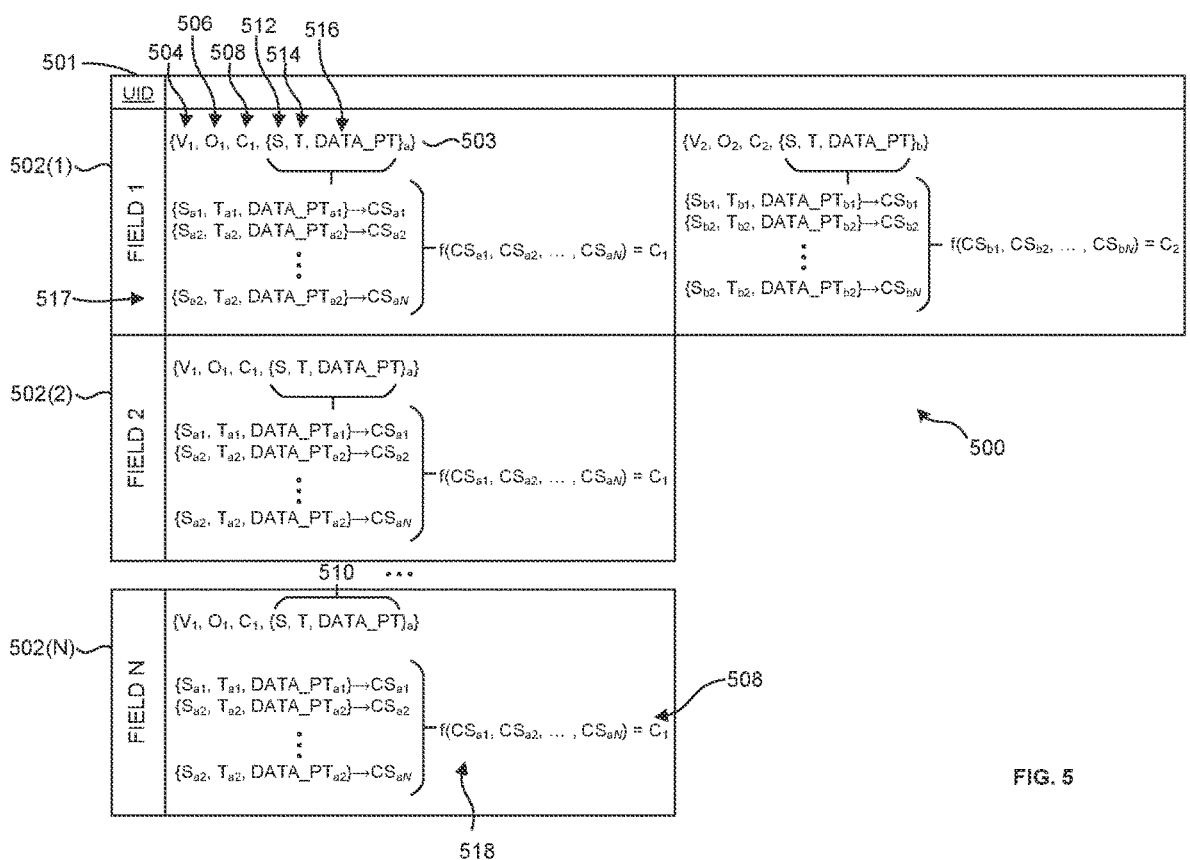
FIG. 5 illustrates a representation of a node profile of a node according to embodiments of the present disclosure.

Referring briefly to FIG. 5, depicted is a representation of a node profile 500 of a node. The node profile 500 may be generated by the node profile manager 320 (e.g., based on electronic activities). The node profile 500 can include a unique node identifier 501 and one or more fields 502(1)-502(N) (generally referred to as fields 502). Each field 502 can include one or more value data structures 503. Each value data structure 503 can include a value (V) 504, an occurrence metric (0) 506, a confidence score (C) 508, and an entry 510 corresponding to the electronic activity which was used for identifying the value 504. Each entry 510 can identify a data source (S) 512 from which the value 504 was identified (for instance, a data source 120 corresponding to a system of record or a data source 120 of an electronic activity), a number of occurrences of the value that appear in the electronic activity, a time 512 associated with the electronic activity, and a data point identifier 514 (e.g., identifying the electronic activity, such as an electronic activity unique identifier).

In some embodiments, the node profile manager 320 can be configured to compute the occurrence metric 506 based on the number of times a particular value 504 is identified in a group of electronic activities or systems of record. Hence, the occurrence metric 506 can identify or correspond to a number of times that value is confirmed or identified from electronic activities or systems of record. The node profile manager 320 can be configured to update the occurrence metric each time the value is confirmed. In some embodiments, the electronic activity can increase the occurrence metric of a value more than once. For instance, for a field such as name, the electronic activity parser 308 can parse multiple portions of an electronic activity. In some embodiments, parsing multiple portions of the electronic activity can provide multiple confirmations of, for example, the name associated with the electronic activity. In some embodiments, the occurrence metric is equal to or greater than the number of electronic activities or systems of record that contribute to the value. The node profile manager 320 further maintains an array including the plurality of entries 517.

The node profile manager 320 can be configured to maintain a node profile for each node that includes a time series of data points for value data structures 503 that is generated based on electronic activities identifying the respective node. The node profile manager 320 can maintain, for each field of the node profile, one or more value data structures 503. The node profile manager 320 can maintain a confidence score 508 for each value of the field. As described herein, the confidence score of the value can be determined using information relating to the electronic activities or systems of record that contribute to the value. The confidence score for each value can also be based on the below-described health score of the data source from which the value was received. As more and more electronic activities and data from more systems of record are ingested by the data processing system 100, values of each of the fields of node profiles of nodes will become more enriched thereby further refining the confidence score of each value.

In some embodiments, the node profile can include different types of fields for different types of nodes. Member node profiles and group node profiles may have some common fields but may also include different fields. Further, member node profiles may include fields that get updated more frequently than group nodes. Examples of some fields of member node profiles can include i) First name; ii) Last name; iii) Email; iv) job title; v) Phone; vi) Social media handle; vii) LinkedIn URL; viii) website; among others. Each of the fields can be a 3-dimensional array. In some embodiments, each field corresponds to one or more name value pairs, where each field is a name and each value for that field is a value. Examples of some fields of group nodes can include i) Company or Organization name; ii) Address of Company; iii) Phone; iv) Website; v) Social media handle; vi) LinkedIn handle; among others. Each of the fields can be a 3-dimensional array. In some embodiments, each field corresponds to one or more name value pairs, where each field is a name and each value for that field is a value.

The node profile manager 320 can maintain, for each field of each node profile, a field data structure that can be stored as a multidimensional array. The multidimensional array can include a dimension relating to data points that identify a number of electronic activities or system of records that contribute to the field or the value of the field. Another dimension can identify the source, which can have an associated trust score that can be used to determine how much weight to assign to the data point from that source. Another dimension can identify a time at which the data point was generated (for instance, in the case of a data point derived from an electronic activity such as an email, the time the data point was generated can be the time the electronic activity was sent or received). In the case of a data point being derived from a system of record, the time the data point was generated can be the time the data point can be entered into the system of record or the time the data point was last accessed, modified, confirmed, or otherwise validated in or by the system of record. These dimensions can be used to determine a confidence score of the value as will be described herein.

In some embodiments, the node profile manager 320 can be configured to compute the confidence score 508 as a function 518 of a number of occurrences of the value 504 included in an electronic activity. For example, the confidence score 508 of the value 504 may increase as the number of occurrences of the value 504 included in the electronic activity increases. In some embodiments, the node profile manager 320 can assign a contribution score (CS) to each entry 510 corresponding to a particular value (e.g., a data point). The contribution score can be indicative of the data point's contribution towards the confidence score 508 of the value. In some embodiments, the contribution score of an entry 510 can decay over time as the data point becomes staler. The contribution scores of each of the data points derived from electronic activities and systems of record can be used to compute the confidence score 508 of the value 504 of a field 502 of the node profile 500.

Each of the values 504 included in the node profile 500 can be supported by one or more data points or entries 510. Data points can be pieces of information or evidence that can be used to support the existence of values of fields of node profiles. A data point can be an electronic activity, a record object of a system of record, or other information that is accessible and processable by the data processing system 100. In some embodiments, a data point can identify an electronic activity, a record object of a system of record, or other information that is accessible and processable by the data processing system 100 that serves as a basis for supporting a value in a node profile. Each data point can be assigned its own unique identifier. Each data point can be associated with a source of the data point identifying an origin of the data point. The source of the data point can be a mail server, a system of record, among others. Each of these data points can also include a timestamp. The timestamp of a data point can identify when the data point was either generated (in the case of an electronic activity such as an email) or the record object that serves as a source of the data point was last updated (in the case when the data point is extracted from a system of record). Each data point can further be associated with a trust score of the source of the data point. The trust score of the source can be used to indicate how trustworthy or reliable the data point is. The data point can also be associated with a contribution score that can indicate how much the data point contributes towards a confidence score of the value associated with the data point. The contribution score can be based on the trust score of the source (which can be based in part on a health score of the source) and a time at which the data point was generated or last updated.

A confidence score of the value can indicate a level of certainty that the value of the field is a current value of the field. The higher the confidence score, the more certain the value of the field is the current value. The confidence score can be based on the contribution scores of individual data points associated with the value. The confidence score of the value can also depend on the corresponding confidence scores of other values of the field, or the contribution scores of data points associated with other values of the field.

The table below illustrates various values for various fields and includes an array of data points that contribute to the respective value. As shown in the table, the same electronic activity can serve as different data points for different values. Further, the table illustrates a simplified form for the same of convenience and understanding. Different values can be supported by different number of data points. As will be described below, it can be challenging to match electronic activities to node profiles.

| DP # | DP ID | TimeStamp | ActivityID | Source | Trust Score | Contribution Score |
|---|---|---|---|---|---|---|
| Field: First Name Value: John [Confidence Score] = 0.8 | | | | | | |
| DP 1: | DP ID101 | 2/1/2016 4 pm ET | EA-003 | Email | 100 | 0.6 |
| DP 2: | DP ID225 | 2/18/2016 2 pm ET | SOR-012 | CRM | 70 | 0.4 |
| DP 3: | DP ID343 | 3/1/2018 1 pm ET | EA-017 | Email | 100 | 0.7 |
| DP 4: | DP ID458 | 7/1/2018 3 pm ET | EA-098 | Email | 100 | 0.8 |
| DP 5: | DP ID576 | 9/12/2015 3 pm ET | SOR-145 | Talend | 20 | 0.2 |
| Field: First Name Value: Jonathan [Confidence Score] = 0.78 | | | | | | |
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID343 | 3/1/2018 1 pm ET | EA-017 | Email | 100 | 0.7 |
| DP 4: | DP ID458 | 7/1/2018 3 pm ET | EA-098 | Email | 100 | 0.8 |
| DP 5: | DP ID576 | 9/12/2015 3 pm ET | SOR-145 | Talend | 20 | 0.2 |
| Field: Title Value: Director [Confidence Score] = 0.5 | | | | | | |
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID243 | 3/1/2017 1 pm ET | EA-117 | Email | 100 | 0.65 |
| DP 4: | DP ID543 | 3/1/2018 1 pm ET | SOR-087 | CRM | 5 | 0.05 |
| Field: Title Value: CEO [Confidence Score] = 0.9 | | | | | | |
| DP 1: | DP ID343 | 3/1/2018 1 pm ET | EA-017 | Email | 100 | 0.7 |
| DP 2: | DP ID458 | 7/1/2018 3 pm ET | EA-098 | Email | 100 | 0.8 |
| DP 3: | DP ID425 | 3/18/2018 2 pm ET | SOR-015 | CRM | 65 | 0.54 |
| Field: Company Value: Acme [Confidence Score] = 0.6 | | | | | | |
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID343 | 3/1/2018 1 pm ET | EA-017 | Email | 100 | 0.7 |
| Field: Company Value: NewCo [Confidence Score] = 0.9 | | | | | | |
| DP 1: | DP ID458 | 7/1/2018 3 pm ET | EA-098 | Email | 100 | 0.8 |
| DP 2: | DP ID654 | 7/18/2018 2 pm ET | EA-127 | Email | 100 | 0.85 |
| DP 3: | DP ID876 | 8/1/2018 1 pm ET | EA-158 | Email | 100 | 0.9 |
| Field: Cell Phone Value: 617-555-2000 [Confidence Score] = 0.95 | | | | | | |
| DP 1: | DP ID101 | 2/1/2016 4 pm ET | EA-003 | Email | 100 | 0.6 |
| DP 2: | DP ID225 | 2/18/2017 2 pm ET | SOR-012 | CRM | 70 | 0.4 |
| DP 3: | DP ID343 | 3/1/2018 1 pm ET | EA-017 | Email | 100 | 0.7 |
| DP 4: | DP ID458 | 7/1/2018 3 pm ET | EA-098 | Email | 100 | 0.8 |
| DP 5: | DP ID576 | 9/12/2015 3 pm ET | SOR-145 | Talend | 20 | 0.2 |

-continued

| DP # | DP ID | TimeStamp | ActivityID | Source | Trust Score | Contribution Score |
|---|---|---|---|---|---|---|
| DP 6: | DP ID654 | 7/18/2018 2 pm ET | EA-127 | Email | 100 | 0.85 |
| DP 7: | DP ID876 | 8/1/2018 1 pm ET | EA-158 | Email | 100 | 0.9 |

As a result of populating values of fields of node profiles using electronic activities, the node profile manager 320 can generate a node profile that is unobtrusively generated from electronic activities that traverse networks. In some embodiments, the node profile manager 320 can generate a node profile that is unobtrusively generated from electronic activities and systems of record.

J. Matching Electronic Activity to Node Profiles

The node profile manager 320 can be configured to manage node profiles by matching electronic activities to one or more node profiles. Responsive to the electronic activity parser 308 parsing the electronic activity to identify values corresponding to one or more fields or attributes of node profiles, the node profile manager 320 can apply an electronic activity matching policy to match electronic activities to node profiles. In some embodiments, the node profile manager 320 can identify each of the identified values corresponding to a sender of the electronic activity to match the electronic activity to a node profile corresponding to the sender.

Using an email message as an example of an electronic activity, the node profile manager 320 may first determine if the parsed values of one or more fields corresponding to the sender of the email message match corresponding values of fields. In some embodiments, the node profile manager 320 may assign different weights to different fields based on a uniqueness of values of the field. For instance, email addresses may be assigned greater weights than first names or last names or phone numbers if the phone number corresponds to a company.

In some embodiments, the node profile manager 320 can use data from the electronic activity and one or more values of fields of candidate node profiles to determine whether or not to match the electronic activity to one or more of the candidate node profiles. The node profile manager 320 can attempt to match electronic activities to one or more node profiles maintained by the node profile manager 320 based on the one or more values of the node profiles. The node profile manager 320 can identify data, such as strings or values from a given electronic activity and match the strings or values to corresponding values of the node profiles. In some embodiments, the node profile manager 320 can compute a match score between the electronic activity and a candidate node profile by comparing the strings or values of the electronic activity match corresponding values of the candidate node profile. The match score can be based on a number of fields of the node profile including a value that matches a value or string in the electronic activity. The match score can also be based on different weights applied to different fields. The weights may be based on the uniqueness of values of the field, as mentioned above. The node profile manager 320 can be configured to match the electronic activity to the node with the best match score. For example, the best match score can be the highest or greatest match score. In some embodiments, the node profile manager 320 can match the electronic activity to each candidate node that has a match score that exceeds a predetermined threshold. Further, the node profile manager 320 can maintain a match score for each electronic activity to that particular node profile, or to each value of the node profile to which the electronic activity matched. By doing so, the node profile manager 320 can use the match score to determine how much weight to assign to that particular electronic activity. Stated in another way, the better the match between the electronic activity and a node profile, the greater the influence the electronic activity can have on the values (for instance, the contribution scores of the data point on the value and as a result, in the confidence scores of the values) of the node profile. In some embodiments, the node profile manager 320 can assign a first weight to electronic activities that have a first match score and assign a second weight to electronic activities that have a second match score. The first weight may be greater than the second weight if the first match score is greater than the second match score. In some embodiments, if no nodes are found to match the electronic activity or the match score between the email message and any of the candidate node profiles is below a threshold, the node profile manager 320 can be configured to generate a new node profile to which the node profile manager assigns a unique node identifier 501. The node profile manager 320 can then populate various fields of the new node profile from the information extracted from the electronic activity parser 308 after the electronic activity parser 308 parses the electronic activity.

In addition to matching the electronic activity to a sender node, the node profile manager 320 is configured to identify each of the nodes to which the electronic activity can be matched. For instance, the electronic activity can be matched to one or more recipient nodes using a similar technique except that the node profile manager 320 is configured to look at values extracted from the TO field or any other field that can include information regarding the recipient of the node. In some embodiments, the electronic activity parser 308 can be configured to parse a name in the salutation portion of the body of the email to identify a value of a name corresponding to a recipient node. In some embodiments, the node profile manager 320 can also match the electronic activity to both member nodes as well as the group nodes to which the member nodes are identified as members.

In some embodiments, the electronic activity parser 308 can parse the body of the electronic activity to identify additional information that can be used to populate values of one or more node profiles. The body can include one or more phone numbers, addresses, or other information that may be used to update values of fields, such as a phone number field or an address field. Further, if the contents of the electronic activity includes a name of a person different from the sender or recipient, the electronic activity parser 308 can further identify one or more node profiles matching the name to predict a relationship between the sender and/or recipient of the electronic activity and a node profile matching the name included in the body of the electronic activity.

The node profile manager 320 can be configured to identify a node that has fields having values that match the values included in the node profile of the node.

K. Node Profile Value Prediction and Augmentation

The node profile manager 320 can be configured to augment node profiles with additional information that can be extracted from electronic activities or systems of record or that can be inferred based on other similar electronic activities or systems of record. In some embodiments, the node profile manager 320 can determine a pattern for various fields across a group of member nodes (such as employees of the same company). For instance, the node profile manager 320 can determine, based on multiple node profiles of member nodes belonging to a group node, that employees of a given company are assigned email addresses following a given regex pattern. For instance, [first name]. [last name]@[company domain].com. As such, the node profile manager 320 can be configured to predict or augment a value of a field of a node profile of an employee of a given company when only certain information or limited of the employee is known by the node profile manager 320.

As described herein, the node profile manager 320 can be configured to use information from node profiles to predict other values. In particular, there is significant interplay between dependent fields such as phone numbers and addresses, and titles and companies, in addition to email addresses and names, among others.

Figure 6:
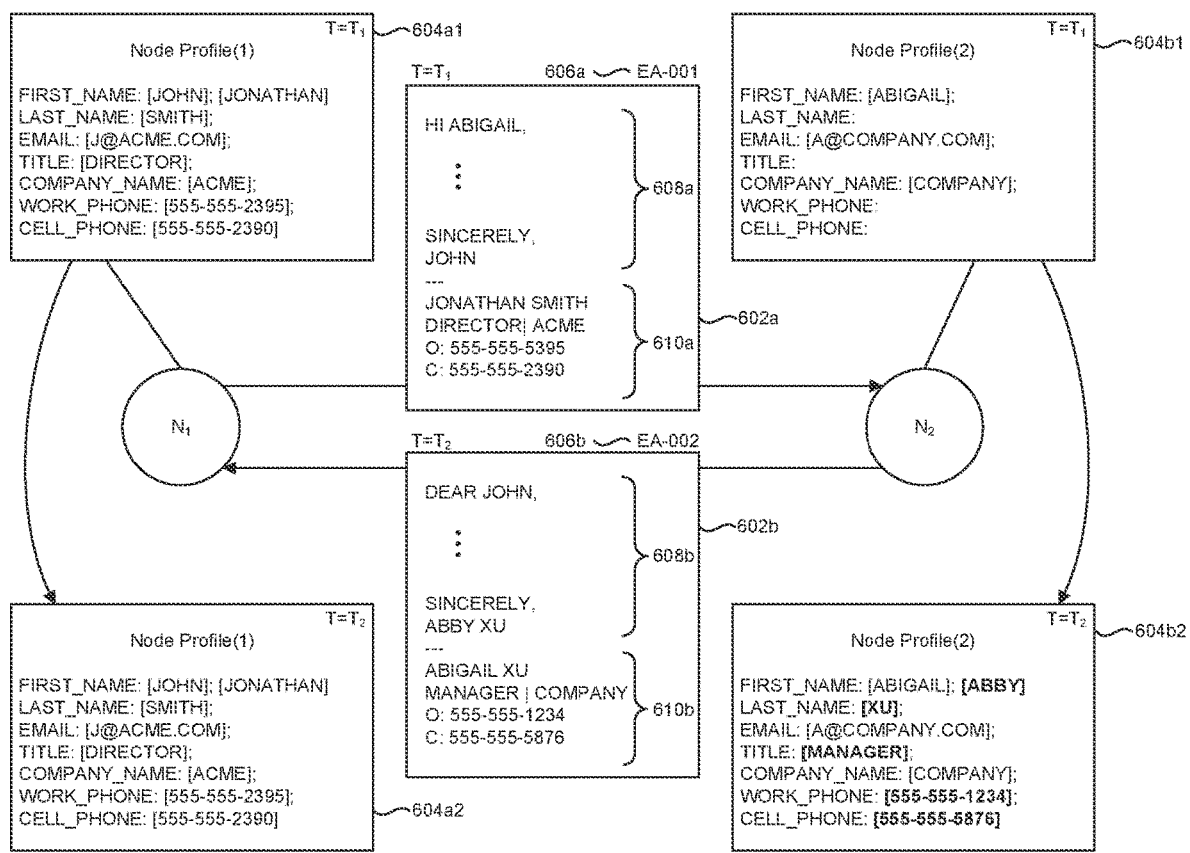
FIG. 6 illustrates a block diagram of a series of electronic activities between two nodes according to embodiments of the present disclosure.

For example, referring now to FIG. 6, FIG. 6 illustrates a series of electronic activities between two nodes. As described herein, a first node N1 and a second node N2 may exchange a series of electronic activities 602. FIG. 6 also shows a representation of two electronic activities 602a, 602b and representations of two node profiles 604a, 604b of the two nodes at two different states (e.g., 604a1, 604a2, 604b1, 604b2) according to embodiments of the present disclosure.

In FIG. 6, a first electronic activity 602a sent at a first time, T=T1, and a second electronic activity 602b sent at a second time, T=T2, are shown. The first electronic activity 602a includes or is associated with a first electronic activity identifier 606a ("EA-001"). The second electronic activity 602b includes or is associated with a second electronic activity identifier 606b ("EA-002"). The data processing system 100 can assign the first electronic activity identifier 606a to the first electronic activity 602a and the second electronic activity identifier 606b to the second electronic activity 602b. In some embodiments, the data processing system 100 can assign the first and the second electronic activities' unique electronic activity identifiers to allow the data processing system 100 to uniquely identify each electronic activity processed by the data processing system 100. Collectively, the first and second electronic activities can be referred to herein as electronic activities 602 or individually as electronic activity 602. Each electronic activity can include corresponding metadata, as described above, a body 608a and 608b, and a respective signature 610a and 610b. The signatures 610a and/or 610b may be included in the body 608 of the respective electronic activity 602.

The second electronic activity 602b can be sent as a response to the first electronic activity 602a. The data processing system 100 can determine that the second electronic activity 602b is a response to the first electronic activity 602a using one or more response detection techniques based on, for example, signals included in the electronic activity 602 including the metadata of the electronic activity, the subject line of the electronic activity, the participants of the electronic activity 602, and the body of the electronic activity 602. For instance, the data processing system 100 can determine that the second electronic activity 602b has a timestamp after the first electronic activity 602a. The data processing system 100 can determine that the second electronic activity 602b identifies the sender of the first electronic activity 602a as a recipient of the second electronic activity 602b. The data processing system 100 can determine that the second electronic activity 602b includes a subject line that matches one or more words of the subject line of the first electronic activity 602a. In some embodiments, the data processing system 100 can determine that the second electronic activity 602b includes a subject line that includes a string of characters of the subject line of the first electronic activity 602a and the string of characters is preceded by "RE:" or some other predetermined set of characters indicating that the second electronic activity 602b is a reply. In some embodiments, the data processing system 100 can determine that the body of the second electronic activity 602b includes the body of the first electronic activity 602a. The data processing system 100 can also determine that the second electronic activity 602b is a response to the first electronic activity 602a based on the participants included in both the electronic activities 602a, 602b. Furthermore, in some embodiments, the data processing system 100 can determine if the second electronic activity 602b is a forward of the first electronic activity 602a or a reply all of the first electronic activity 602a.

FIG. 6 also includes representations of two node profiles 604a, 604b associated with the first node N1 and the second node N2 at two different times, T=T$_1$ and T=T$_2$. The node profile 604a corresponds to the first node N1, who is the sender of the first electronic activity 602a and recipient of the second electronic activity 602b. Similarly, the node profile 604b corresponds to the second node N2, who is the recipient of the first electronic activity 602a and the sender of the second electronic activity 602b. The node profile manager 320 may update the node profiles 604a, 604b at a first time instance (e.g., node profile 604a1, node profile 604b1) following ingestion of the first electronic activity 602a. Similarly, the node profile manager 320 may update the node profiles 604a, 604b at a second time instance (node profile 604a2, node profile 604b2) after the first and second electronic activities 602a and 602b were ingested by the data processing system 100.

In some embodiments, as described herein, the node profile manager 320 of the data processing system 100 can maintain, for each value of each field of each node profile, a value data structure that can be stored as a multidimensional array. The multidimensional array can include a list of entries identifying data points that identify electronic activities or systems of record that contribute to the value of the field. Each data point can be associated with a source. For emails or other electronic activities, the source can be a mail server of a data source provider. For record objects, the source of the record object can be a system of record of the data source provider. Each source of a respective data point can have an associated trust score that can be used to determine how much weight to assign to the data point from that source. Each data point can also identify a time at which the data point was generated (for instance, in the case of a data point derived from an electronic activity such as an email, the time the data point was generated can be the time the electronic activity was sent or received). In the case of a data point being derived from a system of record, the time the data point was generated can be the time the data point can be entered into the system of record or the time the data point was last accessed, modified, confirmed, or otherwise validated in or by the system of record. The source of the data point and the time the data point was generated, last accessed, updated or modified, can be used to determine a contribution score of the data point, which can be used to determine the confidence score of the value. In some embodiments, the node profile manager 320 can generate, compute or assign a contribution score to each data point. The contribution score can be indicative of the data point's contribution towards the confidence score of the value. The contribution score of a data point can decay over time as the data point becomes staler. The contribution scores of each of the data points derived from electronic activities and systems of record can be used to compute the confidence score of the value of a field of the node profile.

Each of the node profiles 604 can include fields and corresponding values. For example, in the first node profile 604*a*, the field "First Name" is associated with the value "JOHN" and "JONATHAN," since the node ended the body 608*a* as "JOHN" but includes "JONATHAN" in the signature block 610. The first node profile 604*a* also includes the field "Title" which is associated with the value "Director." As shown in FIG. 6, the values of the first and last name and cell phone number remain the same at both time instances $T_1$ and $T_2$ for the node profile 604*a* (e.g., node profile 604*a*1 and 604*a*2 are the same).

On the other hand, and in another example, in the second node profile 604*b*, the field "First Name" is associated with the value Abigail. The second node profile 604*b* does not include the field "Title" as that information may not have been available to the data processing system 100. It should be appreciated that in the event the value was already associated with the field, the data processing system 100 can update the value data structure of the value by adding an entry identifying the electronic activity. In this way, the electronic activity serves as a data point that supports the value and can increase the confidence score of the value, which can further improve the accuracy of the information included in the node profile. At the second time instance $T_2$, the second node profile 604*b*2 was updated after the first and second electronic activities 602*a* and 602*b* were ingested. For example, the field "First Name" is associated with the value "ABAGAIL" based on the first electronic activity 602*a* and now includes "ABBY," since the node ended the body 608*a* as "ABBY." Additionally, the field "Title" is now associated with the value "Manager." The values of the "Work Phone No" and "Cell Phone No" fields have new values associated with them.

The value data structure of the value J@acme.com corresponding to the email field of the first node profile can be updated to include an entry identifying the second electronic activity 602*b*. The data processing system 100 can be configured to update the field-value pair of the first node profile 604*a* corresponding to email: J@acme.com, even though J@acme.com is a value previously associated with the email field of the first node profile 604*a*. The data processing system 100 can use the second electronic activity 602*b* to update the node profile 604*a* by not only adding new values, but also by updating the value data structures of existing values of the first node profile 604*a* to include entries identifying the second electronic activity 602*b*. By doing so, the data processing system 100 can continuously maintain the accuracy of the data included in the node profiles 604 and identify which values are still current and which values are now stale based on the last time a data point supported the particular value. As described herein, the data processing system 100 can be configured to generate respective contribution scores to each entry included in the value data structure of a value and use the respective contribution scores of each entry of the value data structure to determine a confidence score of the value of the field of the node profile. The data processing system 100 can further be configured to dynamically update the contribution scores and the confidence score based on a current time as the contribution scores of data points can change with time. In some embodiments, the contribution scores of data points can decrease with time as the data point becomes older.

L. Node Profile Inferences

Certain information about a node can be inferred by the data processing system 100 based on information included in electronic activities ingested by the data processing system 100. For instance, the node profile manager 320 or the tagging engine 312 can infer if a person has left a job or switched jobs if the occurrence counter for a first value stops increasing or the frequency at which the occurrences of the first value appear has been reduced and the occurrence counter for a second value is increasing or the occurrences are more recent or are received from a source that has a higher trust score indicating that the person has changed email addresses, which can indicate that the person has switched jobs. In certain embodiments, the data processing system 100 can determine if the second value corresponds to an email address corresponding to another employer or another company. In some embodiments, the data processing system 100 can determine if the domain name of the email address corresponds to a list of known domain names corresponding to personal, non-work email addresses (for instance, gmail.com, outlook.com), among others. In some embodiments, the data processing system 100 can determine if the domain name is associated with a predetermined minimum number of accounts with the same domain name. The node profile manager 320 can look at relevancy of Source, recency of time and Occurrences to determine whether to update the email field from the first email (Email_A) to the second email (Email_B).

In some embodiments, the field value confidence scorer 310 described herein can provide mechanisms to confirm validity of data using multiple data sources. For instance, each electronic activity can be a source of data. As more electronic activities are ingested and increase the occurrence of a value of a data field, the system can confirm the validity of the value of the field based on the number of occurrences. As such, the system described herein can compute a validity score of a value of a field of a node profile based on multiple data sources. For instance, the system can determine how many data sources indicate that the job title of the person is VP of Sales and can use the health score of those sources to compute a validity score or confidence score of that particular value. In addition, the timestamp associated with each electronic activity can be used to determine the validity score or confidence score of that particular value. More recent electronic activities may be given greater weight and therefore may influence the validity score of the particular value more than electronic activity that is much older.

The electronic activity that is generated and ingested in real-time or near real-time can be assigned a greater weight as the electronic activity has no bias, whereas data input manually into a system of record may have some human bias. In certain embodiments in which data is imported from systems of records, the weight the data has on a confidence score of the value is based on a trust score of the system of record from which the data is imported.

In some embodiments, the field value confidence scorer 310 can determine a confidence score of a data point based on the data sources at any given time. A data point can be a value of a field. For example, "VP, product" can be a value for a job title of a node profile. The field value confidence scorer 310 can utilize the electronic activities ingested in the system to determine how many electronic activities have confirmed that the value for the job title is VP of Product for that node in the email signatures present in those electronic activities. In some embodiments, the field value confidence scorer 310 can take into account a recency of the activity data and the source type or a health score of the source type to determine the confidence score of the value of the field. In some embodiments, the node profile manager 320 can determine a current value of a field based on the value of the field having the highest confidence score.

M. Node Connections

The node pairing engine 322 can be any script, file, program, application, set of instructions, or computer-executable code that is configured to enable a computing device on which the node pairing engine 322 is executed to perform one or more functions of the node pairing engine 322 described herein. The node pairing engine 322 can compute a connection strength between nodes based on one or more electronic activities associated with both of the nodes. More of the recent electronic activity between the two nodes will indicate a greater connection strength. Moreover, with different tags assigned to those electronic activities, the node pairing engine 322 can further determine the relationship between the two nodes and the context in which the two nodes are connected. For instance, two nodes may be connected through their work on one or more opportunities or one node may report to the second node, among others. The context behind the relationships can be derived from the electronic activity associated with the two nodes as well as other electronic activity associated with each node independent of the other node. In certain embodiments, the node pairing engine 322 can use metadata from the electronic activities to infer connection strength or relationships. For instance, the node pairing engine 322 can compute an average time a node takes to respond to another node and use the average time to respond to determine a connection strength. In some embodiments, the average time to respond is inversely proportional to the strength of the connection. Furthermore, the node pairing engine 322 can look at other information relating to the electronic activities to infer connection strengths. If a node responds to another node outside of business hours can be an indicator of connection strength or connection relationships.

The node pairing engine 322 can determine a connection strength between nodes at a given point in time across a timeline. As the nodes exchange further electronic activity, the connection strength can increase. The system is configured to determine the connection strength at a particular time period by filtering the electronic activities based on their respective times. In certain embodiments, the node pairing engine 322 can recalculate a connection strength between nodes responsive to a trigger. In some embodiments, the trigger can be based on a confidence score falling below a predetermined threshold indicating that the confidence in a particular value is unstable or unusable. For instance, the trigger can be satisfied or actuated when the node pairing engine 322 determines that the confidence score of a particular value of a field, such as a current employer of a person is below a predetermined confidence score (indicating that the person may no longer be at a particular company). In certain embodiments, certain changes to values in fields can trigger recalculating a connection strength irrespective of activity volume, for instance, when a new value under the employer field is added in the node.

In some embodiments, the node pairing engine 322 can determine a connection strength between two nodes by identifying each of the electronic activities that associate the nodes to one another. In contrast to other systems that may rely on whether a node has previously connected with another node, the node pairing engine 322 can determine a connection strength at various time periods based on electronic activities that occur before that time period. In particular, the node pairing engine 322 can determine staleness between nodes and take the staleness to determine a current connection strength between nodes. As such, the node pairing engine 322 can determine a temporally changing connection strength. For instance, the node pairing engine 322 can determine how many interactions recently between the two nodes. The node pairing engine 322 can determine whether the connection between the two nodes is cold or warm based on a length of time since the two nodes were involved in an electronic activity or an amount of electronic activity between two nodes. For instance, the node pairing engine 322 can determine that the connection strength between two nodes is cold if the two nodes have not interacted for a predetermined amount of time, for instance a year. In some embodiments, the predetermined amount of time can vary based on previous electronic activity or past relationships by determining additional information from their respective node profiles. For instance, former colleagues at a company may not have a cold connection strength even if they do not communicate for more than a year.

N. Node Resolution

The node resolution engine 324 can be any script, file, program, application, set of instructions, or computer-executable code that is configured to enable a computing device on which the node resolution engine 324 is executed to perform one or more functions of the node resolution engine 324 described herein.

The node resolution engine 324 is configured to resolve nodes to which electronic activities are to be linked or otherwise associated. The node resolution engine 324 can use the parsed information from the electronic activity to identify values included in node profiles to determine a match score between the electronic activity and a given node profile. The node resolution engine 324 can match the electronic activity to one or more node profiles based on a match score between the electronic activity and each of the node profiles exceeding a certain threshold. Different fields are assigned different weights based on the uniqueness of each value. In some embodiments, the uniqueness of each value can be determining how many node profiles include the same value for the given field relative to the total number of node profiles.

In some embodiments, the node resolution engine 324 may match the electronic activity to the nodes between which the electronic activity occurred. The node resolution engine 324 or the node pairing engine can establish an edge between the two nodes corresponding to the electronic activity.

In some embodiments, the node resolution engine 324 may not be able to determine if the electronic activity matches any of the existing node profiles maintained by the node profile manager 320.

In some embodiments, the node resolution engine 324 can perform identity resolution or deduplication based on one or more unique identifiers associated with a node profile. For instance, if one system of record provides a first email address, uniquename@example 1.com and another system of record provides a second email address, uniquename@example 2.com, while there is not a direct match, the node resolution engine 324 can resolve the two identifiers if there is a statistically significant number of matching or near matching fields, tags, or other statistical resemblances.

Figure 3E:
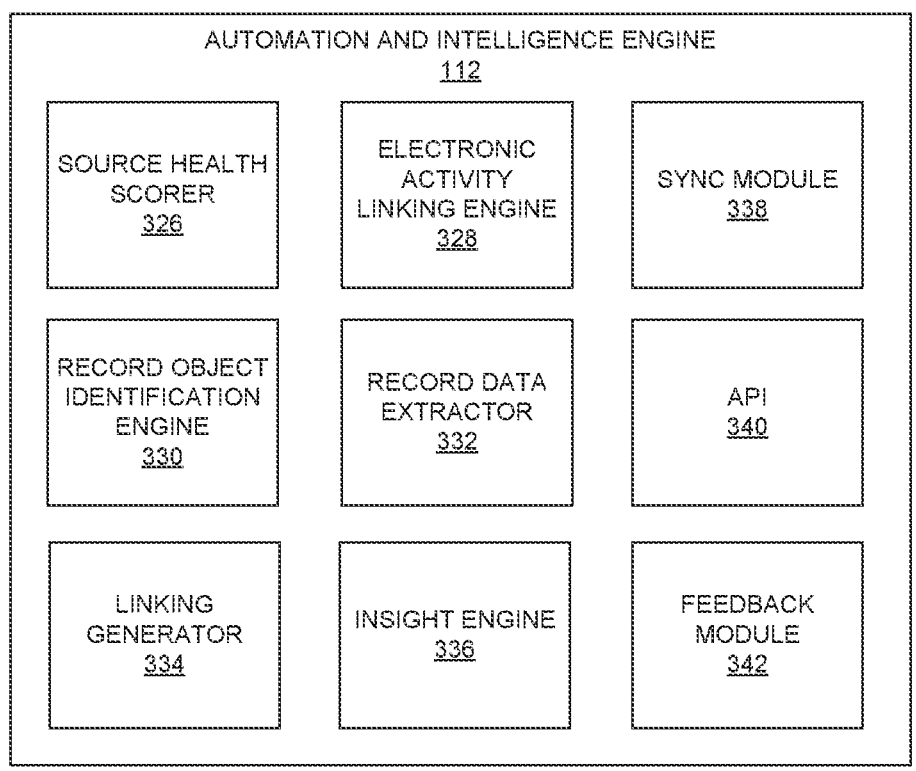

Referring now to FIG. 3E, FIG. 3E illustrates a detailed block diagram of the automation and intelligence engine 112. The automation and intelligence engine 112 may include a source health scorer 326, an electronic activity linking engine 328, a record object identification engine 330, record data extractor 332, a linking generator 334, and an insight engine 336, and a link restriction engine 344. The automation and intelligence engine 112 can further include a sync module 338, an API 340, and a feedback module 342. In some embodiments, the automation and intelligence engine 112 can further include or be communicably coupled to the record object manager 306. The automation and intelligence engine 112 and each of the components of the automation and intelligence engine 112 can be any script, file, program, application, set of instructions, or computer-executable code. The insight engine 336 can be any script, file, program, application, set of instructions, or computer-executable code that is configured to determine insights for a company. For instance, the data processing system 100 can provide insights to Company A by processing electronic activities and record objects that Company A has made accessible to the data processing system 100. The insights can include metrics at a company level, a department level, a group level, a user level, among others. The insights can identify patterns, behaviors, trends, metrics including performance related metrics at a company level, a department level, a group level, a user level, among others.

O. Source Health Scores Including Field-Specific Health Scores, Overall Health Scores and Determining Trust Scores Based on Health Scores The source health scorer 326 can be any script, file, program, application, set of instructions, or computer-executable code that is configured to enable a computing device on which the source health scorer 326 is executed to perform one or more functions of the source health scorer 326 described herein. The source health scorer 326 is configured to access a system of record and retrieve data stored in the system of record. The source health scorer 326 can then identify each record object stored in the system of record and determine, for each record object, a number of missing values of fields. The source health scorer 326 can then generate a field-specific score for each field indicating a health or quality of each field of the system of record. The source health scorer 326 can further determine an overall health score for the source based on the field-specific scores of each field. In some such embodiments, the overall health score is based on missing field values.

The source health scorer 326 can further be configured to determine if the values of fields of record objects are accurate by comparing the values to node profiles maintained by the node profile manager 320 or to record objects maintained by the record object manager 306. Based on the number of values that are inconsistent with the values maintained by data processing system 100, the source health scorer 326 can generate a health score for the system of record.

The source health scorer 326 can similarly generate a health score for each system of record. The source health scorer 326 can then compare the health score of a given system of record to the aggregate health scores of a plurality of systems of record to determine a relative trust score of the system of record. In some embodiments, the source health scorer 326 can assign different weights or scores to different types of systems of record. The source health scorer 326 may assign lower health scores to data included in a system of record that is generated using manual entry relative to node profiles that are automatically populated or generated by the data processing system 100 based on electronic activities.

Further, different types of sources can include emails, or email signatures within an email, one or more systems of record, among many other source types. The trust score of a source can be determined based on the health score of the source, at least in the case of a system of record. In some embodiments, the trust score assigned to electronic activity such as an email can be greater than a trust score assigned to a data point derived from a system of record as the system of record can be manually updated and changed. Additional details regarding the health score of a system of record are described below.

In some embodiments, the health score of a system of record maintained by a data source provider can be determined by comparing the record objects of the system of record with data that the system has identified as being true. For instance, the data processing system 100 can identify, based on confidence scores of values (as described below) of fields, that certain values of fields are true. For instance, the system may determine that a value is true or correct if multiple data points provide support for the same value. In some embodiments, the multiple data points may for example, be at least 5 data points, at least 10 data points, or more. The data processing system 100 can then, for a value of a field of a record object of the system of record, compare the value of the system of record to the value known to the system to be true. The system can repeat this for each field of a record object to determine if any values of a record object are different from the values the system knows to be true. In some embodiments, when determining the health score, the system may only compare those values of fields of record objects of the system of record that the system has a corresponding value that the system knows is true. For instance, the system may know that a phone number of a person "John Smith" is 617-555-3131 and may identify such a number as true based on multiple data points. However, the system may not know an address of the person John Smith. In such an instance, the system may only compare the phone number of the record object corresponding to John Smith to determine the health score of the system of record but not compare the address of the person John Smith as the system does not know the address of John Smith. Furthermore, even if the node profile of John Smith had an address but the confidence score of the address was below a predetermined threshold, the system would not compare the address from the system of record to the address of the node profile since the system does not have enough confidence or certainty that the address is true. As such, the system can be configured to determine the health score of a system of record by comparing certain values of record objects of the system of record to values the system knows as true or above a predetermined confidence score. In this way, in some embodiments, the health score of the system of record is based on an accuracy of the data included in the system of record rather than how complete the system of record is not.

The health score of a system of record can be an overall health score that can be based on aggregating individual field-specific health scores of the system of record. It should be appreciated that the data processing system 100 can assign different weights to each of the field-specific health scores based on a volume of data corresponding to the respective field, a number of values that does not match values the data processing system 100 knows to be true, among others.

The data processing system 100 can compute trust scores for data points based on the health score of a system of record. In some embodiments, the data processing system 100 can compute the trust score based on the overall health score of the system of record that is the source of the data point. However, in some embodiments, it may be desirable to configure the data processing system 100 to provide more granularity when assigning a trust score to a system of record that is the source of the data point. For instance, a company may meticulously maintain phone numbers of record objects but may not be so meticulous in maintaining job titles of record objects such that the field-specific health score for the phone number field of the system of record is much better than the field-specific health score for the job title field and also better than the overall health score of the system of record determined based on the aggregate of the respective field-specific health scores of fields of the system of record. In some embodiments, as will be described herein, if a data point supporting a phone number of a node profile is provided by the system of record, the data processing system 100 may be configured to determine a trust score for the data point based on the field-specific health score of the field "phone number" for the system of record rather than the overall health score of the system of record, which is lower because the field-specific health score of the field "job title" of the system of record is much lower than the field-specific health score of the field "phone number." By determining trust scores based on the field-specific health scores of systems of record, the data processing system 100 may be able to more accurately rely on the data point and provide a more accurate contribution score of the data point as will be described herein.

P. Linking Electronic Activity to Systems of Record Data

Enterprises and other companies spend significant amount of resources to maintain and update one or more systems of records. Examples of systems of records can include customer relationship management (CRM) systems, enterprise resource planning (ERP) systems, document management systems, applicant tracking systems, among others. Typically, these systems of records are manually updated, which can result in multiple issues. First, the information that is updated into the systems of records can be incorrect either due to human error or in some cases, malicious intent. Second, the information may not be updated in a timely manner. Third, employees may not be motivated enough to even update the systems of records, resulting in systems of records that include outdated, incorrect, or incomplete information. To the extent that enterprises rely on the data included in their systems of records to make projections or predictions, such projections and predictions may also be inaccurate as the data relied upon is also inaccurate. The present disclosure aims to address these challenges that enterprises face with their existing systems of records. In particular, the present disclosure describes systems and methods for linking electronic activities to record objects included in one or more systems of record. Electronic activities, such as electronic mail, phone calls, calendar events, among others, can be used to populate, update, and maintain states of record objects of systems of record. As electronic activities are exchanged between users, these electronic activities can be parsed to not only update a node graph as described above, but further update shadow record objects for one or more systems of records of enterprises that have provided access to such systems of record to the data processing system 100. As described herein, the shadow record objects can be synced with the record objects of the one or more systems of records of the enterprises. In some embodiments, the electronic activities can be used to directly update the one or more systems of records of the enterprises without first updating a shadow record object. As described herein, and also referring to FIG. 3E, the updating of record objects with electronic activity can refer to updating record objects within systems of record 118 and/or shadow record objects within the shadow systems of record 218. By way of the present disclosure, the data processing system 100 can use the electronic activities to populate, maintain, and update states of record objects of systems of record 118 and/or shadow systems of record 218.

The data processing system 100 can include the electronic activity linking engine 328, which is configured to link electronic activities to record objects of one or more systems of record. By linking the electronic activities to such record objects, the electronic activity linking engine 328 can be configured to update states of one or more record objects based on the electronic activities. The electronic activity linking engine 328 can be any script, file, program, application, set of instructions, or computer-executable code, that is configured to enable a computing device on which the electronic activity linking engine 328 is executed to perform one or more functions of the electronic activity linking engine 328 described herein.

Linking electronic activities to record objects can also be referred to as matching or mapping the electronic activities to record objects. Linking the electronic activities to the record objects can provide context to the electronic activities. The linked electronic activities can be stored in association with one or more record objects to which the electronic activity is linked in a system of record. Linking an electronic activity to a record object can provide context to the electronic activity by indicating what happened in the electronic activity or record object, who was involved in the electronic activity or record object, and to what contact, node, person or business process, the electronic activity or record object should be assigned. Linking the electronic activity to the record object can indirectly provide context as to why the electronic activity occurred. In some embodiments, linking an electronic activity to or with a record object of a system of record can include storing, in one or more data structures, an association between the electronic activity and the record object.

Although the description provided herein may refer to record objects and business processes corresponding to customer relationship management systems, it should be appreciated that the present disclosure is not intended to be limited to such systems of records but can apply to many types of systems of record including but not limited to enterprise resource planning systems, document management systems, applicant tracking systems, among others. For the sake of clarity, the electronic activities can be matched to record objects directly without having to link the electronic activities to node profiles. In some embodiments, the electronic activities can be matched to node profiles and those links can be used to match some of the electronic activities to record objects.

The electronic activity linking engine 328 can use metadata to identify a data source provider associated with an ingested electronic activity and identify a corresponding system of record. The electronic activity linking engine 328 can match the electronic activity to a record object of the corresponding system of record. The electronic activity linking engine 328 can include, or otherwise use, a tagging engine, such as the tagging engine 312 described above, to determine and apply tags to the ingested electronic activities. The electronic activity linking engine 328 can include the feature extraction engine 314 to extract features from the electronic activities that can be used to link electronic activities with one or more record objects of systems of records. In some embodiments, some of the features can include values corresponding to values stored in one or more node profiles maintained by the data processing system 100. The features, however, can include other information that may be used in conjunction with information also included in node profiles to link the electronic activity to one or more record objects included in one or more systems of record.

The electronic activity linking engine 328 can include the record object identification engine 330 to identify which record object or objects within a system of record to match a given electronic activity. In some embodiments, the electronic activity linking engine 328 can include the policy engine 346. The policy engine 346 can maintain policies that include strategies for matching the electronic activities to the record objects. The electronic activity linking engine 328 can include a link restriction engine 344 that can apply one or more policies from the policy engine 346 when linking electronic activities to record objects. The link restriction engine 344 can limit which record objects can be linked with each other. The electronic activity linking engine 328 can link the electronic activity to the record object identified by the record object identification engine 330. The record object identification engine 330 can determine or select one or more record objects to which an electronic activity should be linked or matched.

Figure 7:
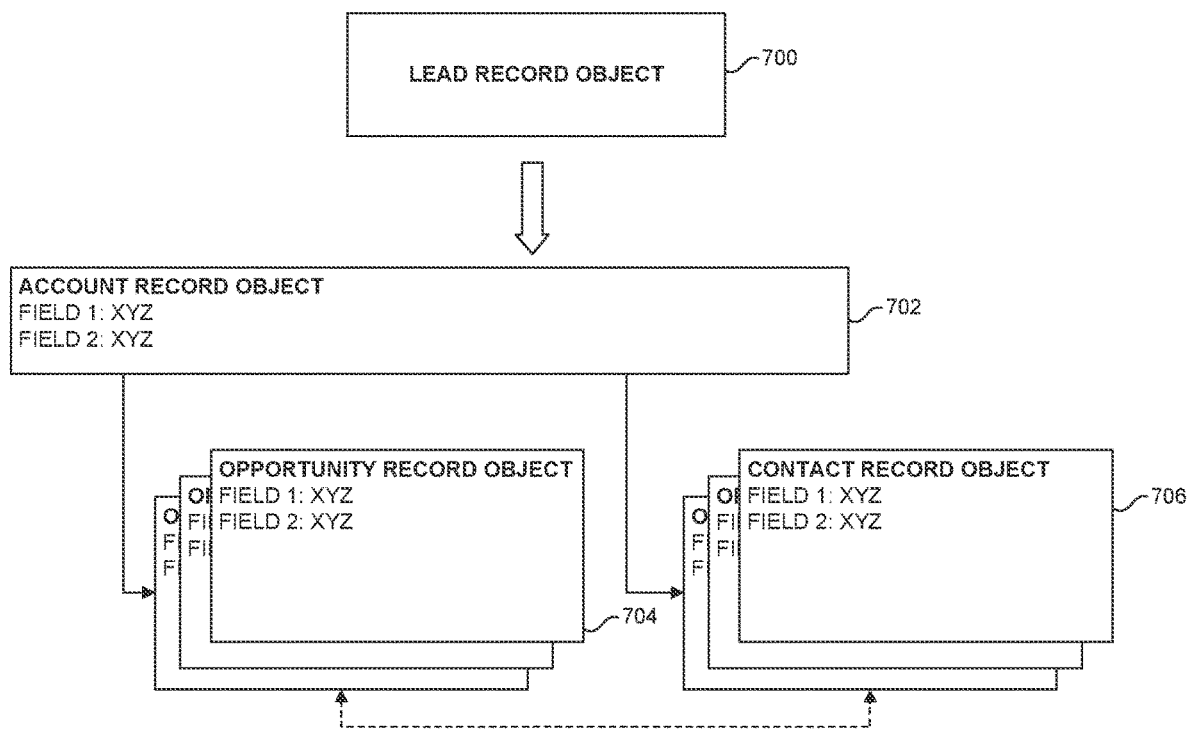
FIG. 7 illustrates a plurality of example record objects, and their interconnections, according to embodiments of the present disclosure.

Referring further FIG. 3E and also to FIG. 7, the data processing system 100 can operate various record objects, such as the record objects illustrated in FIG. 7, and their interconnections. The record objects shown in FIG. 7 can be record objects or data records of a system of record, such as a customer relationship management (CRM) system. It should be appreciated that other types of systems of records and record objects may exist and can be integrated with the data processing system 100. For instance, other systems of records can include Applicant Tracking Systems (ATS), such as Lever, located in San Francisco, CA or Talend by Talend Inc., located in Redwood City, CA, enterprise resource planning (ERP) systems, customer success systems, such as Gainsight located in Redwood City, CA, Document Management Systems, among others.

The systems of record can be one or more of shadow systems of record of the data processing system 100 or the systems of record of the data source providers. Additional details relating to the shadow systems of record of the data processing system 100 are provided below. As illustrated in FIG. 7, the record objects can include a lead record object 700, an account record object 702, an opportunity record object 704, or a contact record object 706. Each of the different types of record objects can generally be referred to as record objects.

Each record object can be a data structure or data file into which data is stored or associated. The lead record object 700 can be a low quality object that includes unqualified contact information typically received through a web inquiry. A lead record object can correspond to one or more stages. Upon reaching a final "Converted" stage, a lead record object can be converted in a one-to-many relationship into a Contact record object (person), an Account record object (company, if new, or added to existing account) and an Opportunity record object (if there is an opportunity for a deal here or added as contact role into existing opportunity).

For example, the lead record object 700 can include the contact information for a lead or prospective buyer. The lead record object 700 can include fields, such as, Address, City, Company, CompanyDunsNumber, Description, Email, Industry, NumberOfEmployees, Phone, job title, and Website, among others.

The account record object 702 can be a data structure that includes fields associated with an account that is held with the data source provider. The fields can include AccountNumber, BillingAddress, Description, Industry, Fax, DunsNumber, LastActivityDate, MasterRecordId, Name, NumberOfEmployees, Ownership, Website, YearStarted, and IsPersonAccount, among others. A system of record can include an account record object 702 for each of the data provider's customers. The system of record can include multiple account record objects 702 for a given customer. For example, the system of record can include an account record object 702 for each division of a given customer. The account record object 702 can be stored with one or more opportunity record objects 704.

In some embodiments, the CRM can include partner record objects, which can also be referred to as partner account record objects. A partner account record object can be similar to an account record object. The partner account record object can include an additional field to designate the record object as a partner account record object rather than a standard account record object. The partner account record object can be an account record object that is associated with a partner to the data source provider. For example, the partner account record object can be an account record object for a distributor of the data source provider that distributes goods to the company of the account record object.

The opportunity record objects 704 can be data structures that include a plurality of fields for a given opportunity. The opportunity can indicate a possible or planned deal with a customer for which an account record object is already stored in the system of record. The opportunity record objects 704 can include fields such as AccountId, Amount, CampaignId, CloseDate, Description, ExpectedRevenue, Fiscal, HasOpenActivity, IsClosed, IsWon, LastActivityDate, Name, OwnerId, StageName, Territory2Id, and Type, among others. One or more contact record objects 706 can be associated with the account record object 702. The contact record objects 706 can be data structures that include fields associated with a contact. The contact record object 706 can include fields such as FirstName, LastName, AccountId, Department, Email, Fax, WorkPhone, HomePhone, MobilePhone. StreetAddress, City, State, Country, DoNotCall, and HasOptedOutOfEmail, among others.

One or more contact record objects 706 can be associated with an opportunity record object 704 via an Opportunity Contact Role (OCR). For example, a lead to sell a service to a potential customer can convert into an opportunity record object 704 when the customer begins the negotiation process to purchase the service. A contact record object 706 can be generated for each of the customer's employees involved in the purchase. Each of the contact record objects 706 can be associated with the opportunity record object 704 for the sale via Opportunity Contact Roles, which contain their own metadata about involvement of specific individuals in the opportunity, such as their Role in this particular opportunity or whether they are the Primary Contact of the Account in this Opportunity.

In some embodiments, a lead record object 700 can be converted into an account record object 702, an opportunity record object 704, and/or a contact record object 706. For example, a lead record object 700 can be converted into a new contact record object 706, account record object 702, and/or opportunity record object 704 after a predetermined number and nature of electronic activities are associated with the lead record object 700. Continuing this example, the lead record object 700 can be generated based on a web inquiry from an interested party (lead) or via a cold email being sent to a potential new customer. If the customer responds and passes qualification criteria, the lead record object 700 can be converted into a new contact record object 706, account record object 702, and opportunity record object 704. In some embodiments, the lead record object 700 can be converted into a, for example, contact record object 706 that can get attached to or linked with an existing account record object 702 and an existing opportunity record via an Opportunity Contact Role.

The fields of each of the different record object types can include hierarchical data or the fields can be linked together in a hierarchical fashion. The hierarchical linking of the fields can be based on the explicit or implicit linking of record objects. For example, a contact record object can include a "Reports To" field into which an identifier of the contact can be stored. The "Reports To" field can indicate an explicit link in a hierarchy between two contact record objects (e.g., the first contact record object to the contact record object of the person identified by the "Reports To" field). In another example, the linking of the record objects can be implicit and learned by the electronic activity linking engine 328. For example, the electronic activity linking engine 328 can learn if multiple customers have the same value for a "Parent Account" field across multiple system of record sources with high trust score and derive a statistically significant probability that a specific account belongs to (e.g., is beneath the record object in the given hierarchy) another account record object.

The record object identification engine 330 can include one or more matching models (not shown). A matching model can be trained or programmed to aid in matching electronic activities to record objects to allow the electronic activity linking engine 328 to link the electronic activities to the matched record objects. For example, the record object identification engine 330 can include or use one or more matching models to assist, aid or allow the electronic activity linking engine 328 to match electronic activities to record objects. In some embodiments, each of the one or more matching models can be specific to a particular data source provider, electronic activity type, or record object type. In some embodiments, the record object identification engine 330 can include a single matching model that the record object identification engine 330 can use to match electronic activities ingested by the data processing system 100 to any number of a plurality of record objects of a plurality of systems of records. In some embodiments, the matching models can be data structures that include rules or heuristics for linking electronic activities with record objects. The matching models can include matching rules (which can be referred to as matching strategies) and can include restricting rules (which can be referred to as restricting strategies or pruning strategies). The record object identification engine 330 can use the matching strategies to select candidate record objects to which the electronic activity could be linked and use the restricting strategies to refine, discard, or select from the candidate record objects. In some embodiments, the matching models can include a data structure that includes the coefficients for a machine learning model for use in linking electronic activities with record objects.

In some embodiments, the matching model used to link electronic activities to one or more record objects can be trained using machine learning or include a plurality of heuristics. For example, as described above the feature extraction engine 314 can generate a feature vector for each electronic activity. The matching model can use neural networks, nearest neighbor classification, or other modeling approaches to classify the electronic activity based on the feature vector. In some embodiments, the record object identification engine 330 can use a subset of an electronic activity's features to match the electronic activity to a record object.

In some embodiments, the record object identification engine 330 can use matching models trained with machine learning to match, for example, the electronic activity to a record object based on a similarity of the text in and the sender of the electronic activity with the text in and sender of an electronic activity previously matched to a given electronic activity. In some embodiments, the matching model can be updated as electronic activities are matched to record objects. For example, a matching model can include one or more rules to use when matching an electronic activity to a record object. If a user matches an electronic activity to a record object other than the record object to which the electronic activity linking engine 328 matched the electronic activity, record object identification engine 330 can update the matching model to alter or remove the rule that led to the incorrect matching.

In some embodiments, once an electronic activity is matched with a record object, a user can accept or reject the linking. Additionally, the user can change or remap the linking between the electronic activity and the record object. In some embodiments, the matching model can include a plurality of heuristics with which the record object identification engine 330 can use to link an electronic activity to one or more record objects. The heuristics can include a plurality of matching algorithms that are encapsulated into matching strategies. The record object identification engine 330 can apply one or more matching strategies from the matching models to the electronic activity to select which record object (or record objects) to link with the electronic activity. In some embodiments, the record object identification engine 330 can use the matching strategies to select candidate record objects to which the electronic activity can be linked. The record object identification engine 330 can use a second set of strategies (e.g., restricting strategies) to prune the candidate record objects and select to which of the candidate record objects the electronic activity should be linked.

The application of each strategy to an electronic activity can result in the selection of one or more record objects (e.g., candidate record objects). The selection of which matching strategies to apply to an electronic activity can be performed by the policy engine 346. The policy engine 346 is described further below, but briefly, the policy engine 346 can generate, manage or provide a matching policy for each of the data source providers 122. The policy engine 346 can generate the matching policy automatically. The policy engine 346 can generate the matching policy with input or feedback from the data source provider 122 to which the matching policy is associated. For example, the data source provider (for example, an administrator at the data source provider) can provide feedback when an electronic activity is incorrectly linked and the matching policy can be updated based on the feedback.

A given matching policy can include a plurality of matching strategies and the order in which the matching strategies should be applied to identify one or more record objects to which to link the electronic activity. The record object identification engine 330 can apply one or more of the plurality of matching strategies from the matching models, in a predetermined order specified or determined via the matching policy, to identify one or more candidate record objects. The record object identification engine 330 can also determine, for each matching strategy used to identify a candidate record object, a respective weight that the record object identification engine 330 should use to determine whether or not the candidate record object is a good match to the electronic activity. The record object identification engine 330 can be configured to compute a matching score for each candidate record object based on the plurality of respective weights corresponding to the matching strategies that were used to identify the candidate record object. The matching score can indicate how closely a record object matches the electronic activity based on the one or more matching strategies used by the record object identification engine 330.

One or more of the matching strategies can be used to identify one or more candidate record objects to which the electronic activity linking engine 328 can match a given electronic activity based on one or more features (e.g., an email address) extracted from the electronic activity or tags assigned to the electronic activity. In some embodiments, the features can be tags assigned by the tagging engine 312. In some embodiments, the electronic activity can be matched to a node profile that is already matched to a record object, thereby allowing the record object identification engine 330 to match the electronic activity to a record object previously matched or linked to a node profile with which the electronic activity may be linked. In addition, the matching strategies can be designed or created to identify candidate record objects using other types of data included in the data processing system, or one or more systems of record, among others. In some embodiments, the matching strategies can be generated by analyzing how one or more electronic activities are matched to one or more record objects, including using machine learning techniques to generate matching strategies in a supervised or unsupervised learning environments.

Figure 8:
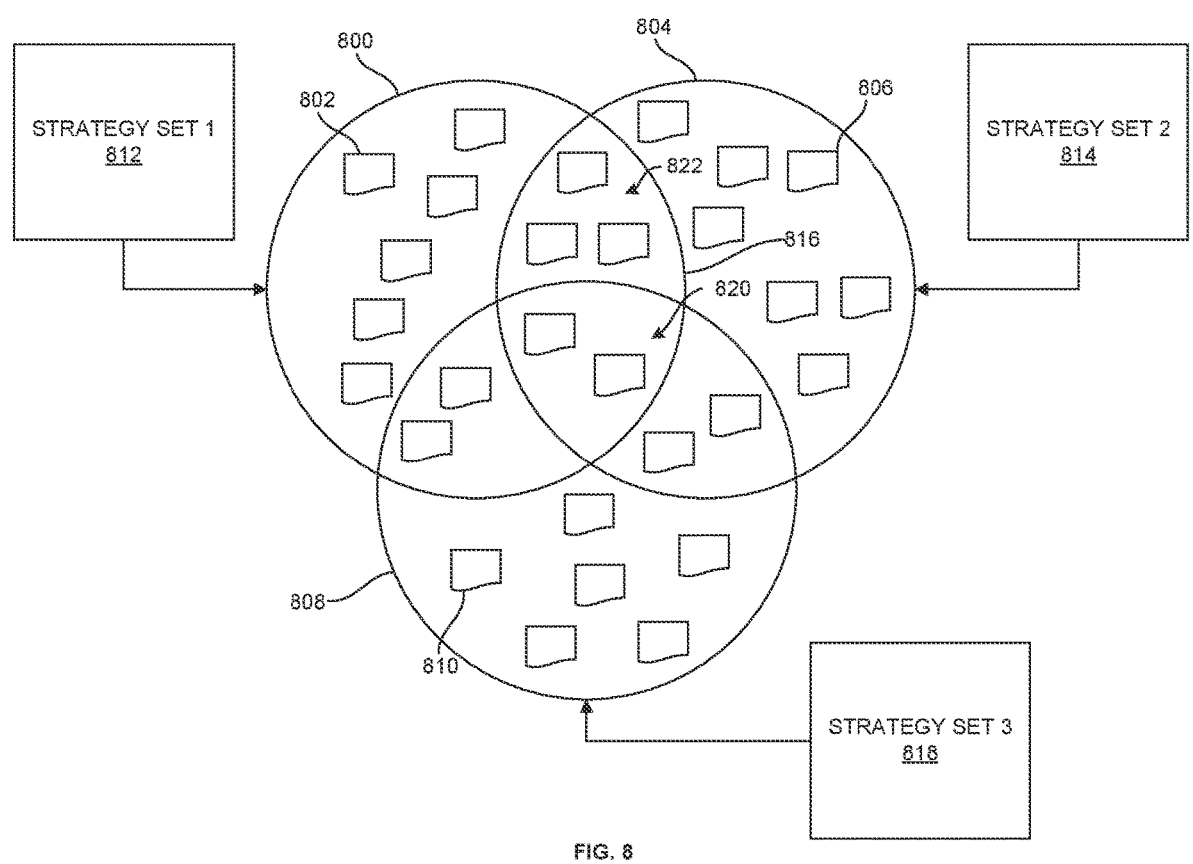
FIG. 8 illustrates the restriction of groupings of record objects according to embodiments of the present disclosure.

Subsequent strategies can be applied to prune or restrict the record objects that are selected as potential matches (e.g., candidate record objects). For example, and also referring to FIG. 8, FIG. 8 illustrates the restriction, separation, grouping, or identification of a first grouping 800 of record objects 802 with a second grouping 804 of record objects 806 and a third grouping 808 of record objects 810. The record object identification engine 330 can apply a first set of strategies 812 to identify, determine, or otherwise select the first grouping 800 of record objects 802. Similarly, the record object identification engine 330 can apply a second set of strategies 814 to select the second grouping 804 of record objects 806. The first set of strategies 812 can be or include, for instance, seller-based strategies for identifying record objects with which to match an electronic activity based on seller information. The second set of strategies 814 can similarly be or include, for instance, buyer-based strategies for identifying record object with which to match an electronic activity based on buyer information. The first and second strategies 812, 814 may be applicable to all record objects of the systems of record maintained or accessed by the data processing system 100. In other words, upon determining to match an electronic activity to a record object, the record object identification engine 330 can apply the first and second strategies 812, 814 to the electronic activity the record objects which may correspond thereto (e.g., candidate record objects). In the example shown in FIG. 8, the record object identification engine 330 can identify a subset of record objects 816 which satisfy both the first and second strategies 812,814 (e.g., the subset of record objects 816 which are included in both the first grouping 800 and second grouping 804).

In some embodiments, the record object identification engine 330 can apply a third set of strategies 818 to identify the third grouping 808 of record objects 810. Similar to the first and second set of strategies 812, 814, the third set of strategies 818 may be exclusionary strategies which are designed or configured to exclude or restrict matching electronic activities to particular record objects. The third set of strategies 818 may function as a filter of the candidate record objects which satisfy both the first and second strategies 812, 814. The record object identification engine 330 can apply the third set of strategies 818 to each of the record objects (e.g., at substantially the same time as applying the first and second set of strategies 812, 814). The record object identification engine 330 can apply the third set of strategies 818 to the subset of record objects 816. The record object identification engine 330 can apply the third set of strategies 818 to identify a number of record objects 820 from the subset 816 which are to be excluded from matching. Hence, the record object identification engine 330 can be configured to identify a set of candidate record objects 822 which satisfy both the first and second set of strategies 812, 814, and are not excluded by the third set of strategies 818.

In some embodiments, the record object identification engine 330 can group or link contact record objects on one or both sides of a business process into groups. The record object identification engine 330 can use the groups in the matching strategies. For example, the record object identification engine 330 can group users on a seller side into account teams and opportunity teams. Account teams can indicate a collection of users on the seller side that collaborate to close an initial or additional deals from a given account. Opportunity teams can be a collection of users on the seller side that collaborate to close a given deal. The record object identification engine 330 can add a user to an account or opportunity team by linking the contact record object of the user to the given account team record object or opportunity team record object. The record object identification engine 330 can use account team-based matching strategies or opportunity team-based matching strategies to select record objects with which the electronic activity can be matched.

In some embodiments, at periodic intervals, the record object identification engine 330 can process the electronic activities linked with account record objects and opportunity record objects to generate account teams and opportunity teams, respectively. For a given account record object, the record object identification engine 330 can count the number of times that a seller side user interacts with the account record object (for example, is included in an electronic activity that is linked or matched to the account record object). For example, the record object identification engine 330 can count the number of times the user was included on an email or sent an email that was linked with the account record object. If the count of the interactions is above a predetermined threshold, the record object identification engine 330 can add the user to an account team for the account record object. In some embodiments, the count can be made over a predetermined time frame, such as within the last week, month, or quarter. The record object identification engine 330 can perform a similar process for generating opportunity teams. In some embodiments, the account teams and opportunity teams can be included in the matching and restriction strategies used to match an electronic activity with a record object. Conversely, if the count of the interactions of a particular user is below a predetermined threshold within a predetermined time frame (for example, a week, a month, three months, among others), the record object identification engine 330 can remove the user from the account team or the opportunity team.

In some embodiments, the record object identification engine 330 can select record objects with which to match a first electronic activity based on a second electronic activity. The second electronic activity can be an electronic activity that is already linked to a record object. The second electronic activity can be associated with the first electronic activity. For example, the data processing system 100 can determine that the first and second electronic activities are both emails in a threaded email chain. The system can determine the emails are in the same thread using a thread detection policy. The thread detection policy can include one or more rules for detecting a thread by comparing subject lines and participants of a first email and a second email or in some embodiments, by parsing the contents of the body of the second email to determine if the body of the second email includes content that matches the first email and email header information of the first email is included in the body of the second email. If the second electronic activity is an earlier electronic activity that is already matched to a given record object, the record object identification engine 330 can match the first electronic activity to the same record object.

The tagging engine 312 can generate or add tags to electronic activities based on information generated or otherwise made available by the record object identification engine 330 and the matching engine 316. The tagging engine 312 can generate a tag array that includes each of the plurality of tags assigned or associated with a given electronic activity. By having tags assigned to electronic activities the data processing system 100 can be configured to better utilize the electronic activities to more accurately identify nodes and record objects to which the electronic activity should be linked.

In addition to the above described tags, the tagging engine 312 can assign tags to an electronic activity based on the output of the record object identification engine 330 and/or matching model, among other components of the system described herein. For example, the tagging engine 312 can add one or more tags indicating to which record objects the record object identification engine 330 returned as candidate record objects for the electronic activity.

The linking generator 334 can be any script, file, program, application, set of instructions, or computer-executable code that is configured to enable a computing device on which the linking generator 334 is executed to link electronic activities to record objects. As described above, the data processing system 100 can generate and maintain a shadow system of record for each of a data source provider's system of record. The data source provider's system of record can be referred to as a master system of record or tenant-specific system of record. The linking generator 334 can select a record object from a record object array and link the electronic activity to the selected record object in the shadow system of record. For example, the record object identification engine 330 can use the confidence scores of the record objects in the record object array to select a record object with which to match the electronic activity.

By linking the electronic activities to record objects, the system can generate metrics regarding the electronic activities. The metrics can include engagement metrics for users, employees, specific deals or opportunities, managers, companies, or other parties associated with a system of record. The engagement metrics can indicate amongst other things how likely an opportunity (or deal) is to close successfully (or unsuccessfully) or whether the number of contacts in the account are sufficiently engaged with the sales representative to prevent the account from disengaging with the company. The engagement metrics can provide an indication of an employee's productivity and can indicate whether the user should receive additional training or can indicate whether the user is on track to achieve predefined goals. The metrics can be calculated dynamically as the electronic activities are matched to nodes and record objects or the metrics can be calculated in batches, at predetermined intervals. Metrics can also be based on the content or other components of the electronic activity in addition to or in place of the linking of the electronic activity to a node and record object.

The stages of opportunity record objects can be based on the contacts present or involved on both sides of a deal. For example, as a deal advances to higher stages, more senior people may be included in the electronic activities. The stage of the deal can be based on the identification or introduction of an opportunity contact role (OCR) champion. In some embodiments, an administrator or user of the system of record can link the opportunity record object with a contact record object and designate the contact of the contact record object as an opportunity contact role. The champion can be a person on the buyer side of the deal that will support and provide guidance about the deal or opportunity to the seller side. In some embodiments, the OCR champion can be selected based on one or more rules. For example, the one or more rules can include setting the person identified as the VP of sales (or other specific role) as the OCR champion. In some embodiments, the OCR champion can be selected based on historical data. For example, the historical data can indicate that in 90% of the past deals a specific person or role was the OCR champion. Based on the historical data, when the person is added as a recipient of an electronic activity, the person can be identified as the OCR champion. The OCR champion can also be identified probabilistically based on tags associated with the electronic activities linked to the opportunity record object or content within the electronic activities.

In some embodiments, OCRs can be configurable by the company on an account by account basis. Depending on the type, size or nature of the opportunity, the customer or account involved in the opportunity may have different types and numbers of OCRs involved in the opportunity relative to other opportunities the same customer is involved in. Examples of OCRs can include "Champion," "Legal," "Decision Maker," "Executive sponsor" among others.

The data processing system 100 can be configured to assign respective opportunity contact roles to one or more contacts involved in an opportunity. The data processing system 100 can be configured to determine the opportunity contact role of a contact involved in the opportunity based on the contact's involvement. In some embodiments, system 100 can determine the contact's role based on a function the contact is serving. The function can be determined based on the contact's title, the context of electronic activities the contact is involved in, and other signals that can be derived from the electronic activities and node graph. In addition, the data processing system 100 can assign the contact a specific opportunity contact role based on analyzing past deals or opportunities in which the contact has been involved and determining which opportunity contact role the contact has been assigned in the past. Based on historical role assignments, the data processing system 100 can predict which role the contact should be assigned for the present opportunity. In this way, the data processing system 100 can make recommendations to the owner of the opportunity record object to add contacts to the opportunity or assign the contact an opportunity contact role.

In some embodiments, the data processing system 100 can determine that a contact should be assigned an opportunity contact role of "Executive Sponsor." The system may determine this by parsing electronic activities sent to and from the contact and identify, using NLP, words or a context that corresponds to the role of an Executive sponsor. In addition, the system can determine if the contact has previously been assigned an opportunity contact role of executive sponsor in previous deals or opportunities. The system can further determine the contact's title to determine if his title is senior enough to serve as the Executive sponsor.

In some embodiments, the electronic activity linking engine 328 can use a sequential occurrence of electronic activities to determine contact record objects that should be linked or associated with an opportunity record object. The electronic activity linking engine 328 can also determine the roles of people associated with the contact record objects linked to an opportunity. The identification of people associated with opportunity and account record objects (and their associated roles) can be used to determine stage classification, group of contacts on the buyer side that are responsible for the purchase, and for many other use cases. In some embodiments, the sequential occurrence of electronic activities can be used to determine the role or seniority of users involved in a business process. For example, initial emails linked with an opportunity record object can involve relatively lower-level employees. Later emails linked to the opportunity record object can include relatively higher-level employees, such as managers or Vice Presidents. The electronic activity linking engine 328 can also identify the introduction of contacts in a chain of electronic activities, such as a series of email replies or meeting invites, to determine a contact's participation and role in a business process. For example, the electronic activity linking engine 328 can use NLP and other methods to identify the introduction of a manager as a new OCR based on an email chain.

Q. Systems of Record Data Extraction

The record data extractor 332 can be any script, file, program, application, set of instructions, or computer-executable code, that is configured to enable a computing device on which the record data extractor 332 is executed to perform one or more functions of the record data extractor 332 described herein.

The record data extractor 332 can be configured to extract data from one or more records of one or more systems of record. The record data extractor 332 can identify record objects included in a system of record and extract data from each of the record objects, including values of particular fields. In some embodiments, the record data extractor 332 can be configured to extract values of fields included in the record object that are also included in the node profile maintained by the data processing system 100.

The insight engine 336 can be any script, file, program, application, set of instructions, or computer-executable code, that is configured to enable a computing device on which the insight engine 336 is executed to perform one or more functions of the insight engine 336 described herein.

The insight engine 336 can be configured to process electronic activities and record objects of one or more systems of record of a company to determine insights for the company. For instance, the insight engine 336 can provide insights to Company A by processing electronic activities and record objects that Company A has made accessible to the data processing system 100. The insights can include metrics at a company level, a department level, a group level, a user level, among others. The insights can identify patterns, behaviors, trends, metrics including performance related metrics at a company level, a department level, a group level, a user level, among others. Additional details relating to the insights are described herein.

In some embodiments, the insight engine 336 can be configured to generate performance profiles for a company. In some embodiments, the performance profile can be a performance profile of an employee of the company. In some embodiments, the performance profile can be a performance profile of a department of the company, a group within a department, or individual employees of the company. The insight engine 336 can generate the performance profiles using data accessible by the data processing system 100. In some embodiments, the insight engine 336 can generate the performance profiles using all data including electronic activities and systems of record accessible by the data processing system 100 from multiple companies. In some other embodiments, the insight engine 336 can generate the performance profiles for a company only using data provided by the company to the data processing system 100. In some embodiments, the insight engine 336 can be configured to generate certain types of performance profiles for employees, groups, departments of a company that has provided access to the data processing system 100 while generating other types of reports or insights for other node profiles of the data processing system 100 that are not employees of the company.

The insight engine 336 can be configured to predict employee success at a company or in a job role. The insight engine 336 can, based on an analysis of electronic activities as well as information stored in one or more systems of record, predict the success of the member node. For example, the insight engine 336 can generate a performance profile for the member node. The performance profile can be a statistics driven performance profile. The performance profile can be based on electronic activities and information stored in one or more systems of record. For example, the performance profile can be based on a number or amount of electronic activities associated with the member node during a time interval, a type of the electronic activities, the amount of time the member node spends generating or preparing the electronic activities (e.g., amount of time spent writing an email), the recipients of the email, natural language processing of the email, etc.

For example, the insight engine 336, using job history and performance history reconstructed from an internal member node graph, can generate a performance score, purchasing preference, decision making power, interests or other information for the member node. By syncing information associated with the systems of record and electronic activities with the member node graph, the data processing system 100 can generate or extrapolate types of opportunities or features on the public profile.

For example, the insight engine 336 can determine that a member node performs medical device sales, the member node's territory is the northeast region, the member node prefers or is more successful when doing in-person sales, the member node prefers or more successful when doing CEO level sales, or an average deal size or amount. To do so, the insight engine 336 can parse or featurize information corresponding to tasks or activities (e.g., deals) associated with the member node (e.g., a salesperson or other knowledge worker) that is derived from one or more record objects stored in the one or more systems of record (e.g., extracted by the record data extractor 332). By parsing or generating features from the record objects, the data processing system 100 can update a member node profile to reflect various performance information derived by the insight engine 336 from record objects in one or more systems of record as well from electronic activities. The insight engine 336 can generate various outputs corresponding to insights derived from record objects in one or more systems of record and electronic activities. The insights can include a performance score or performance grade indicating how well a member node has performed or may perform in general, at a type of task, in a specific job or under certain circumstances of a job or job environment, as determined by the communications metadata, extracted from the node graph.

As noted above, the automation and intelligence engine 112 may include a sync module 338, an API 340, and/or a feedback module 342. The automation and intelligence engine 112 and each of the components of the automation and intelligence engine 112 can be any script, file, program, application, set of instructions, or computer-executable code. The record object manager 306 may be implemented as described above to update record objects of systems of record and/or receive information from record objects of various systems of record. For example, the record object manager 306 can update contact record objects with updated contact information from node profiles. The sync module 338 can be any script, file, program, application, set of instructions, or computer-executable code and be configured to periodically synchronize with data source providers and/or data sources so information can be shared between the data processing system 100 and the corresponding data source providers and/or data sources. In some embodiments, the sync module 338 enables various data source providers and/or data sources to share information with each other. The API 340 can be any application programming interface that is configured to enable the data processing system 100 to communicate with one or more systems of record, electronic mail servers, telephone log servers, contact servers, and/or other types of servers and end-user applications that may receive or maintain electronic activity data or profile data relating to one or more nodes. The feedback module 342 can be any script, file, program, application, set of instructions, or computer-executable code that is configured to receive feedback from one or more client devices that can be used to update one or more systems of record. The feedback can be used to train any of the modules and/or models of the data processing system 100.

As described herein and supplemental to the description of various terms provided above, electronic activities can include emails, electronic calendar events, electronic meetings, phone call logs, instant messages, other any other electronic communications generated by a node, received by a node, exchanged between nodes or otherwise stored on an electronic server configured to provide electronic activities to the data processing system 100.

An individual or member node can be an electronic representation of a user, person, account of a person or user, an employee, a bot, or any other entity that may have an account or an identifier that the data processing system can generate a node profile for. A group node can be an electronic representation of an enterprise, a company, an organization, an employer, a team of employees or people, or a plurality of member nodes that can be treated as a single entity. A node profile can be an electronic representation of a profile of a member node or a group node. The node profile can include fields. Each field can include one or more values. An example field can be an email address. An example value can be john.smith@example.com. A value of a field can include an array of data points identifying occurrences of the value. Each value can have a confidence score. A data point can identify an electronic activity or other piece of information that contributes the value to the field. The data point can include or identify a source of the electronic activity, a trust score of the source of the data point, a time or recency of the electronic activity and a contribution score. The source of the electronic activity can be a mail server, a system of record, or any other repository of electronic activities.

A trust score of the source of the data point can indicate a trustworthiness of the source of the data point. The trust score of the source can be based on a completeness of system of record maintained by the source. The trust score can also serve as an indication of how reliable the source may be.

A contribution score of the data point can indicate how much the data point contributes towards a confidence score of the value associated with the data point. The contribution score can be based on the trust score of the source, a health score of the source, and a time at which the data point was generated or last updated.

A confidence score of the value can indicate a level of certainty that the value of the field is a current value of the field. The higher the confidence score, the more certain the value of the field is the current value. The confidence score can be based on the contribution scores of individual data points associated with the value. The confidence score of the value can also depend on the corresponding confidence scores of other values of the field, or the contribution scores of data points associated with other values of the field.

A confidence score generally relates to a level of confidence that a certain piece of information is accurate. As used herein, a confidence score of a piece of information, such as an assigned tag, a value of a field of a node profile, a stage classification prediction, a record object match, can indicate a level of confidence that the piece of information is accurate. The confidence score of the piece of information can change based on a temporal basis. A node profile can include a first email address corresponding to a first job and a second email corresponding to a subsequent job. Each of the two email addresses are at respective points in time, accurate and valid. As the person switches jobs, the first email address is no longer valid but the confidence score associated with the email address can in some embodiments, remain high indicating that the first email address belongs to the node profile. Similarly, the second email address also belongs to the node profile and therefore also has a high confidence score. After the system determines that the second email address is active and functioning, the system can assign a higher confidence score to the second email address relative to the first email address since the contribution scores provided by recent data points (for example, recent electronic activities identifying the second email address) can contribute towards the higher confidence score. Similarly, any tags that are assigned to electronic activities identifying bounce back activity related to the first email address (indicating that the first email address is no longer active) can reduce the confidence score of the first electronic activity.

The health score of the source can indicate a level of health of the source. The health of the source can include a completeness of the source (for example, a system of record), an accuracy of the data included in the source, a frequency at which the data in the source is updated, among others.

A connection strength between two nodes can be based on the electronic activities associated with both the nodes. In some embodiments, each electronic activity can be used by the system to determine a connection strength between the two nodes. The contribution of each electronic activity towards the connection strength can diminish over time as older electronic activities may indicate a past connection but do not indicate a current status of the connection strength between the two nodes.

The time decaying relevancy score of an electronic activity can indicate how relevant the electronic activity is for determining a connection strength between two nodes exchanged between or otherwise associated with the two nodes. The connection strength between two nodes can be based on the time decaying relevancy scores of the electronic activities exchanged between or otherwise associated with the two nodes.

As further described herein, electronic activities can be linked to or matched to record objects. Record objects can be maintained in a shadow system of record maintained by the data processing system 100 or in some embodiments, linked or matched to record objects maintained in master system of records that are maintained by customers or enterprises.

R. Systems and Methods for Managing the Generation or Deletion of Record Objects Based on Electronic Activities and Communication Policies The present disclosure relates to systems and methods for managing the generation or deletion of record objects based on electronic activities and communication policies. Record objects may represent entities that transmit and/or receive electronic activities from entities of data source providers. Such record objects may be stored in systems of record of such data source providers. Processors of the data source providers may process the electronic activities to obtain data and update the record objects to include data obtained from such electronic activities. To operate in compliance with privacy regulations such as the California Consumer Privacy Act (CCPA) and the General Data Protection Regulation (GDPR), such processors may be restricted from processing data for entities until certain criteria is met on an individual entity basis. The criteria may be satisfied based on electronic activities that are exchanged between the entities and entities of the data source providers. The processors may not be functionally capable of distinguishing between entities that are associated with various communication settings that would otherwise restrict the processors from processing data from the electronic activities and entities that do not have such privacy settings, resulting in extracting and storing information from the electronic activities without differentiating between entities that are associated with the communication settings.

By implementing the systems and methods described herein, a data processing system can automatically determine whether processors of a data source provider have the applicable permissions to extract and/or store information from electronic activities that are transmitted between an entity and entities of the data source provider. The data processing system may implement communication policies that can include rules and/or thresholds to apply to data associated with electronic activities. The rules and/or thresholds of the communication policy may be based on the location of the data source provider, for example, to ensure that the data source provider may comply with any applicable data privacy laws or regulations of the location. The data processing system may determine if any of the rules or thresholds of the communication policy are satisfied to determine which communication setting the processor of the data source provider can use to update, generate, or delete a record object associated with the entity. The settings can indicate a type of communication an entity of the data source provider may use to contact the entity. The data processing system may transmit instructions to the processor so the processor can update, generate, or delete the respective record object. Accordingly, the data processing system may automatically determine which permissions the data source provider has to extract and/or store data from electronic activities transmitted and/or received from the entity using various communication policies. The data processing system may do so without providing the processors of the data source provider with data from the electronic activities that the data source provider does not have permission to analyze.

In implementing such communication policies, the systems and methods described herein can perform memory resource management for electronic record objects and systems of record, which can allow for faster and more accurate retrieval of record objects. For example, communication policies can be implemented that can accurately determine whether to generate or delete record objects based on real-time tracking of parameters determined using electronic activities communicated between electronic accounts executing on remote devices and network elements that implement the systems of record (e.g., routing elements or other components operated by data source providers). Such communication policies can enable the network element (e.g., the system operating the system of record) to precisely and objectively detect conditions for generating or deleting record objects that maintain data regarding the entities associated with the electronic accounts, which can improve overall management of memory resources of the system of record. The communication policies can be monitored in real-time and responsive to various trigger conditions, such as to perform batch processing of record objects.

The systems and methods described herein may enable a data processing system to automatically determine for which entities data source providers or systems of record may generate record objects and/or for which entities the data source providers are to delete existing record objects that the data source providers have stored in their respective systems of record. To do so, the data processing system may analyze or evaluate electronic activities (e.g., parse or keep counters for the electronic activities based on electronic activity type) that an entity transmits or receives from a respective data source provider. Using natural language processing and other techniques, the data processing system may automatically determine if an entity does not wish for the data source provider to store data about the entity. The data processing system can transmit a message to an entity of the data source provider to delete record objects or electronic activities that the data source provider may have stored in, for example, a system of record that are associated with the entity. The message may cause the data source provider to not store record objects or electronic activities to a system of record. The data processing system can compare counters for the electronic activities to one or more thresholds that are determined based on a communication policy that the data source provider may have defined. Based on the electronic activities satisfying any of the thresholds, the data processing system may determine that a system of record of the data source provider may generate a contact record object associated with the entity and store data about the entity. Further, based on the threshold that is satisfied, the data processing system may determine a type of communication, if any, that the data source provider may transmit with the entity. If the data processing system determines for the system of record of the data source provider to generate a contact record object for an entity, the data processing system may transmit instructions to the system of record of the data source provider indicating for the system of record of the data source provider to do so. Consequently, the data processing system can determine whether a system of record of a data source provider can store or process entity data without the data source provider processing any such data until the system of record of the data source provider is authorized to do so. The data processing system may do so on a schedule, in real-time (e.g., responsive to receiving an electronic activity) or based on newly ingested electronic activities upon being implemented in a new environment.

The data processing system can instruct the system of record to remove data from the system of record. For example, if the data processing system determines, for an entity, that the electronic activities exchanged between the entity and entities of the data source provider do not satisfy any of the thresholds, the data processing system may transmit instructions to the system of record of the data source provider to delete any contact record objects that are associated with the entity that the data source provider has stored in its system of record. The data processing system may maintain counters for entities for which data source providers may store data in real-time and automatically cause data source providers to stop storing data about entities responsive to a data source provider losing its authorization to do so (e.g., responsive to the data processing system determining an entity has not had enough communications with entities of a data source provider to satisfy a respective communication policy).

Figure 9A:
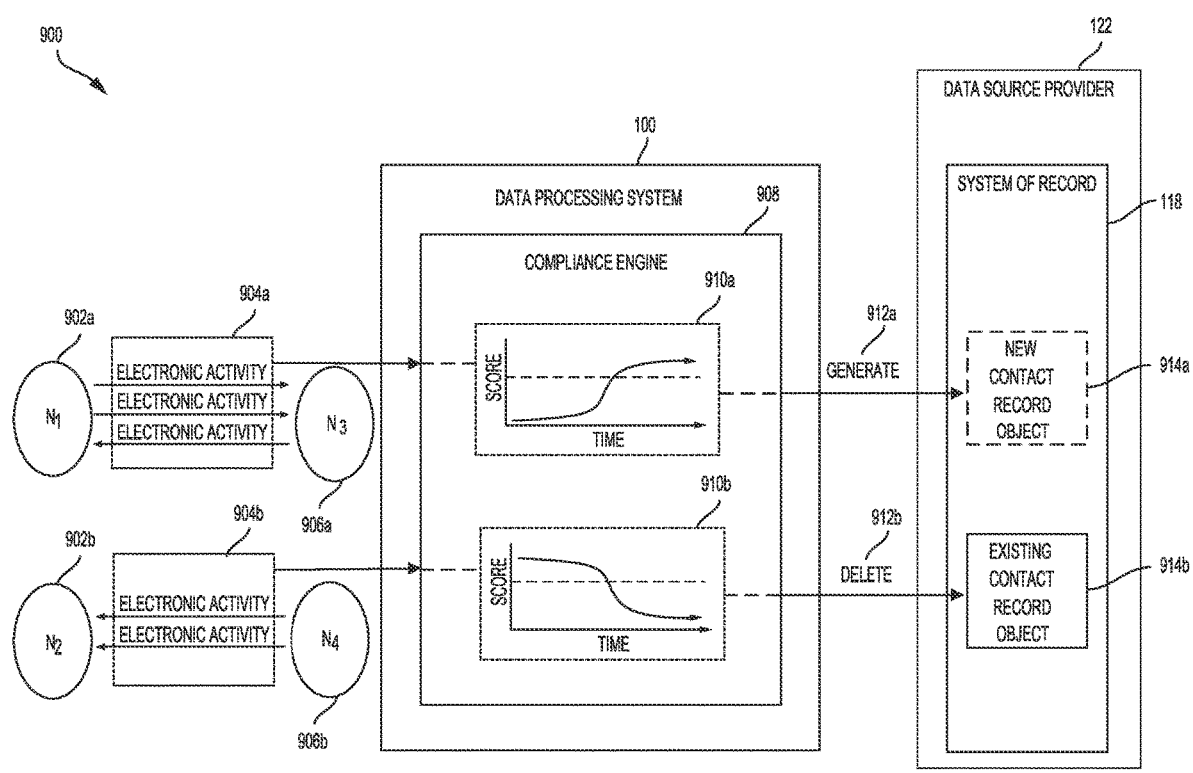
FIG. 9A illustrates a block diagram of an example system for managing the generation or deletion of record objects based on electronic activities and communication policies according to embodiments of the present disclosure.

FIG. 9A illustrates a block diagram of an example system 900 to manage the generation or deletion of record objects based on electronic activities and communication policies, according to embodiments of the present disclosure. Some of the components of the system 900 may correspond to components of the data processing system 100 illustrated in FIG. 1. The system 900 is shown to include a plurality of nodes 902a-902b (generally referred to herein as nodes 902) and a plurality of nodes 906a-902b (generally referred to herein as nodes 906). The nodes 902 and 906 can be data structures stored in or by the system 900. The nodes 902 can be data representations of first entities, as described herein. Users or entities associated with the nodes 902 can transmit and/or receive electronic activities via data sources from users or entities associated with the nodes 906. FIG. 9A illustrates a logical representation where nodes 902 transmit and/or receive electronic activities with nodes 906. That is, functions, actions, steps, processes, or other methods described as performed by a node can be performed by the entity or entities associated with that node. The nodes 906 can be data representations that may each correspond to an entity (e.g., an employee) associated with the data source provider 122. Each of the nodes 902 and the nodes 906 may correspond to a node profile or a group node profile that is stored in the data processing system 100. The entities associated with the nodes 902 may transmit and/or receive electronic activities 904a-b from the entities associated with the nodes 906. The electronic activities may be stored in the data processing system 100 and/or the system of record 118. For example, in the system 900, the entity of node 902a may transmit and/or receive a plurality of electronic activities 904a from the entity of node 906a. Each of the electronic activities 904a may be accessed by the data processing system 100 for processing. Similarly, the entity of node 902b may transmit and/or receive a plurality of electronic activities 904b from the entity of node 906b. Each of the electronic activities 904a-b may be accessed by the data processing system 100 for processing. The data processing system 100 can associate electronic activities with the node profiles and/or group node profiles that correspond to the nodes (and entities) that transmit and/or receive the electronic activities 904a-b.

As described herein, the data processing system 100 may determine whether entities associated with a data source provider may contact a first entity based on electronic activities between entities (e.g., employees) of the data source provider and the first entity. As described herein, any action described as being performed by a data source provider may be performed by a processor of the data source provider. In brief overview, the data processing system 100 may do so by accessing electronic activities from one or more data sources (e.g., email servers or phone logs) of the data source provider. The data processing system 100 may analyze the electronic activities to determine whether a count of the number of the electronic activities have been transmitted between the first entity and entities of the data source provider to satisfy a threshold or if the electronic activities include a value that indicates that entities of the data source provider may not contact the first entity. Examples of electronic activities can include electronic mail messages, telephone calls, calendar invitations, social media messages, mobile application messages, instant messages, cellular messages such as SMS, MMS, among others, which may be referred to as electronic communication activities. Other examples of electronic activities include electronic records of any other activity, such as digital content, files, photographs, screenshots, browser history, internet activity, shared documents, among others.

The system 900 can generate contact record objects. The system 900 can send instructions to the system of record 118 to cause the system of record 118 to generate contact record objects. Contact record objects can be data structures that include fields associated with an entity. Contact record objects can include fields such as FirstName, LastName, AccountId, Department, Email, Fax, WorkPhone, HomePhone, MobilePhone. StreetAddress, City, State, Country, DoNotCall, and HasOptedOutOfEmail, among others. Contact record objects may store any type of data about entities.

The data processing system 100 can include a compliance engine 908. The compliance engine 908 may determine whether the data source provider 122 or system of record 118 should store or process data about first entities (e.g., entities associated with nodes) in record objects of the system of record 118 based on the electronic activities transmitted or received by entities with node profiles linked to a group node profile of the data source provider 122 and the first entities. The compliance engine 908 may do so by storing and maintaining engagement scores. An engagement score may be specific to a first entity and the data source provider 122. The engagement score may indicate the number of electronic activities that the first entity exchanged between one or more entities of the data source provider 122. The engagement scores can be or can include counters. The compliance engine 908 may increase the engagement score for the first entity for each electronic activity that the first entity transmits or receives from one or more entities of the data source provider 122. For example, the compliance engine 908 may maintain and adjust an engagement score that indicates the number of electronic activities that the node 902a transmits or receives from one or more employees of ACME Co. The engagement score may be stored in the node graph 110. For each electronic activity that the node 902a transmits or receives from an entity of Acme Co., the compliance engine 908 may increase the engagement score.

The compliance engine 908 may determine the engagement score by aggregating counts or weights of electronic activities between the first entity and each of multiple entities of the data source provider 122. For example, the compliance engine 908 may determine an engagement score for a first entity by aggregating a count of a first electronic activity exchanged with an entity of the data source provider with a count of a second electronic activity exchanged with another entity of the data source provider. The compliance engine 908 may use electronic activities exchanged between any number of entities of the data source provider and the first entity to determine the engagement score for the first entity.

The compliance engine 908 may determine a number of electronic activities transmitted between a first entity and one or more entities of the data source provider 122 within a time period. The time period can be the time since the first electronic activity transmission between the two entities or a defined length of time (e.g., the last one day, five days, 10 days, 30 days, 60 days, or 90 days). The defined length of time may be a rolling window time period. The rolling window time period may be a preset time period of the most recent days, weeks, months, or years. The rolling window time period may maintain its same length but change as time goes on to include the time period immediately previous to the time the compliance engine 908 is processing the respective electronic activity. The compliance engine 908 may determine whether electronic activities were transmitted within the time period based on timestamps of the electronic activities that the compliance engine 908 may identify by parsing the electronic activities using natural language processing techniques or by identifying the metadata of the electronic activities as described herein. The timestamps may indicate the time that the electronic activities were transmitted, received, or held (in the case of meetings). The compliance engine 908 may identify timestamps of electronic activities transmitted between the first entity and entities of the data source provider 122. For each electronic activity that is associated with a timestamp within the time period, the compliance engine 908 may increase an engagement score for the first entity.

The compliance engine 908 may compare the value of an engagement score based on the number and/or type of electronic activities transmitted between the first entity and entities of the data source provider 122 to a threshold. The threshold may be input by an administrator. Responsive to determining that the value of the engagement score satisfies the threshold, the compliance engine 908 may transmit instructions to the system of record 118 instructing the system of record 118 to generate a new record object for the first entity. The instructions may include a flag, tag, or setting indicating for the system of record 118 to generate the record object. The system of record 118 may identify the flag, tag, or setting and generate the record object accordingly. Responsive to the compliance engine 908 determining that the value of the engagement score is less than the threshold or does not satisfy the threshold, the compliance engine 908 may transmit instructions to the system of record 118 to delete a contact record object for the first entity. Responsive to the system of record 118 already storing such a contact record object, the instructions may be to generate a restriction flag indicating for entities of the data source provider 122 to stop contacting the first entity or to generate a setting indicating that fewer entities of the data source provider 122 may contact the first entity. In some embodiments, the compliance engine 908 may transmit such instructions to the system of record 118 by transmitting a flag or setting to update a corresponding object field-value pair of the record object.

For example, the node 902*a* may transmit and/or receive eight electronic activities 904*a* from node 906*a*. The electronic activities 904*a* may be of any type, including, but not limited to, emails, phone calls, calendar invitations, SMS, MMS, etc. Each of the electronic activities 904*a* may be stored in a data structure of the data processing system 100. The compliance engine 908 may evaluate the electronic activities 904*a* according to a communication policy. The communication policy may be one or more rules and/or thresholds (in some cases specific to the data source provider) that the compliance engine 908 may use to determine whether the data source provider 122 or the system of record 118 can contact or otherwise generate or maintain record objects for first entities that are in contact with entities of the data source provider 122.

There may be different types of rules in the communication policy. For example, there may be rules that are specific to different types of electronic activities. A first rule may be satisfied responsive to an entity transmitting six emails to one or more entities of a data source provider. A second rule may be satisfied responsive to an entity sending four voicemails to one or more entities of a data source provider. A third rule may be satisfied responsive to an entity sending two emails and holding one meeting with an entity of the data source provider. The rules may be based on any number or combination of electronic activities. In another example, the rules may be based on the types of the electronic activities themselves. A first rule may be satisfied based on the length of a meeting exceeding a threshold. A second rule may be satisfied based on the length of an email being below or above a threshold. A third rule may be satisfied based on the entity replying to a threshold number of emails.

In some embodiments, rules of the communication policy may be associated with different actions. For instance, the communication policy may include multiple thresholds to which engagement scores (as described below) may be compared. Each threshold may be associated with authorization of a different action or set of actions. For example, a first threshold may be associated with sales activities (e.g., targeted communication), a second threshold may be associated with directed marketing, a third threshold may be associated with authorization to store data, a fourth threshold may be associated with generating a recommendation to contact the respective entity, and a fifth threshold may be associated with transmitting a validation message to the data processing system 100 to confirm the contact information is correct. The communication policy may include any combination of the above thresholds and/or any other threshold to authorize actions In some embodiments, the compliance engine 908 may determine new values for engagement scores daily or at any other interval to determine the number of electronic activities that were transmitted between first entities and entities of the data source provider 122 within a time period. The compliance engine 908 may also recalculate engagement scores at each instance that the data processing system 100 accesses or processes a new electronic activity between a first entity and one or more entities of the data source provider 122. The compliance engine 908 may determine new values for engagement scores at any time.

In some embodiments, the compliance engine 908 may determine if an engagement score for a first entity exceeds a threshold based on weights that are assigned to electronic activities between the first entity and one or more entities of the data source provider 122 based on their electronic activity type. For example, the compliance engine 908 may assign different weights to different types of electronic activities 904a that node 902a transmitted or received from the node 906a of the data source provider 122. The weight of the electronic activity can be based on a time associated with the electronic activities. For example, the time can be the duration of the calendar meeting or an estimated time to generate a draft of an email. The weight of the electronic activity can be based on the type of the electronic activity. For example, in-person meetings may be assigned a relatively greater weight than video meetings, which may be assigned a relatively greater weight than an email exchange. In another example, a custom email may be assigned a relatively greater weight than a blast email that is sent to a large number of people. The weights may be relative to each other. For example, one calendar meeting may have the same weight as three emails and one voicemail may have the same weight as two emails. In some implementations, types of electronic activities may be given no weight. For example, electronic activities transmitted from the node 906a to node 902a may be assigned no weight or a relatively low weight when compared to other electronic activities. For example, electronic activities transmitted by one or more users associated with the data processing system 100 (or the system of record 118) can be assigned a zero weight or low weight such that the score is substantially based on response electronic activities from the recipient of the one or more users' electronic activities.

The compliance engine 908 may identify the types of the electronic activities based on the metadata that is associated with the electronic activities, the data source in which the electronic activities are stored, the format of the electronic activities, or using natural language processing techniques on the words within the electronic activities. The compliance engine 908 may aggregate the weights of the electronic activities 904a to obtain an engagement score (e.g., an aggregated sum of the weights that are associated with the electronic activities that are transmitted between a first entity and one or more entities of a data source provider). The data source provider 122 may identify the engagement score and compare the engagement score to a threshold to determine if the engagement score satisfies the threshold. The compliance engine 908 may update the engagement score or determine new engagement scores for the node 902a at periodic intervals as the compliance engine 908 identifies new or fewer electronic activities that are associated with timestamps within a time period, as is illustrated by the score graph 910a.

The score graph 910a illustrates an engagement score between the node 902a and the data source provider 122 over time. The compliance engine 908 may update the score graph 910a and/or an engagement score of the score graph 910a at each instance that the compliance engine 908 processes an electronic activity that was transmitted or received by the node 902a and/or responsive to the compliance engine 908 determining that an electronic activity that was transmitted or received by the node 902a is no longer within a rolling window time period. For example, the rolling window time period may be 365 days before the compliance engine 908 processes an electronic activity. The compliance engine 908 may determine the engagement score for the node 902a on the score graph 910a based on each electronic activity that the node 902a transmitted and/or received within the 365 day rolling window time period. Continuing with this example, the compliance engine 908 may determine a new engagement score for the node 902a based on the electronic activities that were transmitted in the 365 rolling window time period, disregarding any electronic activities that fall out of or otherwise do not fall into the rolling window time period (e.g., that were transmitted more than 365 days before the compliance engine 908 determines a new engagement score for the node 902a). The compliance engine 908 may update the score graph 910a and/or the engagement score of the score graph 910a over time to maintain a real-time engagement score for the node 902a. For each update, the compliance engine 908 may compare the updated engagement score to a threshold of a communication policy of the score graph 910 to determine whether the updated engagement score satisfies the threshold. The engagement score may satisfy the communication policy criteria responsive to satisfying the threshold.

The compliance engine 908 may determine when the engagement score satisfies the threshold. Upon determining that the engagement score satisfies the threshold, the compliance engine 908 may transmit the instructions 912a to generate a new contact record object 914a to the system of record 118. The compliance engine 908 may transmit the instructions 912a and any other instructions to the system of record 118 via the API 340, shown and described with reference to FIG. 3E, for example through a transmission control protocol. The instructions 912a may include a flag or setting for the system of record to use to generate the contact record object 914a and/or that indicates that an entity of the data source provider 122 may contact the node 902a. In cases in which the flag or setting indicates to generate a record object, the data source provider 122 may receive, through a processor such as the system of record 118, the instructions 912a. The system of record 118 may identify the flag or setting that is included in the instructions 912a, compare the flag or setting to a database in the system of record 118 that includes actions that are associated with the flag or setting, identify a record object generation action based on the identified flag or setting and the comparison, and generate the contact record object 914a. In cases in which the flag or setting indicates that the system of record 118 may store data about the node 902a or entities of the data source provider 122 may contact the node 902a, the system of record 118 may receive the instructions and update a field of a contact record object for the node 902a to indicate that the system of record 118 may store data about the node 902a or that entities of the data source provider 122 may contact the node 902a.

The compliance engine 908 may evaluate electronic activities and/or otherwise determine engagement scores based on electronic activities upon receiving an administrator input, pseudo-randomly, at periodically spaced intervals, at scheduled times, or responsive to identifying new electronic activities. To evaluate the electronic activities, the compliance engine 908 may update and maintain an engagement score based on the number and/or the type of electronic activities that are transmitted and/or received by first entities from one or more entities of the data source provider 122. The compliance engine 908 may also parse electronic activities transmitted by the first entities for values indicating for the data source provider 122 to stop collecting data about or to stop contacting the first entity. For instance, the compliance engine 908 may evaluate the electronic activities transmitted between employees of the data source provider 122 and various first entities to determine for which first entities the data source provider 122 may store or process data.

In some embodiments, the compliance engine 908 may evaluate and determine an engagement score for a first entity responsive to receiving a new electronic activity. For example, each time a first entity transmits and/or receives an electronic activity from an entity of the data source provider 122, the compliance engine 908 may evaluate the new electronic activity in combination with other electronic activities transmitted between the first entity and entities of the data source provider 122 to determine a new engagement score for the first entity. In some embodiments, the compliance engine 908 may evaluate electronic activities to determine engagement scores for first entities upon being connected or based on a request (e.g., an input) from an entity of the data source provider 122.

In another example, the node 902b may transmit six electronic activities 904b to the node 906b. The electronic activities 904b may be similar to the electronic activities 904a. Each of the electronic activities 904b may be stored in a data structure of the data processing system 100 and/or the system of record 118. The compliance engine 908 may evaluate the electronic activities 904b using a communication policy. The communication policy may include various rules and thresholds similar to the communication policy described above. The compliance engine 908 may aggregate the electronic activities 904b to obtain an engagement score for the node 902b which is periodically updated over time, as is illustrated by the score graph 910b.

The score graph 910b illustrates an engagement score between the node 902b and the data source provider 122 over time. The compliance engine 908 may update the score graph 910b and/or an engagement score of the score graph 910b similar to how the compliance engine 908 updates the score graph 910a. The compliance engine 908 may update the score graph 910b and/or the engagement score of the score graph 910b over time to maintain a real-time engagement score for the node 902b. As illustrated in the score graph 910b, the engagement score for an entity may decrease over time as electronic activities fall out of a rolling window time period. For example, the compliance engine 908 can retrieve a predetermined duration of time (or a start time previous to a current time corresponding to the predetermined duration of time), and identify a plurality of electronic activities that have time stamps that are between the start time and the current time to determine the engagement score using the identified electronic activities. For each update to the engagement score, the compliance engine 908 may compare the engagement score to a threshold of a communication policy of the score graph 910b to determine whether the updated engagement score satisfies the threshold. The compliance engine 908 may determine the engagement score does not satisfy the communication policy responsive to the engagement score falling below the threshold.

The compliance engine 908 may determine when the engagement score decreases below a threshold and, upon determining that the engagement score decreases below the threshold, transmit instructions 912b to delete an existing contact record object 914b to the data source provider 122 in the system of record 118. In some embodiments, the compliance engine 908 may transmit a flag or setting in the instructions 912b to the data source provider 122 indicating that the data source provider 122 may no longer contact the first entity associated with the contact record object 914b, or a flag indicating for the data source provider 122 to notify the entity of the data source provider 122 who created the contact record object 914b to send an electronic activity to the node 902b. In some embodiments, the compliance engine 908 may store a restriction tag within the data processing system 100 indicating that entities of the data source provider 122 may not contact the node 902b, etc. The instructions 912b to delete the existing contact record object 914b may include a flag, tag, or communication setting that a processor of the data source provider 122 may identify and use to delete the contact record object 914b accordingly, as described below. Consequently, the compliance engine 908 may cause instructions to be transmitted to systems of record to generate or delete record objects and/or to authorize or restrict contacting entities in real-time as the compliance engine 908 evaluates the electronic communications between entities of the data source providers and first entities based upon previously transmitted electronic activities.

In some embodiments, the compliance engine 908 or another component of the data processing system 100 may receive an indication from a first entity for the data source provider 122 to stop storing data and/or for entities of the data source provider to otherwise stop contacting the first entity. Examples of indications include, but are not limited to, a selection of an unsubscribe link, a selection of a "do-not-track" button, an selection of an "opt-out" button, or an identification of a keyword (e.g., "stop contacting me," "leave me alone," "I would like to unsubscribe," or "I am opting out") in an electronic activity to stop storing data about the first entity. The compliance engine 908 may receive such an indication and transmit instructions to the system of record 118 or another processor of the data source provider 122. The instructions may include a "do-not-contact" flag or setting and/or a flag or setting indicating for the system of record 118 to stop storing data about the first entity. The "do-not-contact" flag may apply or be maintained by the respective system of record for a time period based on the jurisdiction. For example, a "do-not-contact" in a system of record may be configured to be removed from the system of record after 12 months or after any other time period. The time period may be based on the location of the data source provider 122. The system of record 118 may receive such instructions, identify the flag or setting from the instructions, compare the flag or setting to a database including a list of actions that correspond to such flags or settings, determine that the flag or setting is associated with a deletion, a respective do-not-contact action (e.g., the DoNotCall field or the HasOptedOutofEmail field), and delete the corresponding information and/or store a setting in a data structure of the system of record 118 indicating not to contact the first entity.

FIG. 9B illustrates an example table 916 including example thresholds for a data processing system (e.g., the data processing system 100) to use to generate (e.g., transmit instructions to generate) a contact record object based on electronic activities, according to embodiments of the present disclosure. Table 916 may show example criteria for a communication policy. Table 916 is shown to include first threshold criteria 918, second threshold criteria 920, and threshold not met criteria 922. Each of the threshold criteria 918, 920, and 922 may be associated with different actions that a data source provider may perform responsive to the respective criteria being satisfied. For example, in some embodiments, responsive to the first threshold criteria 918 being satisfied for an entity, entities of a data source provider may be authorized to send directed messages such as sales messages to the respective first entity. Responsive to the second threshold criteria 920 being satisfied, entities of the data source provider may send non-targeted messages such as blast emails to the respective first entity. Responsive to the threshold not met criteria 922, entities of the data source provider may not be authorized to contact the respective first. The data source provider may validate the contact information of the first entity (e.g., transmit a signal to the data processing system confirming that the information is correct) or be restricted from contact the first entity. Other examples of actions that may be performed responsive to a respective threshold criteria being satisfied include storing data about the entity, transmitting an electronic activity to the entity to maintain an engagement score above a threshold, and adding the electronic account of the entity to a distribution list. The threshold criteria 918, 920, and 922 and their respective thresholds may be associated with any action that may be performed. The second threshold criteria 920 may be associated with marketing communications, also described in detail below.

As illustrated in FIG. 9B, each of the threshold criteria 918 and 920 can be satisfied based on electronic activity replies and/or meetings. Further, the threshold criteria 918 or 920 may vary depending on how recently the meetings were held or the replies were transmitted. For example, according to table 916, if a first entity holds five meetings and transmits three replies within the most recent 12 months to entities of a data source provider that implements the criteria of the table 916, the first threshold criteria 918 may be met and the data processing system may determine that both the second threshold criteria 920 and the first threshold criteria 918 have been met. However, if such meetings occurred 12-18 months from the date of the determination, the data processing system may determine that only the second threshold criteria 920 has been met.

In some embodiments, the threshold criteria 918 and 920 can be satisfied based on an engagement score of an entity with a data source provider. The threshold criteria 918 and 920 may each have a different threshold to which an engagement scores may be compared. For example, the first threshold criteria 918 and/or the second threshold criteria 920 may be satisfied responsive to a first entity holding two meetings. The data processing systems can aggregate the weight of the two meetings to obtain an engagement score and determine the first threshold criteria 918 and/or the second threshold criteria 920 are satisfied by comparing the engagement score to the thresholds of the first threshold criteria 918 and/or the second threshold criteria 920. In another example, the first threshold criteria 918 and/or the second threshold criteria 920 may be satisfied responsive to a first entity transmitting six reply emails but not holding any meetings. The data processing system may aggregate the weights of the reply emails to obtain an engagement score and determine the engagement score satisfies the first threshold criteria 918 and/or the second threshold criteria 920 accordingly. In yet another example, the first threshold criteria 918 and/or the second threshold criteria 920 may be satisfied based two emails, a voicemail, and a meeting. The data processing system may aggregate the weights of each of the emails, the voicemail, and the meeting and determine the first threshold criteria 918 and/or the second threshold criteria 920 accordingly. Any combination of electronic activities may satisfy the first threshold criteria 918 and/or the second threshold criteria 920.

If the data processing system determines that neither of the first threshold criteria 918 or the second threshold criteria 920 is met, the data processing system may determine whether to take action under the threshold not met criteria 922. The threshold not met criteria 922 may include two possibilities, validating that the data source provider has the correct information or not taking any action. If criteria for validating the contact is met, the data source provider may verify that the contact information for the first entity that the data source provider has stored is correct. The data source provider may do so by sending a validation request to the data processing system to confirm the contact information is correct. The data processing system may receive the request and compare the contact information to contact information fields of a node profile for the first entity. If the contact information is correct, the data processing system may transmit a signal indicating that the contact information is correct. If the contact information is incorrect, however, the data processing system may transmit a signal indicating that the contact information is incorrect. In some embodiments, the data processing system may transmit a signal to delete a record object for an entity about which the data source provider has incorrect contact information.

Figure 10:
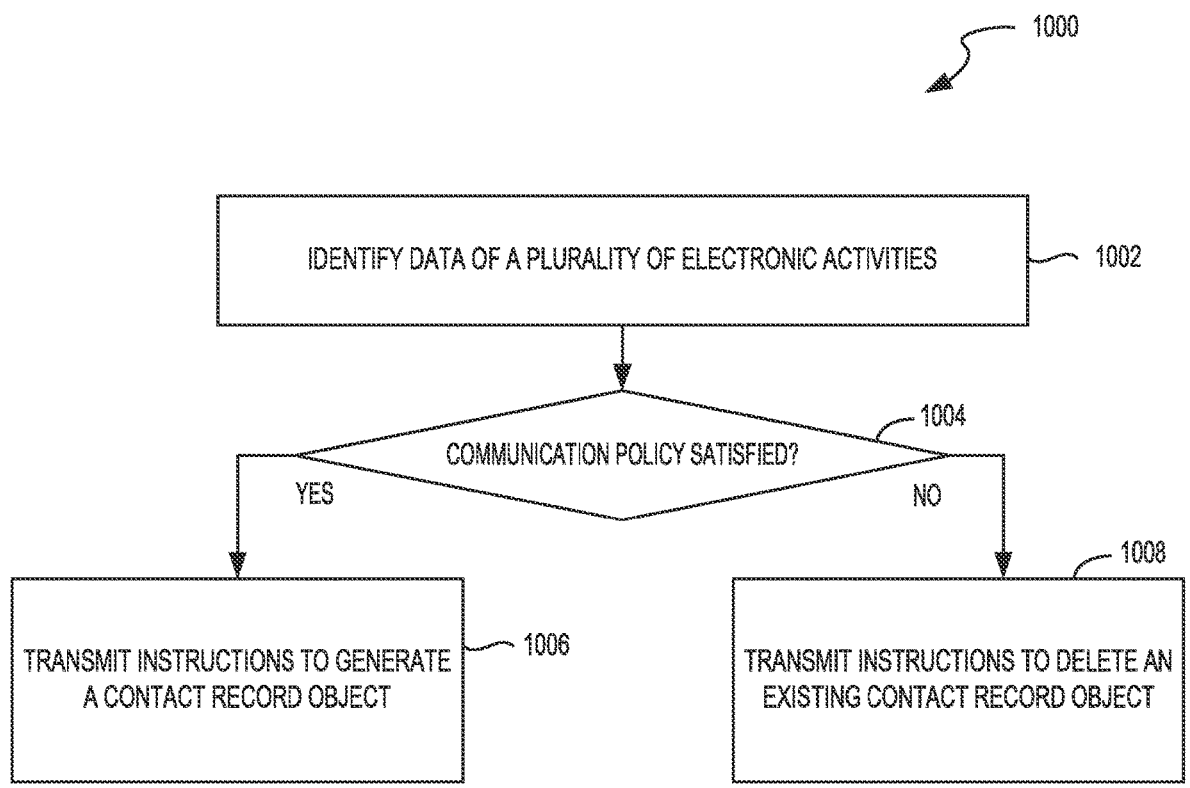
FIG. 10 illustrates a flow diagram of an example method for managing the generation or deletion of record objects based on electronic activities and communication policies according to embodiments of the present disclosure.

FIG. 10 illustrates, a flow diagram of an example method 1000 to manage the generation or deletion of record objects based on electronic activities and communication policies, according to embodiments of the present disclosure. The method 1000 can be implemented or performed using any of the components described above in conjunction with FIGS. 1-9B (e.g., the data processing system 100) or the server system 1100 detailed below in conjunction with FIG. 11. In brief overview, a data processing system can identify data of a plurality of electronic activities (Step 1002). The data processing system can determine whether the identified data satisfies a communication policy (Step 1004). Responsive to determining that the communication policy is satisfied, the data processing system can transmit instructions to generate a contact record object (Step 1006). Responsive to determining that the communication policy is not satisfied, the data processing system may transmit instructions to delete an existing contact record object (Step 1008).

In further detail, a data processing system (e.g., the data processing system 100) can identify data of a plurality of electronic activities (Step 1002). The data processing system can identify the data of the plurality of electronic activities from data sources (e.g., email servers, phone call logs, or any other electronic database that stores electronic communications) of one or more data source providers. Each electronic activity can include a body and a signature block. The body can have the content of the electronic activity and the signature block can have information about the person sending the electronic activity (e.g., the name, title, position, phone number, fax number, and/or a professional qualification of the person). The data processing system can extract activity field-value pairs from the body and/or the signature block. Each activity field-value pair can have a field and a value associated with the field. The data processing system can use natural language processing techniques to identify activity field-value pairs from the electronic activities. Each electronic activity can be associated with an entity (e.g., a sender or a recipient of the electronic activity) or an opportunity (e.g., a deal between two entities). The data processing system can extract the electronic activity field-value pairs from the electronic activities to match the electronic activities with node profiles that are associated with the same entities as the electronic activities (e.g., the entities that transmit or receive the electronic activities).

The data processing system may identify the type of each of the plurality of electronic activities. As described herein, types of electronic activities can include emails, electronic calendar events, electronic meetings, phone call logs, instant messages, etc. The compliance engine 908 may identify the types of the electronic activities based on the metadata that is associated with the electronic activities, the data source in which the electronic activities are stored, the format of the electronic activities, or by using natural language processing techniques on the words within the electronic activities.

The data processing system can store and maintain a set of node profiles. Each node profile can correspond to a unique entity. For example, one node profile can correspond to a person named "John Smith," another node profile can correspond to a person named "Abagail Xu," and another node profile can correspond to a company with the name "NewCo." In some embodiments, at least one node profile can be generated using an electronic activity. The electronic activity can be accessed from a data source of at least one data source provider. In some embodiments, data for at least one node profile can be aggregated from multiple systems of record corresponding to individual tenants of a multi-tenant system.

Each node profile can have a set of fields associated with one or more values. The set of fields can vary based on the type of entity for the node profile. For example, the set of fields of a node profile for a person can include, among others: a field for a first name of the first entity; a field for a last name of the first entity; a field for a company name associated with the first entity; a field for a phone number of the first entity; and a field for an e-mail address of the first entity. Each field of the node profile can be assigned or associated with one or more values. For example, the field for the first name of an entity in a node profile can be associated with the values "John" or "Jonathan." Each field and the associated one or more values can form a node field-value pair. The fields of a node profile corresponding to a company can include, among others: a field for a company name; a field for an email address; a field for a phone number of the first entity; and a field for a location of the first entity.

The data processing system may access the electronic accounts of entities of a data source provider and associate electronic activities of the electronic accounts with node profiles of the entities based on activity field-value pairs of the electronic activities. For example, the data processing system may extract activity field-value pairs from the signature block, the greeting block, the body, the "To:" field, or the "From:" field of the electronic activity to identify which entities transmitted or received an electronic activity. In some instances, the data processing system may access electronic activities that were transmitted between one or more entities of the data source provider (e.g., employees) and a first entity. The data processing system may identify which entities of the data source provider transmitted and/or received the electronic activities and/or the corresponding first entity from the activity field-value pairs. The data processing system may associate the data source provider and, in some cases, the entity of the data source provider that is associated with the respective electronic activity, with the electronic activities that the data source provider provides. The data processing system can maintain counters indicating the number of electronic activities that a first entity transmits exchanges with one or more entities of a data source provider.

The data processing system can determine whether the identified data satisfies a communication policy (Step 1004). The communication policy may include one or more rules that indicate whether, and/or to what degree, one or more entities of the data source provider may contact and/or store data about a first entity. The rules may be based on the number and/or the type of electronic activities the first entity transmitted from one or more electronic accounts to entities of the data source provider and/or values determined (e.g., activity field-value pair values determined using natural language processing techniques) from the identified data of the electronic activities. Such values may be used to update one or more communication settings (e.g., node field-value pairs) of a node profile of the first entity that indicate how entities of the data source provider may communicate with one or more electronic accounts of the first entity. Alternatively or additionally, the values may be transmitted to the system of record of the data source provider. Using the values, the data source provider may determine whether to store or process data about the first entity.

For example, the communication policy may include a rule that the data source provider or a system of record of the data source provider may contact or generate a contact record object for a first entity responsive to the first entity transmitting at least five emails to entities of the data source provider within the immediately previous six months. In this example, the rule may be satisfied if an entity transmitted the five electronic activities to any number of employees of entities of the data source provider. The data processing system may evaluate the electronic activities of the first entity and maintain and update a score or counter for each electronic activity that the first entity transmitted and/or received from entities of the data source provider. The data processing system may compare the score or counter to the threshold established by the rule and determine, responsive to the threshold being satisfied, that of the system of record of the data source provider may generate a record object for the first entity or entities of the data source provider may otherwise contact the first entity.

In some embodiments, the data processing system may use an engagement score to determine whether the communication policy is satisfied. Different types of electronic activities may be weighted differently. For example, phone calls may be weighted lower than meetings, emails may be weighted lower than phone calls, and voicemails may be weighted lower than answered phone calls. The weights may be relative to each other. For example, one calendar meeting may have the same weight as three emails and one voicemail may have the same weight as two emails. In some embodiments, the weights may be based on how recently the electronic activities were transmitted or received by entities of the data source provider. For example, older emails may be weighted lower than newer emails. In some embodiments, the weights may be based on information in the node profiles of the entities that transmit or receive the electronic activities. For example, electronic activities that were transmitted or received by entities that have supervisor-based titles or positions such as manager, CEO, or CFO may have higher weights than other employees of a company. In some embodiments, the weights of the electronic activities may be based on the language in the electronic activities. For example, an email containing "opt-in language" indicating that a data source provider may store data about the email sender may have a high weight and an email containing "opt-out language" may have a low or potentially a negative weight. The data processing system may identify such language using natural language processing techniques. The data processing system may aggregate combinations of the weights and the electronic activities to obtain the engagement score and compare the engagement score to a threshold or rules of a communication policy to determine if the communication policy is satisfied.

In some embodiments, responsive to the data processing system determining that the engagement score is lower than the threshold, and in some cases above another threshold that authorizes entities of the data processing system to contact a first entity, the data processing system may transmit a recommendation to the data source provider indicating that entities of the data source provider should contact the first entity, ensuring that the data source provider may continue to collect and process data about the first entity. For example, the data processing system may weight in-person meetings (which can be identified based on accepted calendar invitations) higher than emails. The first entity may have held one in-person meeting and transmitted two emails to entities of the data source provider within the last four weeks. The data processing system may associate weights with the in-person meeting and the two emails and aggregate the weights to obtain an engagement score. The data processing system may determine that the engagement score is lower than a threshold and, consequently, generate and transmit a recommendation for entities of the data source provider to contact the first entity before entities of the data source provider lose their authorization to contact the first entity (e.g., based on the electronic activities no longer satisfying the communication policy).

The data processing system may evaluate electronic activities in real-time as they are generated and ingested by the data processing system and/or upon being connected or otherwise associated with electronic accounts of the data source provider. For instance, the data processing system may evaluate electronic activities in real-time to determine whether a condition of the communication policy is satisfied. For example, the data processing system may access an electronic activity (e.g., an email) transmitted from an electronic account of an entity, John Smith, to an entity of a data source provider. The system of record of a data source provider may not be authorized to store information about John Smith yet because not enough electronic activities have been transmitted between entities of the data source provider and John Smith yet. Upon accessing each electronic activity, the data processing system may increment a counter or increase a score that indicates a number of electronic activity that have been transmitted between John Smith and one or more entities of the data source provider. The data processing system may compare the incremented counter or score to a threshold associated with the first condition of the communication policy (e.g., a threshold determined responsive to receiving an input from an administrator). Responsive to the data processing system determining that the incremented counter or increased score satisfies the threshold, the data processing system may transmit instructions to the system of record of the data source provider to generate a record object for John Smith. In some embodiments, the data processing system may transmit instructions to the system of record of the data source provider indicating that the system of record of the data source provider is authorized to store or process data about John Smith. Otherwise, the data processing system may continue to maintain and increment a counter or score for the number of electronic activities that John Smith transmits and/or receives from entities of the data source provider until determining that enough electronic activities have been transmitted between the two to satisfy the threshold. In another example, the data processing system may evaluate an obtained set of electronic activities from an electronic account of a first entity to determine which systems of record of data source providers may contact and/or otherwise store data about the first entity using a similar process to how it does so in real-time (e.g., by maintaining counters for electronic activities between the first entity and entities of the data source provider based on the obtained set of electronic activities).

The data processing system may maintain counters that are associated with the electronic activities that are transmitted between first entities and one or more entities of a data source provider. The counters may indicate a number of electronic activities that were transmitted between the first entities and one or more entities of the data source providers within a time period (e.g., a rolling window time period of the previous day, week, month, year, or five years). The data processing system may determine if electronic activities fall within the time period based on timestamps that are associated with the electronic activities. The data processing system may identify the timestamps based on metadata that is associated with the electronic activities. The data processing system may identify the timestamps and compare the timestamps to the time period. If the data processing system determines a timestamp is within the time period, the data processing system may increment the counter associated with the first entity that sent or received the electronic activity that is associated with the timestamp. The data processing system may determine values for counters periodically or upon accessing a new electronic activity that was transmitted or received by a first entity.

In another example, the communication policy may include a rule that the data source provider is to delete existing contact record objects for entities responsive to the corresponding entity transmitting an electronic activity that indicates for the data source provider to not collect data about or otherwise contact the first entity. The data processing system may evaluate (e.g., use natural language processing techniques) electronic activities from the first entity and identify any keywords or phrases (e.g., values) in the electronic activities that indicate that the first entity does not wish to be contacted and/or for the data source provider to stop storing data about the first entity. Accordingly, the data processing system may update a node field-value pair of the node profile of the first entity to indicate that the first entity does not wish to be contacted by entities of the data source provider and/or for the data source provider to store data about the first entity. Additionally or alternatively, the data processing system may transmit a notification to the system of record of the data source provider indicating that the data source provider is not authorized to contact or store data about the first entity, that the entity does not wish to be contacted by an entity of the data source provider, and/or that the data source provider is not authorized to store data about the first entity in its system of record.

In another example, the communication policy may include a rule that an entity of the data source provider may contact and/or store data about entities in its system of record responsive to the corresponding entity providing an "opt-in" indication to the data source provider. An opt-in indication may be an indication that the data source provider is authorized to continue contacting and/or storing data about the respective entity in its system of record. In one example, the data processing system may identify the opt-in indication from electronic activities. The data processing system may identify an opt-in indication in an electronic activity from language such as "I'd like to learn more about that," "Please put me on your distribution list," or "Tell me more." The data processing system may evaluate such electronic activities using natural language processing techniques to determine the language is opt-in language. In another example, the data processing system may receive an opt-in indication upon an entity selecting an opt-in link, such as a link in an email, on a website, or in an application. The data processing system may transmit a notification to the system of record of the data source provider indicating the opt-in indication.

In another example, the communication policy may include a rule that the data source provider is to delete existing contact record objects for entities if an entity selects a link in an email or other electronic activity that, if selected, indicates for the data source provider to stop collecting data about or otherwise contact the first entity. In some embodiments, examples of such links may include "unsubscribe" or "do not contact" links. Responsive to receiving an input indicating that the first entity selects such a link, the data processing system may identify the selection and update a node field-value pair of the node profile of the first entity to indicate that the first entity does not wish to be contacted by the data source provider and/or for the data source provider to stop storing data about the first entity. Additionally or alternatively, the data processing system may transmit an identification of the selection to the system of record of the data source provider. The system of record may receive the identification and store the identification or the indication in a data structure of the system of record accordingly.

In some embodiments, communication policies may be defined by data source providers and be specific to the defining data source provider. For example, one data source provider may have a communication policy that includes a rule that a contact record object for a first entity may be generated if the first entity has sent entities of the data source provider three emails. Another data source provider may have a communication policy that includes a rule that a contact record object for an entity may only be generated if the first entity has sent entities of the data source provider seven emails. The data processing system may implement communication policies according to the data source provider that defined the policy and that provided the electronic activities to the data processing system. Data source providers may define rules in their communication policy in any manner and may create any number of rules for their respective communication policy.

In some embodiments, to define a communication policy, an entity of the data source provider may generate or create one or more communication policies through a graphical user interface. The graphical user interface may provide the entity with options to select to generate the communication policies. The options may include various settings or values. For example, through the graphical user interface, the entity may select and/or update different values for the first restriction threshold and the second restriction threshold, specialized rules that may require thresholds for different types of electronic activities, weights for the electronic activities, and/or values for the time periods. The entity of the data source provider may select the settings and/or values, the settings and/or values may be transmitted to the data processing system, and the data processing system may generate a communication policy that is specific to the data source provider. The data processing system may do so by associating the communication policy with the group node profile that is associated with the data source provider.

In some embodiments, the data processing system may determine or configure a communication policy to implement based on a determined location for the first entity or the data source provider. The location may be defined as a zip code, city, state, province, country, continent, or any other geographical measurement. Different locations may be associated with different communication policies. For example, if the first entity is based in Europe, the data processing system may identify a communication policy that is associated with Europe that includes a rule that the data source provider may only collect data about the first entity if the first entity responds to an electronic activity that entities of the data source provider sent. Continuing this example, if the first entity is based in the United States, the data processing system may identify a communication policy that is associated with the United States and that includes a rule that the data source provider may collect data about the first entity if the data source provider has held a meeting with the first entity. Locations may be associated with any number of rules and/or communication policies.

To determine the location for the first entity, the data processing system may evaluate node field-value pairs of the node profile that is associated with the first entity. For example, the data processing system may evaluate a location node field-value pair of the node profile to determine the location for a first entity. The data processing system may identify the location as the value of the location field-value pair. In another example, the data processing system may evaluate the phone number of a node profile associated with the first entity. Different locations may be associated with phone numbers that have differing characteristics. Examples of characteristics may include the number of numbers in the phone, the country code, or the numbers of the phone number itself (e.g., an area code in the United States). Further, the phone numbers may be determined based on the country code or, in the case of United States phone numbers, the area code. The data processing system may compare the phone number of the first entity to an internal database (not shown) and determine the location of the first entity based on the location that matches the characteristics of the phone number. For example, if the phone number node field-value pair of an entity includes a country code of 31, the data processing system may compare the country code to the internal database and determine the location of the first entity is Finland. Accordingly, the data processing system may evaluate a communication policy for the first entity that is associated with Finland or Europe.

In some embodiments, the data processing system may confirm that the phone number for the first entity is the personal phone number for the first entity and not a company number. The data processing system may do so by analyzing phone number node field-value pairs of a plurality of node profiles to identify any patterns between the numbers. For example, the data processing system may determine that a phone number that appears as a phone number for multiple node profiles is a company node profile. In another example, the data processing system may determine that node profiles with phone numbers that share a common set of numbers and numbers that increase sequentially across the node profiles have phone numbers associated with their company and not personal phone numbers (e.g., 555-1234, 555-1235, 555-1236, and 555-1237). The data processing system may determine whether the phone number is a personal phone number or a company phone number using any number of rules or patterns. In some embodiments, the data processing system may not use an entity's phone number to determine the location of the first entity if the data processing system determines the phone number is a company phone number and not a personal phone number.

In some embodiments, the data processing system can determine the location of the first entity based on metadata extracted or otherwise identified in the electronic activities of the first entity. For example, the location can be based on the top-level domain of the first entity's email address. As one example, the email address associated with the first entity may end with a ".uk" top-level domain. In this example, the data processing system can determine the first entity is located in the United Kingdom because ".uk" is the internet country code top-level domain for the United Kingdom. The data processing system can determine the location of the first entity based on an IP address extracted or otherwise identified in the electronic activities of the first entity. The data processing system can use natural language processing to determine the location of the first entity. For example, the data processing system can process the electronic activities from the first entity to identify a physical address contained within the signature of the electronic activities. The data processing system can store the location as a node field-value pair in the node associated with the first entity. In some embodiments, the location can weight different data extracted from the first entity's electronic activities to determine a location for the first entity. For example, the data processing system may weight an address extracted from the signature block of the electronic activities greater than the top-level domain of the first entity's email address. In this example, the data processing system may associate a location of the United Kingdom with the first entity if the data processing system identifies an United Kingdom address in the first entity's electronic activities even though the first entity's email address ends with the top-level domain of ".us," which is the top-level domain of the United States.

In some embodiments, each or a portion of the node profiles stored by the data processing system may include a source field-value pair. The source field-value pair may include a list of one or more data source providers that are authorized to collect and/or store data about the first entity associated with the node profile. The data processing system may use the source field-value pair to determine to which data source providers to propagate data or from which data source providers to collect data about the first entity. The list may be in the form of an array or in any other form. The data processing system may add or remove data source providers from the source field-value pair based on the communication policy or based on receiving an indication to remove an identifier (e.g., a value) of the data source provider from the source field-value pair.

For example, the data processing system may receive an indication that the first entity selected a link for the data source provider to stop collecting data about the first entity. The data processing system may identify the indication and remove an identifier of the data source provider from the source field-value pair of the node profile of the first entity. In another example, the data processing system may determine that the data source provider no longer has authorization to store data about the first entity based on the communication policy no longer being satisfied and accordingly remove the identifier of the data source provider from the source field-value pair. For example, the communication policy may indicate that the data source provider may only store data about an entity if the first entity has had a meeting with one or more entities of the data source provider within the last two months. The data processing system may determine that it had been two months and a day since the last meeting between the first entity and one or more entities of the data source provider and accordingly remove the identifier of the data source provider from the source field-value pair of the node profile of the first entity.

To determine whether an electronic activity is transmitted or received within a time period, the data processing system may parse the electronic activity to identify a date and/or timestamp in which the electronic activity was transmitted or received. The date may be in the form of a timestamp. For example, the data processing system may use natural language processing techniques to identify key words in an email that indicate the date that the email was sent. The data processing system may evaluate the header, the body, or the signature block to do so. In another example, the data processing system may evaluate metadata associated with the electronic activity that may include the date and/or time that the electronic activity was transmitted, received, or, in the case of a meeting, held. In some embodiments, the data processing system may identify the date and/or time of each electronic activity and sort them according to when they were transmitted, received or held. The data processing system may compare each date or timestamp to the time period to determine whether the electronic activity was transmitted, received, or held within the time period and should be evaluated according to the communication policy.

In some embodiments, the communication policy may include multiple thresholds to which the data processing system may compare electronic activities to determine which types of communication entities of the data source provider may use to contact the first entity. Examples of thresholds may include, but are not limited to, a first restriction threshold and a second restriction threshold. Each threshold may be associated with a different method of communication that entities of the data source provider may use to contact respective entities. The data processing system may compare the electronic activities that were transmitted between the first entity and one or more entities of the data source provider to each threshold to determine which methods of communication entities of the data source provider are authorized to implement to contact the first entity. The data processing system may transmit instructions to the data source provider to update (e.g., change an associated object field-value pair) the contact record object that is associated with the first entity to indicate the authorized types of communication the data source provider may use to contact the first entity.

For example, if the data processing system determines that the number of electronic activities exceeds or otherwise satisfies the first restriction threshold, the data processing system may determine that one or more entities of the data source provider may market to the first entity. Marketing to the first entity may include attempting to generate interest in a product. Examples of marketing activities may include sending out questionnaires, advertising, direct mail, telemarketing, brochures, magazine articles, newsletters, websites, etc. In some instances, the data processing system may send or use each or a portion of these methods of communication to contact the first entity if the data processing system determines that the electronic activities between the first entity and the one or more entities of the data source provider exceed the marketing threshold.

In another example, if the data processing system determines that the number of electronic activities exceeds or otherwise satisfies the second restriction threshold, the data processing system may determine that the data source provider can use its sales team to try to sell to the first entity. Examples of sales activities may include targeted calling, targeted messaging, or any other type of directed contact with the first entity. In some instances, the data processing system may send or use or a portion of these methods of communication to contact the first entity if the data processing system determines that the electronic activities between the first entity and the one or more entities of the data source provider exceed the sales threshold.

In some embodiments, the data processing system may receive an audit request by a third party to determine for which entities the data source provider does not have authorization to store data. In some embodiments, the data processing system can periodically improve data hygiene by purging, deleting, or otherwise removing outdated or stale contact record objects. The contact record objects can be outdated or stale, if the data source provider has not received an electronic activity from the entity of the contact record object within a predetermined time period (e.g., within the last day, week, month, quarter, or year). Upon receiving the request, the data processing system may evaluate the electronic activities between one or more entities of the data source provider and the first entities that are associated with contact record objects of the system of record of the data source provider. The data processing system may determine the number and type of the electronic activities between each of the first entities and the one or more entities of the data source provider and use this data to determine for which first entities the data source provider has authorization to contact and/or store data and/or the type of communication entities of the data source provider may use to contact the first entity.

For example, ACME Co. may receive an audit request from a third party to determine if ACME Co. is storing any data about any entities for which it does not have authority to store data. ACME Co. may transmit the request to the data processing system. The data processing system may receive the request and evaluate the electronic activities that ACME Co. has stored in various electronic accounts and the contact record objects that ACME Co. has stored in ACME Co.'s system of record. The data processing system may compare the electronic activities to the communication policy and identify any entities that have not transmitted and/or received enough electronic activities from entities of ACME Co. for such entities of ACME Co. to store data about them. The data processing system may transmit instructions to Acme Co. (e.g., in the form of a flag or communication setting) to delete contact record objects that correspond to such entities.

In some embodiments, the data processing system (or the data source provider) may store electronic activities that are associated with the first entity in a randomized or pseudo-randomized format to avoid storing data about the first entity that originated in a data source of the data source provider when the data source provider is not authorized to collect such data. The data processing system may associate the first entity with an identifier and store the identifier in a data structure of the data processing system. When the data processing system receives an electronic activity that is associated with the first entity, the data processing system may convert the electronic activity or identifiers associated with the entities of the electronic activity (e.g., the email address of the electronic activity sender) into a second format. The data processing system can convert the electronic activity or identifier into the second format with a one-way algorithm, such as by using such hashing techniques as SHA-2, SHA-128, or SHA-256. The data processing system may store the electronic activities or identifiers associated with the entities of the electronic activity in the second format until the data processing system determines that the communication policy for electronic activities transmitted between the first entity and one or more entities of the data source provider has been satisfied. The data processing system can maintain a counter indicating the number of instances an identifier for an entity has been identified from an electronic activity and converted into the second format or an electronic activity transmitted by the entity has been converted into the second format. The data processing system may use such counts to determine if a communication policy has been satisfied. In some embodiments, before converting the electronic activities into the second format, the data processing system may parse the electronic activities to determine if the electronic activity includes a value indicating for the data source provider to stop processing data about the first entity.

For example, the data processing system may generate an identifier for a person, Tom Jones. The data processing system may receive an email that Tom Jones sent ACME Co. The data processing system may have determined that ACME Co. does not have authorization to contact or otherwise store data about Tom Jones, so the data processing system may convert the email address for Tom Jones into a second format by hashing the email address for Tom Jones to generate a hashed identifier than cannot be directly linked back to Tom Jones. The data processing system can delete the email and contact information for Tom Jones from the data processing system. The data processing system may associate the hashed identifier for Tom Jones with a counter. Responsive to receiving a second email from Tom Jones, the data processing system can hash Tom's email address, which generates the same hashed identifier as from the first email. Finding the hashed identifier already stored in a database of the data processing system, the data processing system can increment the counter associated with the hashed identifier. At each instance that the data processing system increments the counter, the data processing system may compare the counter to a threshold before deleting the recently received email and contact information for Tom Jones. The threshold may be a rule of a second communication policy that indicates whether a data source provider may store data about a first entity. In some embodiments, the threshold may be a rule of the communication policy described above. Responsive to the data processing determining that the counter exceeds the threshold, the data processing system may transmit a flag or setting to the system of record to indicate for the system of record to store the contact information and electronic activities of Tom Jones. In some implementations, the data processing system can set a flag that enables the system of record to retrieve electronic activities from a period of time prior to the counter reaching the threshold.

Responsive to determining that the first condition of the communication policy is satisfied, the data processing system can transmit instructions to generate a contact record object (Step 1006). The data processing system may compare the data of the electronic activities between the first entity and one or more entities of the data source provider to the communication policy and determine if any rules of the communication policy are satisfied. The data processing system may identify a number and/or type of electronic activities that are transmitted or received between the first entity and entities of the data source provider and compare the identified electronic activities to a value established by the communication policy. For example, the communication policy may be satisfied if the first entity sent five electronic activities to entities of the data source provider within the last year. The data processing system may identify seven electronic activities that were transmitted between the first entity and entities of the data processing system. The data processing system may compare the number seven to the threshold and determine that seven is greater than a threshold. Accordingly, the data processing system may determine that the threshold is exceeded and the communication policy is satisfied. The data processing system may transmit instructions to the system of record to generate a record object for the first entity responsive to determining that the communication policy is satisfied. The instructions may include a flag, tag, or setting for the record object to be generated. The system of record may receive such instructions, identify the flag, tag, or setting, and generate a record object that is associated with the first entity based on the flag, tag, or setting. As described herein, determining that the communication policy has been satisfied may be described as determining that a first condition of the communication policy has been met.

In some embodiments, communication policies may include more than one rule that may be satisfied for the communication policy to be satisfied. For example, the communication policy may have a rule indicating that the first entity must call entities of the data source provider twice for the rule to be satisfied. The communication policy may have another rule indicating that the first entity may have an in-person meeting for the rule to be satisfied. The communication policy may be configured so that it can only be satisfied if both of the rules are satisfied. In some instances, the communication policy may be configured so that it can be satisfied if only one of the rules is satisfied. The communication policy may be configured so it may be satisfied in any manner and based on any type and/or number of rules.

In some embodiments, in addition to or instead of transmitting instructions to the system of record to generate the contact record object, the data processing system may store an association between a first communication setting and the node profile of the first entity in a data structure of the data processing system responsive to the data processing system determining that the communication policy has been satisfied. The first communication setting may be a flag or tag indicating that the data source provider is authorized to store a contact record object for the first entity and/or otherwise store data about the first entity. In some embodiments, the first communication setting may be a value in a node field-value pair of the node profile of the first entity. In some embodiments, the first communication setting may be a value in the source field-value pair as described above.

For example, the data processing system may determine that ACME Co. has communicated with a person enough to satisfy a communication policy (e.g., transmit or receive enough electronic activities to satisfy a threshold of a communication policy). The data processing system may accordingly transmit instructions to the system of record of ACME Co. to generate a contact record object for the person and/or to generate a tag indicating that entities of the data source provider may contact the person. The data processing system may also, in some embodiments, store the tag in a data structure within the data processing system.

Responsive to determining that the communication policy is not satisfied, the data processing system may transmit instructions to delete an existing contact record object (Step 1008). In some instances, the data processing system may determine that the communications between entities of the data source provider and the first entity satisfy a second condition of the communication policy. The data processing system may do so by comparing the electronic activities to the communication policy and determining that the rules of the communication policy are not satisfied. The data processing system may determine that the communication policy is not satisfied and transmit instructions (e.g., a flag, a tag, or a communication setting) to the data source provider for the data source provider to delete an existing contact record object that is associated with the first entity. As described herein, determining that the communication policy is not satisfied may be described as determining that a second condition of the communication policy has been met.

The data processing system may determine that the electronic activities do not satisfy the communication policy based on criteria of one or more rules of the communication policy not being met. For example, the data processing system may compare the number of electronic activities that were transmitted between the first entity and one or more entities of the data source provider within the previous month to a threshold of seven electronic activities. The data processing system may determine that there were only six electronic activities that were transmitted between the first entity and one or more entities of the data source provider within the previous month. Consequently, the data processing system may determine that the electronic activities do not satisfy the communication policy and transmit instructions for the data source provider to delete the contact record object that is associated with the first entity. In another example, the data processing system may parse an electronic activity that the first entity sent entities of the data source provider. Using keyword matching, the data processing system may detect "negative language" (e.g., "stop sending me emails") that indicates that the first entity does not wish for the data source provider to process data about the first entity. Consequently, the data processing system may transmit instructions to the data source provider to delete the contact record object associated with the first entity and/or to not contact the first entity.

In some embodiments, when the data processing system determines that the communication policy is not satisfied based on the electronic activities between one or more entities of the data source provider and the first entity, the data processing system may update a second communication setting of the node profile of the first entity. The second communication setting may be a flag, tag or setting indicating that the data source provider may not store data about the first entity. The data processing system may update the second communication setting by selecting a box on a user interface generated by the data processing system or by updating a node field-value pair of the node profile of the first entity that corresponds to the second communication setting. In some embodiments, the data processing system may associate a tag associated with the second communication setting with the node profile associated with the first entity. Consequently, the data processing system may store an association between the first entity and the second communication in a data structure of the data processing system. In some embodiments, the data processing system may generate and/or transmit the tag for the second communication setting to a system of record of a data source provider.

In some embodiments, responsive to the communication policy not being satisfied, the data processing system may generate a restriction tag that the data processing system may use to restrict communication between the one or more entities of the data source provider and the first entity. The data processing system may use the restriction tag to stop one or more entities of the data source provider from communicating with the first entity. The data processing system may do so by storing the restriction tag in a data structure of the data processing system and/or transferring the restriction tag to the data source provider to indicate that an entity of the data source provider is not authorized to contact the first entity. In some instances, when an entity of the data source provider attempts to email or otherwise contact the first entity associated with the restriction tag, a processor of the data source provider may identify the restriction tag and generate a recommendation on a user interface for the first entity of the data source provider attempting to contact the first entity to stop the contact attempt.

In some embodiments, the data processing system may utilize the techniques described herein to improve the data hygiene of systems of record of data source providers. The data processing system may do so using a data hygiene policy. The data hygiene policy may include rules and/or thresholds associated with indications of whether to remove record objects that are stored in the systems of record. For example, the data hygiene policy may include a rule in which record objects of entities may be removed from a system of record responsive to the data processing system determining the respective entity has not transmitted an electronic activity within a time period (e.g., one month, six months, or one year). Another rule of the data hygiene policy may include a rule in which record objects of entities may be removed responsive to the data processing system determining the entity has not transmitted enough electronic activities to satisfy a threshold, in some cases within a predetermined time period. Such a threshold may be based on the type of electronic activities that the entity has transmitted (e.g., a calendar meeting may have a lower threshold than emails). The data processing system may transmit instructions to the respective system of record to cause the respective record object to be removed. By using the data hygiene policy, the data processing system may cause record objects to be removed from memory of the systems of record, providing more memory for the systems of record to store other data.

Similarly, the data processing system may utilize the techniques described herein to improve the data retention of systems of record of data source providers. The data processing system may do so using a data retention policy. Similar to the data hygiene policy, the data retention policy may include rules and/or thresholds associated with indications of whether to remove electronic activities and/or data extracted or otherwise associated with the electronic activities that are stored in the systems of record. The data retention policy may include rules and/or thresholds associated with indications of whether to remove electronic activities or data extracted from such electronic activities that is stored in systems of record. The rules and/or thresholds may be specific to the type of electronic activity, as with the hygiene policy. For example, the data retention policy may include a rule in which electronic activities or data extracted from the electronic activities may be removed from a system of record responsive to the data processing system determining the respective electronic activity was transmitted outside of a moving window of the data retention policy. The data processing system may transmit instructions to the respective system of record to cause the data or and/or electronic activity to be removed. Accordingly, the data processing system may purge the system of record of any outdated or stale electronic activities or data extracted from such electronic activities, freeing up more space in memory of the systems of record to store more data.

S. Computer System

Figure 11:
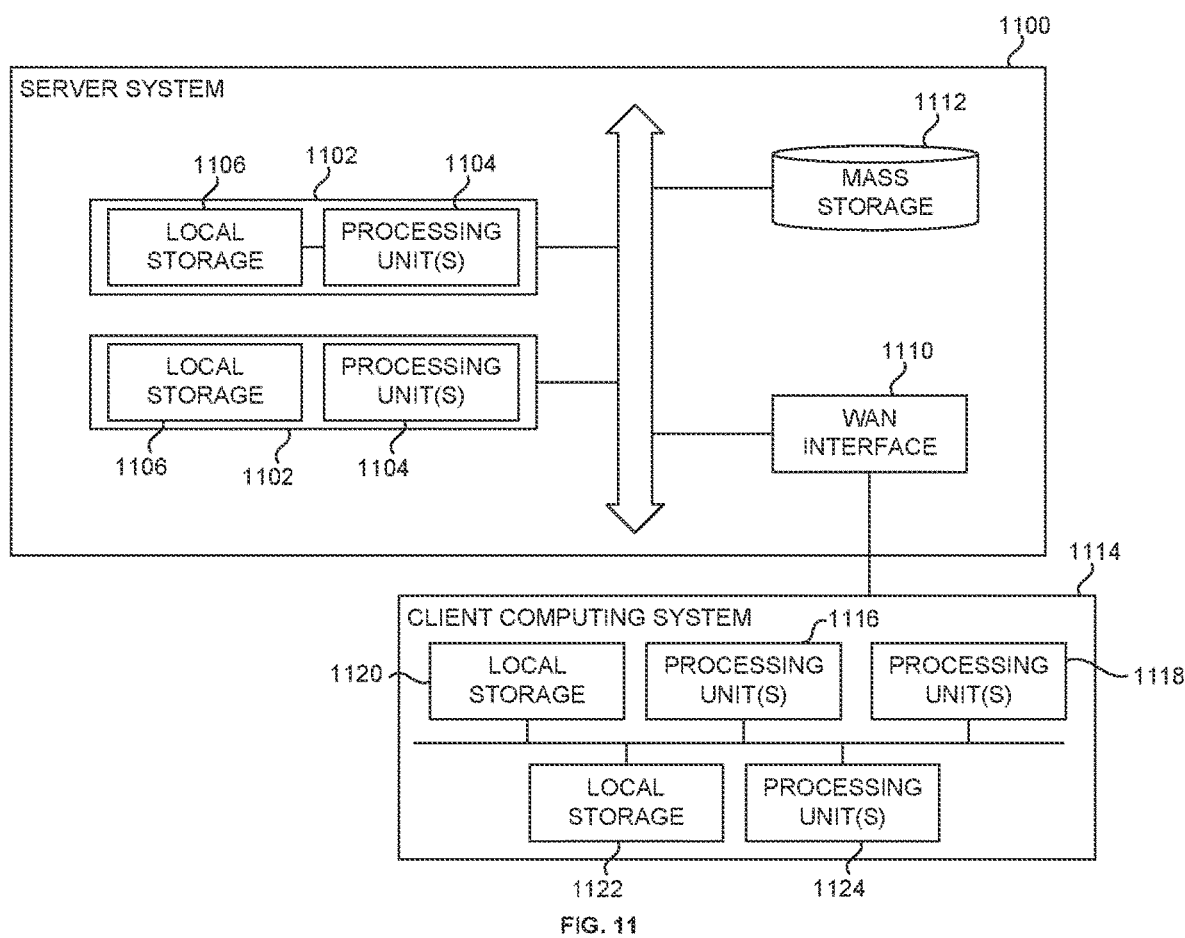
FIG. 11 illustrates a simplified block diagram of a representative server system and client computer system according to embodiments of the present disclosure.

Various operations described herein can be implemented on computer systems, which can be of generally conventional design. FIG. 11 shows a simplified block diagram of a representative server system 1100 and client computing system 1114 usable to implement certain embodiments of the present disclosure. In various embodiments, server system 1100 or similar systems can implement services or servers described herein or portions thereof. Client computing system 1114 or similar systems can implement clients described herein. The data processing system 100 and others described herein can be similar to the server system 1100.

Server system 1100 can have a modular design that incorporates a number of modules 1102 (e.g., blades in a blade server embodiment); while two modules 1102 are shown, any number can be provided. Each module 1102 can include processing unit(s) 1104 and local storage 1106.

Processing unit(s) 1104 can include a single processor, which can have one or more cores, or multiple processors. In some embodiments, processing unit(s) 1104 can include a general-purpose primary processor as well as one or more special-purpose co-processors such as graphics processors, digital signal processors, or the like. In some embodiments, some or all processing units 1104 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1104 can execute instructions stored in local storage 1106. Any type of processors in any combination can be included in processing unit(s) 1104.

Local storage 1106 can include volatile storage media (e.g., conventional DRAM, SRAM, SDRAM, or the like) and/or non-volatile storage media (e.g., magnetic or optical disk, flash memory, or the like). Storage media incorporated in local storage 1106 can be fixed, removable or upgradeable as desired. Local storage 1106 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1104 need at runtime. The ROM can store static data and instructions that are needed by processing unit(s) 1104. The permanent storage device can be a non-volatile read-and-write memory device that can store instructions and data even when module 1102 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1106 can store one or more software programs to be executed by processing unit(s) 1104, such as an operating system and/or programs implementing various server functions such as functions of the data processing system 100 of FIG. 1 or any other system described herein, or any other server(s) or system associated with data processing system 100 of FIG. 1.

"Software" refers generally to sequences of instructions that, when executed by processing unit(s) 1104 cause server system 1100 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1104. Software can be implemented as a single program or a collection of separate programs or program modules that interact as desired. From local storage 1106 (or non-local storage described below), processing unit(s) 1104 can retrieve program instructions to execute and data to process in order to execute various operations described above.

In some server systems 1100, multiple modules 1102 can be interconnected via a bus or other interconnect 1108, forming a local area network that supports communication between modules 1102 and other components of server system 1100. Interconnect 1108 can be implemented using various technologies including server racks, hubs, routers, etc.

A wide area network (WAN) interface 1110 can provide data communication capability between the local area network (interconnect 1108) and a larger network, such as the Internet. Conventional or other activities technologies can be used, including wired (e.g., Ethernet, IEEE 802.3 standards) and/or wireless technologies (e.g., Wi-Fi, IEEE 802.11 standards).

In some embodiments, local storage 1106 is intended to provide working memory for processing unit(s) 1104, providing fast access to programs and/or data to be processed while reducing traffic on interconnect 1108. Storage for larger quantities of data can be provided on the local area network by one or more mass storage subsystems 1112 that can be connected to interconnect 1108. Mass storage subsystem 1112 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1112. In some embodiments, additional data storage resources may be accessible via WAN interface 1110 (potentially with increased latency).

Server system 1100 can operate in response to requests received via WAN interface 1110. For example, one of modules 1102 can implement a supervisory function and assign discrete tasks to other modules 1102 in response to received requests. Conventional work allocation techniques can be used. As requests are processed, results can be returned to the requester via WAN interface 1110. Such operation can generally be automated. Further, in some embodiments, WAN interface 1110 can connect multiple server systems 1100 to each other, providing scalable systems capable of managing high volumes of activity. Conventional or other techniques for managing server systems and server farms (collections of server systems that cooperate) can be used, including dynamic resource allocation and reallocation.

Server system 1100 can interact with various user-owned or user-operated devices via a wide-area network such as the Internet. An example of a user-operated device is shown in FIG. 11 as client computing system 1114. Client computing system 1114 can be implemented, for example, as a consumer device such as a smartphone, other mobile phone, tablet computer, wearable computing device (e.g., smart watch, eyeglasses), desktop computer, laptop computer, and so on.

For example, client computing system 1114 can communicate via WAN interface 1110. Client computing system 1114 can include conventional computer components such as processing unit(s) 1116, storage device 1118, network interface 1120, user input device 1122, and user output device 1124. Client computing system 1114 can be a computing device implemented in a variety of form factors, such as a desktop computer, laptop computer, tablet computer, smartphone, other mobile computing device, wearable computing device, or the like.

Processor 1116 and storage device 1118 can be similar to processing unit(s) 1104 and local storage 1106 described above. Suitable devices can be selected based on the demands to be placed on client computing system 1114; for example, client computing system 1114 can be implemented as a "thin" client with limited processing capability or as a high-powered computing device. Client computing system 1114 can be provisioned with program code executable by processing unit(s) 1116 to enable various interactions with server system 1100 of a message management service such as accessing messages, performing actions on messages, and other interactions described above. Some client computing systems 1114 can also interact with a messaging service independently of the message management service.

Network interface 1120 can provide a connection to a wide area network (e.g., the Internet) to which WAN interface 1110 of server system 1100 is also connected. In various embodiments, network interface 1120 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1122 can include any device (or devices) via which a user can provide signals to client computing system 1114; client computing system 1114 can interpret the signals as indicative of particular user requests or information. In various embodiments, user input device 1122 can include any or all of a keyboard, touch pad, touch screen, mouse or other pointing device, scroll wheel, click wheel, dial, button, switch, keypad, microphone, and so on.

User output device 1124 can include any device via which client computing system 1114 can provide information to a user. For example, user output device 1124 can include a display to display images generated by or delivered to client computing system 1114. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1124 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1104 and 1116 can provide various functionality for server system 1100 and client computing system 1114, including any of the functionality described herein as being performed by a server or client, or other functionality associated with message management services.

It will be appreciated that server system 1100 and client computing system 1114 are illustrative and that variations and modifications are possible. Computer systems used in connection with embodiments of the present disclosure can have other capabilities not specifically described here. Further, while server system 1100 and client computing system 1114 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method comprising:
   maintaining, by one or more processors of a data processing system, a plurality of node profiles including a plurality of node field-value pairs, each node-field-value pair identifying a node field and one or more node values;
   accessing, by the one or more processors, a plurality of electronic activities transmitted or received via electronic accounts of one or more data source providers;
   accessing, by the one or more processors, from one or more servers of a customer relationship management (CRM) system, a plurality of CRM systems of record including a plurality of CRM record objects, each CRM record object of the plurality of CRM record objects corresponding to a record object type and comprising one or more object fields having one or more object field values, each respective CRM system of record of the plurality of the CRM systems of record corresponding to a respective data source provider of the plurality of data source providers;
   generating, by the one or more processors, a plurality of local record objects corresponding to the plurality of CRM record objects, each respective local record object of the plurality of local record objects storing record object data obtained from the corresponding CRM record object, the record object data stored in the plurality of local record objects used by the one or more processors for matching electronic activities to the plurality of local record objects;
   identifying, by one or more processors, for an entity corresponding to a node profile, data of a plurality of electronic activities linked to one or more local record objects corresponding to a first data source provider of the one or more data source providers and transmitted from or received by one or more electronic accounts of the entity;
   determining, by the one or more processors, whether the identified data of the plurality of electronic activities satisfies a communication policy, the communication policy including one or more rules based on i) a number of electronic activities transmitted from the one or more electronic accounts of the entity or ii) a value determined from the data of the plurality of electronic activities and used to update one or more communication settings for communicating with the one or more electronic accounts of the entity; and
   transmitting, by the one or more processors, instructions to generate, in a system of record of the first data source provider, a contact record object for the entity based on the identified data satisfying a first condition of the communication policy and responsive to generating a local contact record object corresponding to the entity; or
   transmitting, by the one or more processors, instructions to delete, in the system of record of the first data source provider, an existing contact record object for the entity based on the identified data satisfying a second condition of the communication policy.

2. The method of claim 1, further comprising:
   transmitting, by the one or more processors, instructions to store, in the system of record of the first data source provider, a first association between the contact record object for the entity and a first communication setting responsive to the identified data satisfying the first condition of the communication policy, the first communication setting authorizing the first data source provider to contact or store data about the entity; or
   transmitting, by the one or more processors, instructions to store, in the system of record of the first data source provider, a second association between the contact record object for the entity and a second communication setting responsive to the identified data satisfying the second condition of the communication policy, the second communication setting restricting communication between the first data source provider and the entity.

3. The method of claim 1,
wherein each node profile of the plurality of node profiles including a source field-value pair indicating which data source providers are authorized to collect data for the node profile;
receiving, by the one or more processors, an indication to remove a value associated with a second data source provider from a source field-value pair of the node profile of the entity; and
removing, by the one or more processors, the value associated with the second data source provider from the source field-value pair of the entity responsive to receiving the indication.

4. The method of claim 1, wherein determining, by the one or more processors, whether the identified data of the plurality of electronic activities satisfies the communication policy comprises evaluating the communication policy using electronic activities between a plurality of entities of the first data source provider and the entity.

5. The method of claim 1, further comprising:
responsive to the second condition of the communication policy being satisfied, storing, by the one or more processors in a data structure, an association between a restriction tag to restrict communication between the first data source provider and the entity.

6. The method of claim 1, further comprising:
responsive to the second condition of the communication policy being satisfied, transmitting, by the one or more processors, instructions to generate, in the system of record of the first data source provider, a restriction tag used by the system of record to restrict communication between the first data source provider and the entity and store an association between the restriction tag and the entity in a data structure of the system of record of the first data source provider.

7. The method of claim 1, further comprising:
comparing, by the one or more processors, the number of electronic activities transmitted or received by the one or more electronic accounts of the entity to a first restriction threshold; and
transmitting, by the one or more processors, instructions to update an object field-value pair of the contact record object based on determining that the number of electronic activities that were transmitted or received by the one or more electronic accounts of the entity exceeds the first restriction threshold.

8. The method of claim 7, further comprising:
comparing, by the one or more processors, the number of electronic activities transmitted or received by the one or more electronic accounts of the entity to a second restriction threshold; and
transmitting, by the one or more processors, instructions to update the object field-value pair of the contact record object based on determining that the number of electronic activities that were transmitted or received by the one or more electronic accounts of the entity exceeds the second restriction threshold.

9. The method of claim 1, further comprising:
determining, by the one or more processors, a type of electronic activity for each of the plurality of electronic activities,
wherein determining by the one or more processors, whether the identified data of the plurality of electronic activities satisfies the communication policy is based on the type of electronic activity for each for the plurality of electronic activities.

10. The method of claim 1, wherein the system of record includes a plurality of contact record objects, each contact record object of the plurality of contact record objects associated with a different entity, the method further comprising:
receiving, by the one or more processors, a validation request,
wherein the transmitting, by the one or more processors, instructions to delete the existing contact record object for the entity setting is performed further responsive to receiving the validation request.

11. The method of claim 1, further comprising:
determining, by the one or more processors, a location for the entity; and
determining, by the one or more processors, the communication policy based on the determined location of the entity.

12. The method of claim 11, wherein determining, by the one or more processors, the location for the entity comprises identifying, by the one or more processors, the location from a location field-value pair of a node profile associated with the entity.

13. The method of claim 1, further comprising:
storing, by the one or more processors, an identifier associated with the entity in one or more data structures;
receiving, by the one or more processors, an electronic activity from an electronic account of the entity, the electronic activity having a first format;
converting, by the one or more processors, an electronic account identifier of the electronic account into a second format; and
associating, by the one or more processors, the electronic activity with the stored identifier based on the electronic account identifier matching the stored identifier,
wherein determining, by the one or more processors, whether the identified data of the plurality of electronic activities satisfies the communication policy is based at least on the association between the electronic activity and the stored identifier.

14. The method of claim 1, further comprising:
determining, by the one or more processors, an engagement score for the entity based on the data of the plurality of electronic activities;
comparing, by the one or more processors, the engagement score to a threshold; and
generating, by the one or more processors, responsive to the engagement score being less than the threshold, a recommendation to contact the entity.

15. The method of claim 1, further comprising:
parsing, by the one or more processors, an electronic activity of the plurality of electronic activities; and
based on the parsing the electronic activity, detecting an indication to not store data regarding the entity,
wherein transmitting, by the one or more processors, the instructions to delete the existing contact record object for the entity is further based on the detected indication to not store data regarding the entity.

16. The method of claim 1, further comprising:
receiving, by the one or more processors, an electronic activity transmitted from the one or more electronic accounts of the entity;
responsive to receiving, by the one or more processors, the electronic activity, determining, by the one or more processors, that a number of electronic activities transmitted from the one or more electronic accounts of the entity exceeds a threshold; and responsive to determining, by the one or more processors, that the number of electronic activities transmitted from the one or more electronic accounts of the entity exceeding the threshold, determining, by the one or more processors, that the first condition of the communication policy is satisfied.

17. A system comprising:
one or more processors of a data processing system configured to execute machine-readable instructions to:
maintain a plurality of node profiles including a plurality of node field-value pairs, each node-field-value pair identifying a node field and one or more node values;
access a plurality of electronic activities transmitted or received via electronic accounts of one or more data source providers;
access, from one or more servers of a customer relationship management (CRM) system, a plurality of CRM systems of record including a plurality of CRM record objects, each CRM record object of the plurality of CRM record objects corresponding to a record object type and comprising one or more object fields having one or more object field values, each respective CRM system of record of the plurality of the CRM systems of record corresponding to a respective data source provider of the plurality of data source providers;
generate a plurality of local record objects corresponding to the plurality of CRM record objects, each respective local record object of the plurality of local record objects storing record object data obtained from the corresponding CRM record object, the record object data stored in the plurality of local record objects used by the one or more processors for matching electronic activities to the plurality of local record objects;
identify, for an entity corresponding to a node profile, data of a plurality of electronic activities linked to one or more local record objects corresponding to a first data source provider of the one or more data source providers and transmitted from or received by one or more electronic accounts of the entity;
determine whether the identified data of the plurality of electronic activities satisfies a communication policy, the communication policy including one or more rules based on i) a number of electronic activities transmitted from the one or more electronic accounts of the entity or ii) a value determined from the data of the plurality of electronic activities and used to update one or more communication settings for communicating with the one or more electronic accounts of the entity; and
transmit instructions to generate, in a system of record of the first data source provider, a contact record object for the entity based on identified data satisfying a first condition of the communication policy and responsive to generating a local contact record object corresponding to the entity; or
transmit instructions to delete, from the system of record of the first data source provider, an existing contact record object for the entity based on the identified data satisfying a second condition of the communication policy.

18. The system of claim 17, wherein the one or more processors are further configured to:
transmit instructions to store, in the system of record of the first data source provider, a first association between the contact record object for the entity and a first communication setting responsive to the identified data satisfying the first condition of the communication policy, the first communication setting authorizing the first data source provider to contact or store data about the entity; or
transmit instructions to store, in the system of record of the first data source provider, a second association between the contact record object for the entity and a second communication setting responsive to the identified data satisfying the second condition of the communication policy, the second communication setting restricting communication between the first data source provider and the entity.

19. The system of claim 17, wherein the one or more processors are further configured to:
maintain a plurality of node profiles, each node profile of the plurality of node profiles including a source field-value pair indicating which data source providers are authorized to collect data for the node profile;
receive an indication to remove a value associated with a second data source provider from a source field-value pair of a node profile of the entity; and
remove the value associated with the second data source provider from the source field-value pair of the entity responsive to receiving the indication.

20. A non-transitory computer-readable storage medium having instructions embodied thereon, the instructions being executable by one or more processors of a data processing system to:
maintain a plurality of node profiles including a plurality of node field-value pairs, each node-field-value pair identifying a node field and one or more node values;
access a plurality of electronic activities transmitted or received via electronic accounts of one or more data source providers;
access, from one or more servers of a customer relationship management (CRM) system, a plurality of CRM systems of record including a plurality of CRM record objects, each CRM record object of the plurality of CRM record objects corresponding to a record object type and comprising one or more object fields having one or more object field values, each respective CRM system of record of the plurality of the CRM systems of record corresponding to a respective data source provider of the plurality of data source providers;
generate a plurality of local record objects corresponding to the plurality of CRM record objects, each respective local record object of the plurality of local record objects storing record object data obtained from the corresponding CRM record object, the record object data stored in the plurality of local record objects used by the one or more processors for matching electronic activities to the plurality of local record objects;
identify, for an entity corresponding to a node profile, data of a plurality of electronic activities linked to one or more local record objects corresponding to a first data source provider of the one or more data source providers and transmitted from or received by one or more electronic accounts of the entity;
determine whether the identified data of the plurality of electronic activities satisfies a communication policy, the communication policy including one or more rules based on i) a number of electronic activities transmitted from the one or more electronic accounts of the entity or ii) a value determined from the data of the plurality of electronic activities and used to update one or more communication settings for communicating with the one or more electronic accounts of the entity; and transmit instructions to generate, in a system of record of the first data source provider, a contact record object for the entity based on identified data satisfying a first condition of the communication policy and responsive to generating a local contact record object corresponding to the entity; or transmit instructions to delete, from the system of record of the first data source provider, an existing contact record object for the entity based on the identified data satisfying a second condition of the communication policy.

* * * * *